United States Patent
Hariguchi et al.

(10) Patent No.: US 6,956,858 B2
(45) Date of Patent: Oct. 18, 2005

(54) NETWORK ROUTING TABLE AND PACKET ROUTING METHOD

(75) Inventors: Yoichi Hariguchi, Menlo Park, CA (US); Thomas A. Herbert, San Jose, CA (US); Ryan T. Herbst, Redwood City, CA (US)

(73) Assignee: Mayan Networks Corporation, San Jose, CA (US)

( * ) Notice: Subject to any disclaimer, the term of this patent is extended or adjusted under 35 U.S.C. 154(b) by 999 days.

(21) Appl. No.: 09/895,972

(22) Filed: Jun. 29, 2001

(65) Prior Publication Data

US 2002/0080798 A1 Jun. 27, 2002

Related U.S. Application Data

(60) Provisional application No. 60/215,653, filed on Jun. 30, 2000.

(51) Int. Cl.$^7$ .......................... H04L 12/28; H04L 12/56
(52) U.S. Cl. .................. 370/395.31; 379/272; 379/273; 379/274; 379/275; 379/276; 379/277; 709/238; 709/239; 709/240; 709/241; 709/242; 709/243; 709/244; 711/221
(58) Field of Search ........................... 370/395.31, 392, 370/312, 352, 355, 356, 389, 395, 432, 472, 400, 351, 255, 363, 368, 374, 381, 386, 395.32, 395.7, 395.71, 395.72; 709/238–244, 245, 249; 711/205, 206, 207, 221, 117, 114, 122; 707/2, 100; 379/272–277

(56) References Cited

U.S. PATENT DOCUMENTS

| | | | | | |
|---|---|---|---|---|---|
| 5,914,953 | A | * | 6/1999 | Krause et al. | 370/392 |
| 6,011,795 | A | * | 1/2000 | Varghese et al. | 370/392 |
| 6,018,524 | A | * | 1/2000 | Turner et al. | 370/392 |
| 6,029,203 | A | * | 2/2000 | Bhatia et al. | 709/244 |
| 6,067,574 | A | * | 5/2000 | Tzeng | 709/247 |
| 6,108,330 | A | * | 8/2000 | Bhatia et al. | 370/352 |
| 6,141,738 | A | * | 10/2000 | Munter et al. | 711/206 |
| 6,266,706 | B1 | * | 7/2001 | Brodnik et al. | 709/242 |
| 6,421,342 | B1 | * | 7/2002 | Schwartz et al. | 370/392 |
| 6,594,704 | B1 | * | 7/2003 | Birenback et al. | 709/238 |
| 6,850,351 | B1 | * | 2/2005 | Djachiachvili | 359/233 |

OTHER PUBLICATIONS

Srinivasan et al., "Faster IP Lookups Using Controlled Prefix Expansion", Department of Computer Science, Washington University, St. Louis, MO, Nov. 5, 1997; pp 1–21.

Gupta et al., "Routing Lookups in Hardware at Memory Access Speeds", Computer Systems Laboratory, Stanford University, Published 1998, IEEE.

* cited by examiner

*Primary Examiner*—Wellington Chin
*Assistant Examiner*—Jamal A. Fox
(74) *Attorney, Agent, or Firm*—Morgan, Lewis & Bockius LLP

(57) ABSTRACT

A routing table circuit for a router has one or more input ports and output ports for message communication. In the routing table circuit, one or more routing table memories store a plurality of routing table arrays. The routing table arrays are arranged hierarchically in levels, and each routing table array is associated with a predetermined subset of prefixes. Each routing table array has entries. The entries include a block default route pointer field to store a block default route pointer, if any, and a routing field. The route engine may access any level of table array by using a next level route pointer stored in the routing field. Using the block default route and the routing field, the present invention further reduces the number of memory accesses and the update cost for route insertion and deletion by identifying and skipping elements that do not require route updating.

26 Claims, 25 Drawing Sheets

Multi-array Routing Table

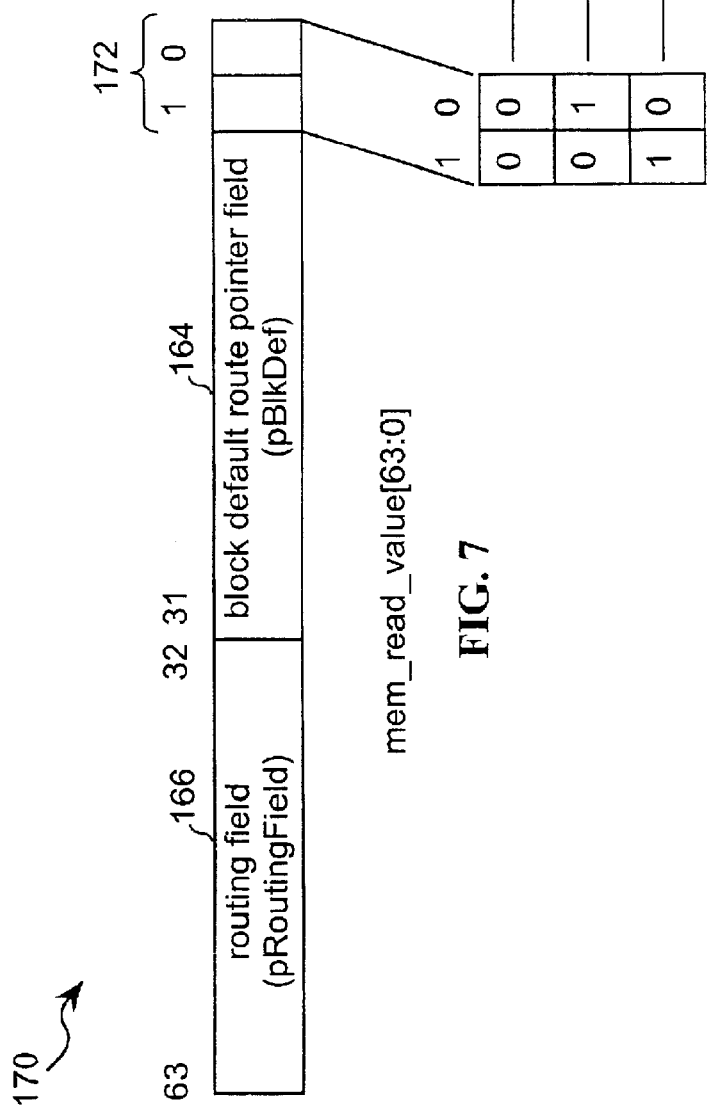

Flowchart for Adding a Route

Flowchart for Adding a Route (continued)

*addRoute(ipa, plen)*
/* *ipa*: destination address of new route,
   *plen*: prefix length of new route */

Level 0, level 1 and level 2 arrays are allocated and next level route pointers in the level 0 and level 1 routes are updated.

*array[]* = the array to which the new route is added
    *begin* = *getIndex(ipa,plen)* /* determine which array and element of that
                                        array stores the new route pointer as a route */
    *nScan* = *getNscan(plen)* /* determine a number of elements to scan */

/* Update the array with the new route */
    *array[begin].pRoutingField* = pointer to the new route /* Update the block default route */
    *i* = *begin* + 1                /* i points to the next element */
    While *nScan*-- > 0
        If *plen* > prefix length of the route pointed by *array[i].pBlkdef* then
            *array[i].pBlkDef* = pointer to the new route
        *i* = *i* + 1

Pseudo code for adding a route

FIG. 13

Memory Write Sequence for Route D Deleted from Level 1 Array

| | |
|---|---|
| Element 0 | Delete D from Routing Field |
| Element 1 | Delete D from Default Route |
| Element 2 | Delete D from Default Route |
| Element 3 | Delete D from Default Route |
| Element 4 | Delete D from Default Route |
| Element 8 | Delete D from Default Route |
| Element 9 | Delete D from Default Route |
| Element 10 | Delete D from Default Route |
| Element 11 | Delete D from Default Route |
| ... | ... |

FIG. 17

Memory Write Sequence for Route D Inserted in Level 1 Array

| | |
|---|---|
| Element 0 | Write D in Routing Field |
| Element 1 | Write D in Default Route |
| Element 2 | Write D in Default Route |
| Element 3 | Write D in Default Route |
| Element 4 | Write D in Default Route |
| Element 8 | Write D in Default Route |
| Element 9 | Write D in Default Route |
| Element 10 | Write D in Default Route |
| Element 11 | Write D in Default Route |
| ... | ... |

FIG. 14

Flowchart for Adding a Route with Automatic Skipping

Flowchart for Adding a Route with Autmatic Skipping (continued)

*addRoute(ipa, plen)*
/* *ipa*: destination address of new route,
   *plen*: prefix length of new route */

Level 0, level 1 and level 2 arrays are allocated and next level route pointers in the level 0 and level 1 routes are updated.

```
array[]  = the array to which the new route is added
begin    = getIndex(ipa,plen)  /* determine which array and element of that
                                   array stores the new route pointer as a route */
nScan    = getNscan(plen)      /* determine a number of elements to scan */

/* Update the array with the new route */
array[begin].pRoutingField = pointer to the new route /* Update the block default route */
i = begin + 1              /* i points to the next element */
While nScan-- > 0
    If plen > prefix length of the route pointed by array[i].pBlkdef then
        array[i].pBlkDef = pointer to the new route
    i = i + 1
If array[i].pRoutingField = Not Null then
    nSkip = getNscan (plen) + 1      /* get number of elements
                                        to be skipped */
    i = i + nSkip          /* jump to the next element after skipping */
```

Pseudo Code for Enhanced Route Addition with Automatic Skipping

FIG. 16

Overlapping Routes

NETWORK ROUTING TABLE AND PACKET ROUTING METHOD

This application claims priority to the U.S. Provisional Patent Application entitled "Network Routing Table", Ser. No. 60/215,653, filed Jun. 30, 2000.

BRIEF DESCRIPTION OF THE INVENTION

The present invention relates generally to packet routing technology in a networked environment such as the Internet, and particularly to packet routing using multi-array routing tables.

BACKGROUND OF THE INVENTION

In packet networks, information is transferred through the network from a source computer to a destination computer using packets called datagrams. The source and destination computers are called hosts. The network is an interconnection of hosts and routers. Typically routers have many network interfaces or ports connecting to other routers and hosts. The routers have input ports for receiving incoming packets and output ports for transmitting outgoing packets. The packets include data from the source computer and a destination address. The routers route the packets to a host or to another router based on the destination address and information stored in a routing table.

In the Internet protocol (IP), a route is either an indirect route or a direct route. When a route is an indirect route, the next destination is another router. A routing table entry indicates the next router's IP address and related information, such as the network interface connecting to the next router. When a route is a direct route, the next destination is the destination host. In this case, the routing table entry indicates the network interface to which the destination host is connected.

A hop is a direct interconnection between two routers, two hosts, or a router and a host. An indirect route has more than one hop to a host, while a direct route has one hop to the host. A next hop is the router or host at the distant end of the hop. A next hop's IP address is the IP address of the router or host at the distant end of the hop.

In one routing table, the information in a route entry includes at least the following: a destination IP address, a prefix length, a next hop's IP address and address port information. The IP address has thirty-two bits. The prefix length specifies the number of leading bits of the IP address defining a network portion of the address. The remaining bits define a host portion of the address. The network portion of the address is often referred to as the IP network address. The entire IP address is usually referred to as the IP host address. For example, using standard Internet dotted decimal notation, 172.16.10.20/24 would indicate an IP prefix length of 24 bits, a network address of 172.16.10.0, and an IP host address of 172.16.10.20.

IP routing is based on either the IP network address or the IP host address. Routes specified with IP network addresses are called network routes. Routes specified with IP host addresses are called host routes. IP routers handle both network and host routes.

When a router receives a packet with a destination address for a host that is not connected to that router, the router routes the packet to another router. Each router has a routing table defining routes or ports to use to route the packet. The routing table stores routing table entries. Each routing table entry includes at least a destination IP address, the prefix length of that destination IP address, the next hop's IP address for that destination, and the network interface (port) to be used for sending a packet to the next router or host. When a routing table entry is a direct route, the next hop's IP address is typically stored as 0.0.0.0. When the route is a host route, the prefix length is set equal to thirty-two.

When searching for a route in the routing table, the router uses the destination IP address of each packet as a search key. Although all packets include a destination IP host address, no packets include the prefix length information. Therefore, routers need to determine which portion of the IP host address includes the IP network address for network routes.

To determine a route, one prior art routing table architecture uses a hash table. In hash-based routing tables, two tables and one special route entry are typically used. The first table, rt_host, is used for host routes and stores IP host addresses and output ports. The second table, rt_net, is used for network routes and stores IP network addresses and their route information. The special route entry specifies a default route. When a packet is being routed, the router searches the first table, rt_host, for host routes, if any. The router performs the search by comparing the destination address to the IP host addresses in the routing table. When no IP host address in the first table matches the destination address, the first table does not specify the host route and the search fails. When the search of the first table fails to find a host route, the router searches the second table, rt_net, to determine a network route, if any, using the destination address and the IP network addresses stored in the second table. When no IP network address in the second table matches the destination address, the second table does not specify the network route and the search fails. When the search of the second table fails to find a network route, the router uses the default route, if specified.

The first and second tables, rt_host and rt_net, respectively, are usually implemented as hash tables. For the first table, rt_host, routers use the entire destination IP host address in the incoming packet as a hash key to determine a starting pointer to a linked list in the first table. A linear search is performed through the linked list to determine whether the destination IP host address matches any entry in the linked list. If so, this matching entry, which has the host route, is returned.

For the second table, rt_net, routers use a set of leading bits of the destination IP host address in the incoming packet as a hash key to determine a starting pointer to a linked list in the second table. The set of leading bits of the destination IP host address is the destination IP network address. Routers determine the prefix length from the traditional IP address class information. The router uses the prefix length to determine the number of leading bits of the destination IP network address to apply as the hash table key. A linear search is then performed through the linked list to determine whether the destination IP network address matches any entry in the linked list. If so, this matching entry, which contains the network route, is returned.

In the second table, rt_net, the linked list is pre-sorted by IP prefix length in descending order. When the second table, rt_net, is searched, the first match will select the longest match of the network portion of the destination address.

The hash-based routing methods are slow because a linear search is performed through the linked list in the hash table. The amount of time to search for a route is a function of the number of entries in the linked list. Therefore, route lookup cannot be done in a predetermined, fixed amount of time. In other words, searches have no fixed upper bound on the amount of time to perform the search.

Another routing table that uses multiple levels of arrays (i.e, a Multi-Array Routing Table (MART)) has a low and deterministic search cost. The search cost of a multi-array routing table is typically two to four routing table memory accesses for Internet protocol version four (IPv4). One advantage of the multi-array routing table is that implementing the search function in hardware has less complexity. In addition, because the multi-array routing table search cost is deterministic, the multi-array routing table search hardware may be pipelined. However, the traditional multi-array routing table has a disadvantage—a highly expensive route update.

In a multi-array routing table described by Pankaj Gupta, Steven Lin, and Nick McKeown in *Routing Lookups in Hardware at Memory Access Speeds*, Proc. Infocom, April 1998, in a worst case, adding a single route incurs 32 million (M) routing table memory accesses (16 M reads and 16 M writes). Although the route update frequency of this multi-array routing table is low, an average of 1.04 updates per second with a maximum of 291 updates per second, a phenomenon known as "route flap" in the Internet core routers is not considered. Route flap causes entire border gateway protocol (BGP) routes to be deleted and added. As of June 2000, the number of BGP routes in the core Internet routes exceeds 52,000.

Consequently, more than 52,000 routes may be deleted and added in a single update even though the average route update frequency is low. Therefore the route update cost should be kept low.

FIG. 1 is a diagram of a traditional multi-array routing table 30 having three levels of arrays. The IPv4 destination address 32 has thirty-two bits and is used as the search key into the multi-array routing table 30. A level 0 array 34 has 65,536 (i.e., 64K) elements 36 and is indexed by the most significant 16 bits of the IPv4 address. A level 1 array 38 has 256 elements and is indexed by bits 8–15 of the destination address. A level 2 array 40 has 256 elements and is indexed by the least significant eight bits of the destination address. Each thirty-two bit IP address can be mapped to one element 36 of the level 0, level 1 or level 2 arrays, 34, 38, 40, respectively.

When a route is added to the multi-array routing table 30 of FIG. 1, all of the array elements corresponding to the destination IP prefix of the route are configured to point to the added route. A destination IP prefix has up to thirty-two bits and is represented by the following format: AA.BB.CC.DD/prefix length, in which each of AA, BB, CC and DD are represented by eight bits, and the prefix length follows the slash "/." For example, in FIG. 1, the tables have been updated with a pointer to route A in accordance with the destination IP prefix of 10.1.1.128/25. Because the specified prefix length of twenty-five exceeds the number of specified bits of the prefixes in the level 0 34 and the level 1 38 tables, the pointer to route A is stored in the level 2 array 40. An index or address to the level 0 array 34 is determined by applying the following relationship to the first sixteen bits of the destination address, "10.1":

2,561=256×10+1.

A pointer 42 to the level 1 array 38 is stored at element 2,561. The next eight bits of the destination address, "1," are used to generate the index into the level 1 array 38. In other words, the pointer 42 to the level 1 array is used as a base address and is added to the next eight bits of the destination address to determine the index 43 into the level 1 array 38. In this example, a pointer 44 to the level 2 array 40 is stored at address 1 in the level 1 array 38. The pointer 44 to the level 2 array 40 will also be added to the last eight bits of the destination addresses to generate an index into the level 2 array 40. Because the specified prefix length is equal to twenty-five, all routes associated with the first twenty-five bits of the destination address are updated with the pointer to route A. The level 0 and level 1 arrays, 34 and 38, respectively, are associated with the first twenty-four bits of the destination address. In this example, the last portion of the prefix, "128," is specified, and the "128" in combination with the prefix length of twenty-five corresponds to "1xxx xxxx" in binary, in which the x designates that the state of the bit is unknown. Therefore, the "1" in the twenty-fifth bit is associated with a range of addresses—128–255. In the level 2 array 40, the elements from addresses 128 to 255 correspond to the address of 10.1.128/25 and have pointers to route A.

In an example of a search, when the search key is equal to 10.1.1.130, the level 0 array 34 and level 1 array 38 will be accessed as described above to determine the pointer 44 to the level 2 array 40. The index 45 to the level two array 40 will be generated as described above, and the pointer to route A at address 130 in level 2 array 40 will be returned. The multi-array routing table 30 of FIG. 1 always finishes a lookup with three or fewer memory accesses of the routing table.

Assume that a new route, referred to as route B, whose destination IP prefix is equal to 10/8 is to be inserted to the multi-array routing table 30. To determine the associated addresses in the level 0 table 34, the destination IP prefix of 10/8 is represented as "0000 1010 xxxx xxxx xxxx xxxx xxxx xxxx" in binary. Therefore, the prefix 10/8 is associated with a range of addresses, 2,560–2,815, in the level 0 array 34. The contents of the elements of the range of addresses and any arrays pointed to by those elements need to be examined and updated appropriately with the new route information. Pseudo code for adding the new route, route B, is shown below:

Pseudo-Code for adding a route to the multi-array routing table of FIG. 1

```
For i = 2,560 (10.0) to 2,815 (10.255)    /* Set range of addresses in the
                                             level 0 table to be updated */
    If level-0[i] is connected to a level 1 array then
        level-1[] = connected array
        For j = 0 to 255                 /* Access all elements of the
                                             level 1 table */
            If level-1[j] is connected to a level 2 array then
                level-2[] = connected array
                For k = 0 to 255    /* Access all elements of the
                                             level 2 table */
                    If level-2[k] is empty or
                        level-2[k]'s prefix length < 8 then
                        level2[k] = B
            Else if level-1[j] is empty or
                level-1[j]'s prefix length < 8 then
                level-1[j] = B
        Else if level-0[i] is empty or
            level0[i]'s prefix length < 8 then
            level0[i] = B
```

The pseudo code compares the prefix length of the existing and new routes before a updating an element so that route pointers associated with the longest matching prefix length are stored in the routing table.

The cost of adding a route to the routing table is expensive using the pseudo code above. In the worst case, 16 M (256×256×256) routing table memory reads and 16 M routing table memory writes are performed to add route B to the multi-array routing table 30.

For an example of route deletion, assume now that route A is to be removed from the multi-array routing table 30. The contents of elements 128 to 255 of the level 2 array 40 are replaced with the new longest-matching route after route A is removed, which is route B. One technique of finding the newest longest matching route is to backtrack among the arrays and array elements, reading the contents of each element and comparing the contents of a most recently read element to a current longest-matching route to determine whether the most recently read element specifies the longest-matching route. Therefore, deleting route A requires numerous memory accesses and is expensive.

The paper of Pankaj et al. teaches that 99.93% of the prefix lengths of the MAE-EAST routing table data are less than twenty-four and assumes that the multi-array routing table 30 does not require a large number of deep level arrays. However, the MAE-EAST routing table data includes only BGP routes. In practice, Internet Service Provider (ISP) routers have both BGP and Interior Gateway Protocol (IGP) routes in their routing tables, and the prefix length of most IGP routes is longer than twenty-four. The number of IGP routes in an ISP's router is typically not disclosed because the size of their network and the number of their customers can be estimated from the number of IGP routes. Despite this lack of IGP data, it is likely that large ISPs may have more than 1,000 IGP routes, and therefore, the multi-array routing table 30 of FIG. 1 would have many deep level arrays. Increasing the number of deep level arrays increases the route update cost of the traditional multi-array routing table exponentially. Therefore, an apparatus and method that reduces the cost of updating a multi-array routing table is needed.

SUMMARY OF THE INVENTION

In summary, the present invention is a method and system for providing a router and efficiently maintaining the router. The present invention provides a router having one or more input ports for receiving a message having a message destination address. The router has output ports for transmitting the message. One embodiment of the invention provides a routing table circuit that comprises a route engine and one or more routing table memories storing a plurality of routing table arrays. The routing table arrays are arranged hierarchically in a plurality of levels, and each routing table array is associated with a predetermined subset of prefixes of the IP address. Each routing table has a plurality of entries. The entries include a block default route pointer field to store a block default route pointer, if any, and a routing field. The routing field may store a route pointer or a next level pointer to one of the routing tables in another level. A route engine selects the block default route pointer or the route pointer as a return route pointer based on the destination address. The return route pointer determines which one of the output ports routes the message. The route engine is also capable of accessing routing table arrays in different levels based on the next level route pointer.

In another embodiment of the invention, a subset of the routing table arrays is associated with a table default route field in addition to the block default route field for each entry. In certain circumstances, the table default route field may be updated with a table default route rather than updating the block default route for each entry.

By providing a block default route in addition to the routing field for each entry, the block default route and the routing field may be retrieved in the same memory access, reducing the number of memory accesses and the update cost. In addition, the use of table default route further reduces the number of memory accesses and therefore the update cost. Because the number of levels in the routing table is predetermined, the routing table circuit performs a search in a fixed amount of time.

Using the block default route and the routing field, the present invention further reduces the number of memory accesses and the update cost for route insertion and deletion by identifying a group of elements that have default routes of a greater prefix length than the inserted or deleted route's prefix length. The identified group of elements are automatically skipped without memory access or route updating because their default routes do not require route updating. The gain in performance increases as the number of skipped elements increases.

BRIEF DESCRIPTION OF THE DRAWINGS

Additional objects and features of the invention will be more readily apparent from the following detailed description and appended claims when taken in conjunction with the drawings, in which:

FIG. 7 is a diagram of an exemplary structure of an element of the multi-array routing table of FIG. 6.

FIG. 8 is a diagram of an exemplary tag field of a block default route pointer field of the element of FIG. 7.

FIG. 13 is pseudo code for adding a route in accordance with another embodiment of the present invention.

FIG. 14 is a memory access sequence for insertion of route D into the level 1 array of FIG. 9 in accordance with an alternate embodiment of the invention.

FIG. 16 is pseudo code to add a route to the routing table by an enhanced route addition process in accordance with an alternate embodiment of the invention.

FIG. 17 a memory access sequence for deletion of route D from the level 1 array of FIG. 10 in accordance with an alternate embodiment of the invention.

DESCRIPTION OF THE PREFERRED EMBODIMENTS

Figure 2:
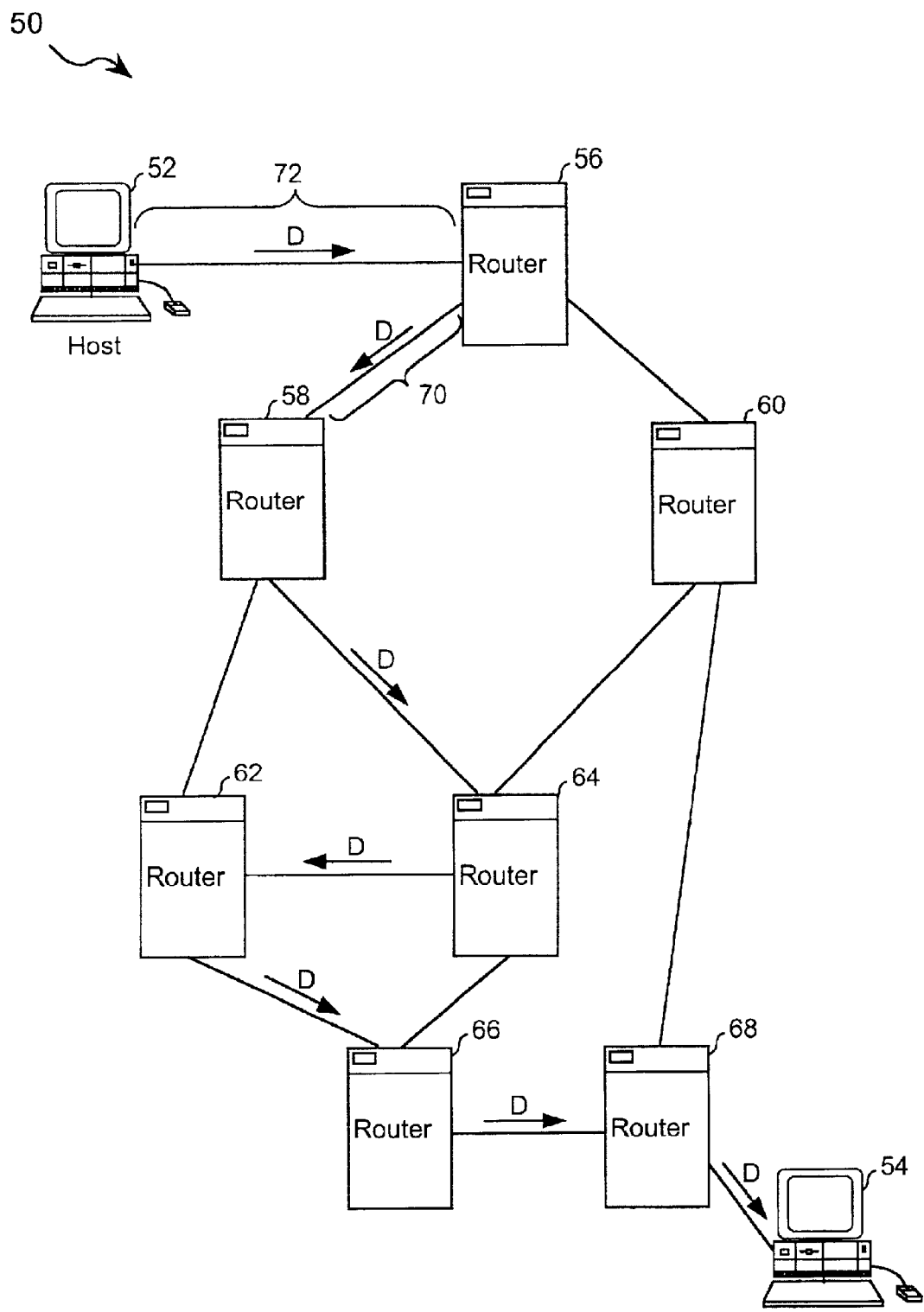
FIG. 2 is a diagram of an exemplary network of hosts and routers using the routing table of the present invention.

In FIG. 2, in an exemplary packet network 50, a source host computer 52 sends Ace information to a destination host computer 54. The source host computer 52 places the information in one or more datagrams or packets P and sends that information to the destination host computer 54 via a network of routers 56–68. An exemplary hop 70 interconnects two routers. Another exemplary hop 72 interconnects a router 56 and a host 52. The arrows show the path of the datagram/packet P through the network of routers 56–68 to the destination host computer 54. The routers 56–68 use the routing table of the present invention.

Figure 3:
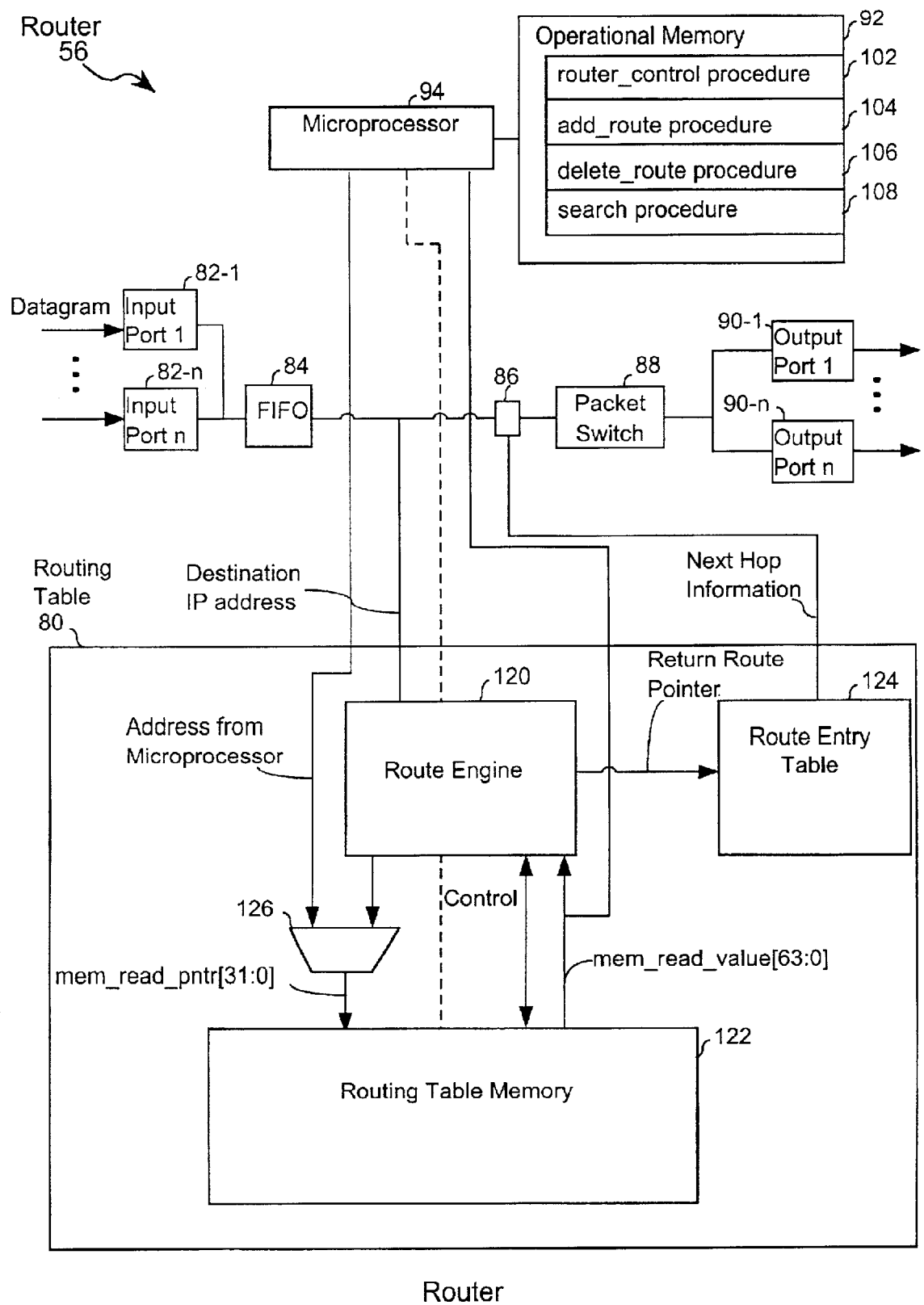
FIG. 3 is a block diagram of a router including a routing table according to one embodiment of the present invention.

In FIG. 3, the router 56 uses the routing table 80 of the present invention to search for a route corresponding to a destination address in a fixed, deterministic, amount of time. The router 56 includes:

input ports 82 that receive packets;

a first-in-first-out (FIFO) buffer 84 that stores the packets as the packets are received by the input ports 82 and that outputs the packets for routing in FIFO order;

prepend address logic 86 that prepends a next hop identifier to a packet;

a packet switch 88 that routes a packet received from the prepend address logic 86 to one of the output ports 90 in accordance with the next hop identifier;

output ports 90 over which to transmit packets;

a memory 92, such as semiconductor memory including RAM and ROM, that stores router procedures;

a microprocessor 94 that executes the router procedures stored in the memory 92; and the routing table 80 of the present invention which will be described in further detail below.

The memory 92 stores sets of instructions to be executed by the microprocessor 54, called procedures, and data. The memory 92 stores the following procedures:

a router_control procedure 102 that controls the overall operation of the router 56;

an add_route procedure 104, called by the router_control procedure 102, that adds a new route to the routing table 80;

a delete_route procedure 106, called by the router_control procedure 102, that deletes an existing route from the routing table 80; and a search procedure 108, called by the router_control procedure 102 to search for a specified route in the routing table 80; in one embodiment, the search procedure 108 is implemented in software; in an alternate embodiment, the search procedure 108 configures the routing table 80 and the search is implemented in hardware in the routing table 80.

The routing table 80 determines whether at least a portion of the destination address matches a stored address and supplies next hop information to the prepend address logic 86 based on a match, if any, between at least a portion of the destination address and the stored address. The routing table 80 includes a route engine 120, a routing table memory 122 and a route entry table 124. The route engine 120 searches the routing table memory 122 for a match to a destination address in a deterministic amount of time. The route engine 120 supplies control signals and an address to the routing table memory 122 and provides a return route pointer to the route entry table 124. The routing table memory 122 is a multi-level memory having a multi-array routing table architecture that reduces the update cost. The microprocessor 94 reads from and writes to the routing table memory 122 via the route engine 120.

A search/update multiplexor 126 supplies either the address generated by the route engine 120 (mem_read_pntr[31:0]) or an address supplied by the microprocessor 94 to the routing table memory 122. When searching, the route engine 120 supplies the address. When adding a route to or deleting a route from the routing table memory 122, the microprocessor 94 supplies the address. In this description, the term mem_read_pntr[31:0] is used to refer to both the address generated by the route engine 120 and the output of the search/update multiplexor 126, because the route engine 120 supplies the mem_read_pntr[31:0] to the routing table memory 122 during a search. The data (mem_read_value[63:0]) read from the routing table memory 122 is supplied to the route engine 120 and to the microprocessor 94. The dashed line represents control signals from the microprocessor 94, route engine 120 and routing table memory 122.

Figure 4:
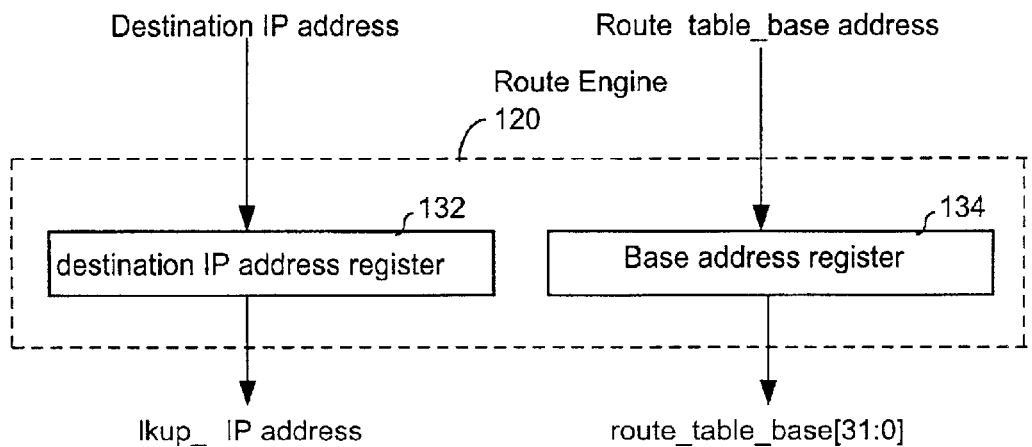
FIG. 4 is a block diagram of a destination address register and a base address register of a route engine of FIG. 3.

Referring to FIG. 4, the route engine 120 stores the destination IP address in a destination IP address register 132 and provides the stored destination IP address to the routing table memory 122 as a lookup IP address, called Ikup_IP address. The route engine 120 also stores a routing table base address in a base address register 134. Based on the destination address and the base address, the route engine 120 generates an address, called mem_read_pntr[31:0], to access an element in the routing table memory 122. In response to the address, the routing table memory 122 returns data, called a mem_read_value[63:0]. The mem_read_pntr has thirty-two bits, and the mem_read_value has sixty-four bits. The route engine 120 provides a portion of the mem_read_value as a return route pointer that specifies a desired route for the message. The return route pointer is used to access the route entry table 124.

Figure 5:
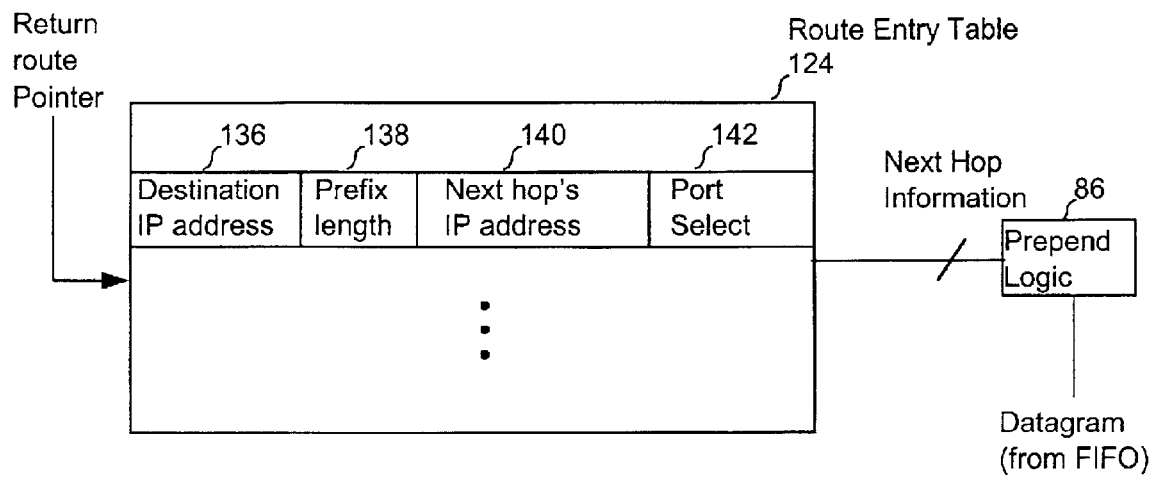
FIG. 5 is a block diagram of a route entry table of the routing table of FIG. 3.

In FIG. 5, the route entry table 124 stores a destination IP address 136, a prefix length 138, a next hop's IP address 140 and address port information 142 that is associated with the return route pointers. Based on the return route pointer, the route entry table 124 supplies the next hop information to the prepend address logic 86.

Figure 1:
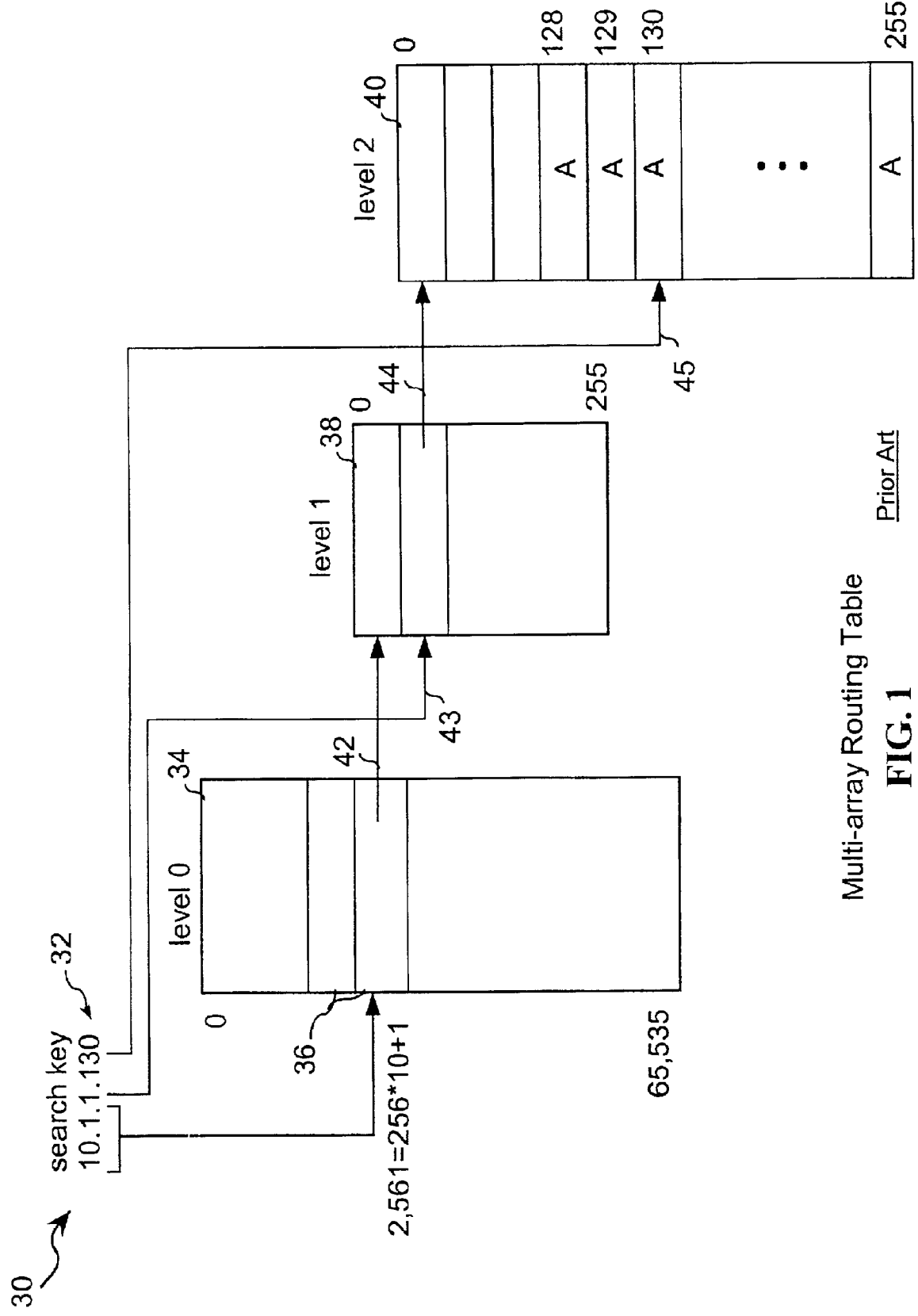
FIG. 1 is a diagram of a multi-array routing table of the prior art.

The primary reason that the prior art multi-array routing table of FIG. 1 has a high route update cost is that all the array elements corresponding to the destination IP prefix of a route point to the route, and it may be necessary to access all the corresponding array elements when updating the routing table.

Figure 6:
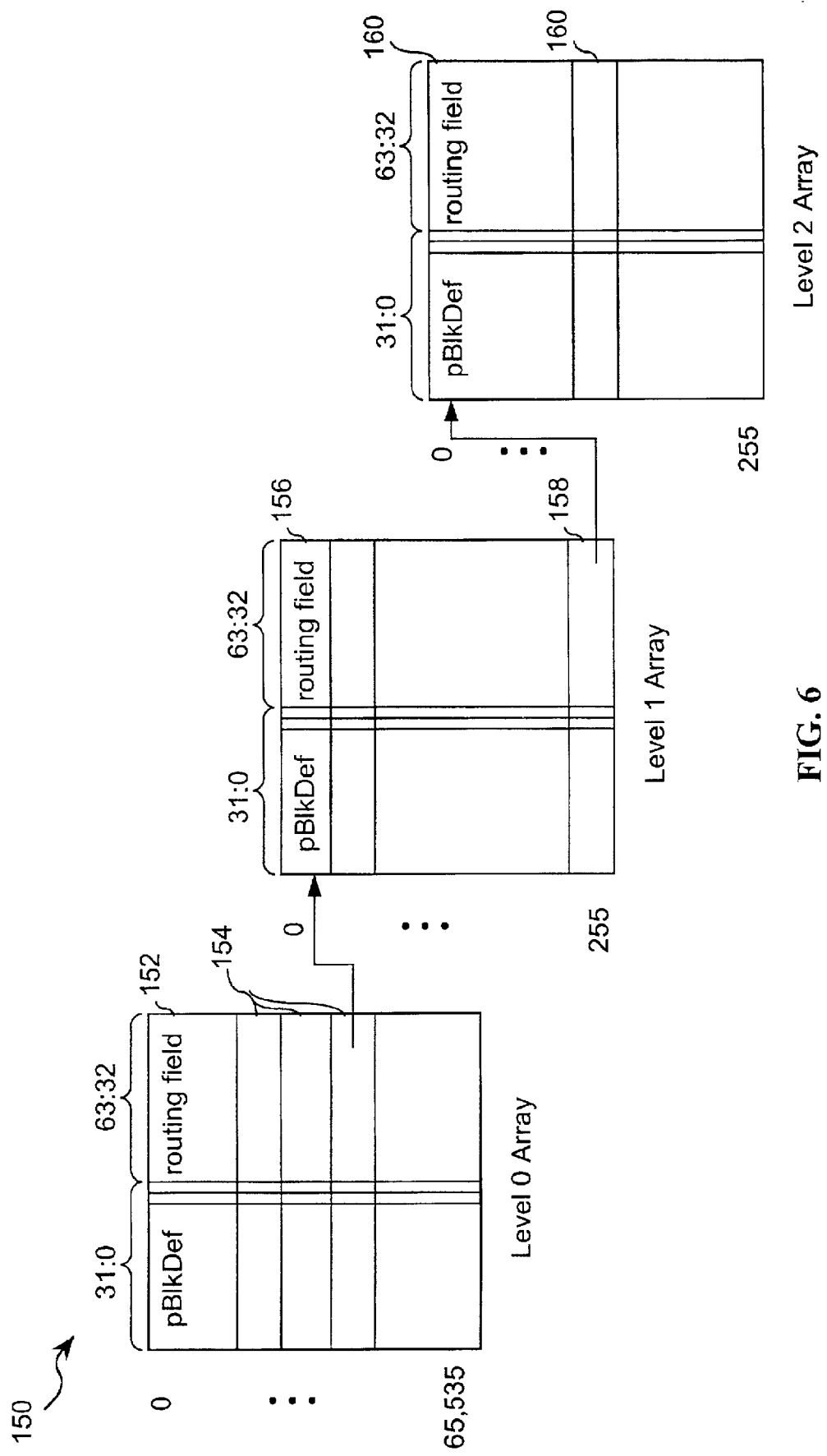
FIG. 6 is a block diagram of a multi-array routing table of FIG. 3 in accordance with an embodiment of the present invention.

Referring to FIG. 6, a multi-array routing table 150 implements the routing table memory of FIG. 3 in accordance with an embodiment of the present invention. The multi-array routing table 150 reduces the number of pointers that may point to the same route, thereby reducing the number of memory accesses to update the routing table and reducing cost.

The multi-array routing table 150 has three levels of routing table arrays. A level zero array 152 is associated with the first sixteen bits of the destination address and has 65,536 elements 154 with addresses ranging from 0 to 65,535. Each element is associated with a distinct sixteen bits of the destination address. In an alternate embodiment, the base address is added to the previous range of element addresses to change the element addresses. For example, if the base address is equal to 100, then the range of addresses associated with the elements is 100 to 65,635. For simplicity, in the following description, the base address is equal to zero. A level one array 156 is associated with the next eight bits of the destination address and has 256 elements 158 with addresses ranging from 0 to 255. At most, the routing table 150 may have up to 65,536 level one arrays, one level one array 156 for each element of the level zero array 152. A level two array 160 is associated with the last eight bits of the destination address and has 256 elements 152 with addresses ranging from 0 to 255. At most, the routing table 150 may have up to 16,777,216 (i.e., 65,636×256) level two arrays 160. In an alternate embodiment, the level one and level two arrays are associated with respective base addresses which are added to the respective address ranges of the level one and level two arrays.

To reduce the number of memory accesses when updating the multi-array routing table, each element 154, 158 and 160, in the level zero, one and two arrays, 152, 156 and 160, respectively, includes a block default route pointer (pBlkDef) field and a routing field. The pointer stored in the routing field 166 may be a pointer to a next level array or a route pointer. The route pointer points to a known route in the route entry table having the longest-matching route for the destination address. When there is no route pointer or next level array pointer for that element, the block default route is associated with the longest-matching route for the element. When the route pointer is populated, the block default route is associated with a route having the "second" longest matching route known to the router for that array element. When the router receives a message with a destination address and the search ends at an element whose tag field is NULL, the router uses the block default route, if any, that may be associated with the destination address to route the message. The routing fields and block default routes are populated and updated when routes are added and deleted.

Referring also to FIG. 7, the structure of an exemplary element 170 is shown in further detail. The block default route pointer field 164 stores the block default route pointer and is specified by bits 31-0. The block default route pointer field 164 also includes a tag field 172. The tag field 172 is specified by bits 1 and 0 of the block default route pointer field 154. The routing field 166 is specified by bits 63-32. The routing field may store either a pointer to a next level array or a route pointer to a specified route. The route pointer is associated with a route having the longest prefix known to the router for the corresponding portion of the destination address associated with an element, (i.e., a longest-matching route).

Referring also to FIG. 8, the tag field 172 is used to indicate whether the routing field 166 has a next level pointer or a route pointer. In one implementation, the routing field is implemented as a union data structure. Based on the tag field 172, the route engine 120 determines whether the block default route pointer, if any, or the route pointer, if any, in the routing field, is supplied as the return route pointer, or whether the next level array is accessed.

When the tag field 172 is equal to "00," the routing field 166 does not store a next level array pointer. When the tag field 172 is equal to "01," the routing field 166 stores a route pointer, and the route engine returns the route pointer as the return route pointer. When the tag field 172 is equal to "10," the routing field 166 stores a next level array pointer. During a search, when the tag field is not equal to "01" or "10," the route engine returns the block default route as the return route pointer.

Adding a Route

When adding a route, the add_route procedure 104 of FIG. 3 is invoked. Using the multi-array routing table of the present invention, the add_route procedure uses fewer memory accesses than the prior art procedure to add a route to the multi-array routing table of FIG. 1. The addition of a route will be explained by way of example, followed by a flowchart and exemplary pseudo code.

Figure 9:
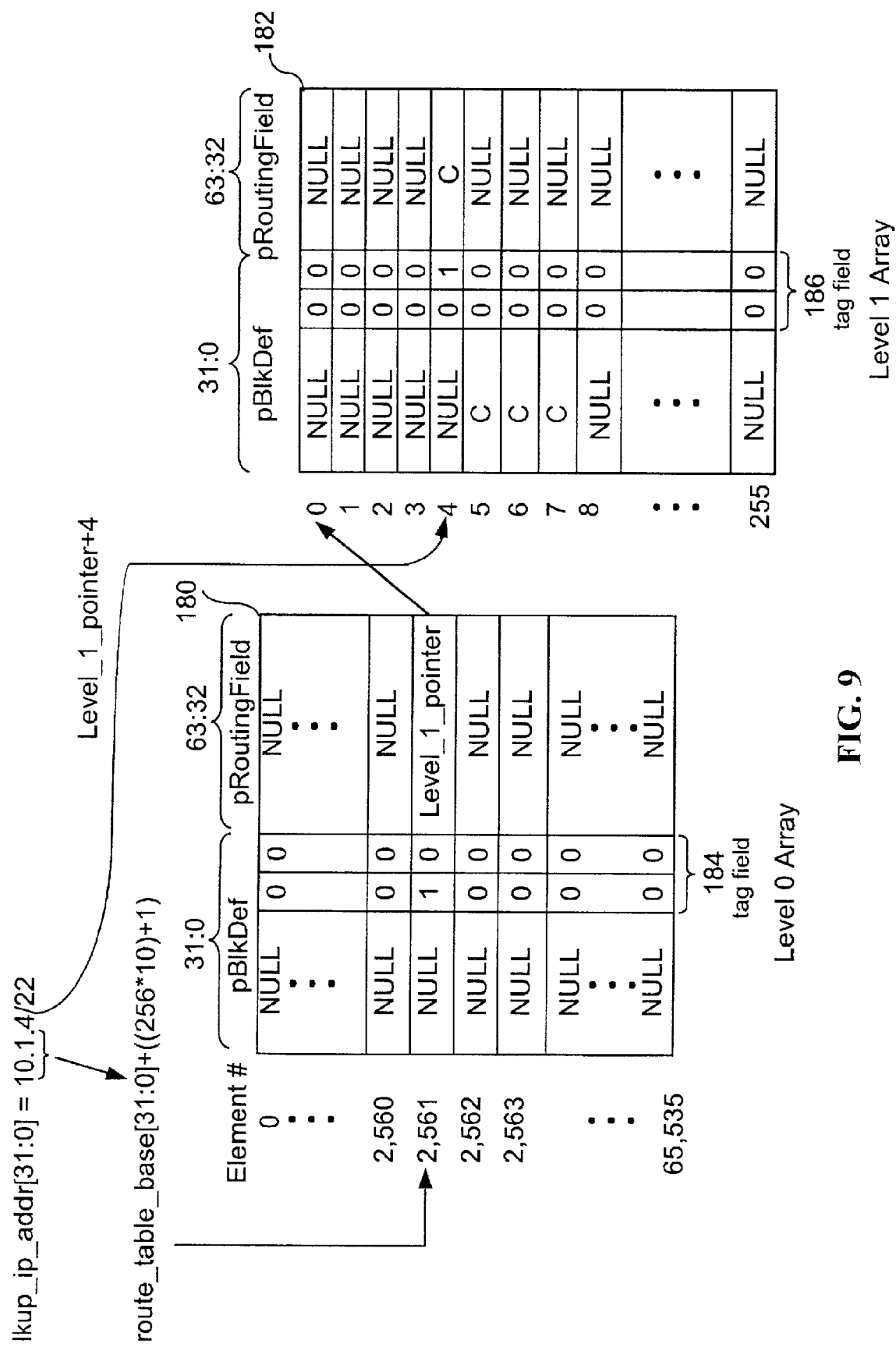
FIG. 9 is a block diagram of the multi-array routing table of FIG. 6 illustrating the addition of a route to the routing table.

Referring to FIG. 9, a route, represented by route pointer C, has been added to the routing table of the present invention. To illustrate the method of adding a route to the routing table, assume that the level 0 array 180 is empty, that is, initialized with NULLs, and no level 1 arrays have been allocated. In one embodiment, a NULL is represented by all zeroes. A new route whose destination IP prefix is 10.1.4/22, represented by route pointer C, is received. The new route is added as follows:

1. A level 1 array (i.e., level-1[ ]) 182 is allocated.
2. An index based on the first sixteen bits of the prefix, "10.1," is generated to point to element 2,561 (10.1) of the level 0 array. In this example, the base address of the routing table (route_table_base[31:0]) is equal to zero. The routing field of element 2,561 is set to point to the base address of the level 1 array, level-1[ ] 182. The tag field 184 is set equal to "10" to indicate that the routing field stores a next level pointer.
3. An index based on the next eight bits of the prefix, "4," and the base address of the level 1 array 182 is generated and points to element 4. The new route pointer, C, is stored in the routing field of element four. Exemplary pseudo code to store the new route pointer, C, in element four of the level 1 array 182 is as follows: level-1[4].pRoutingField=C The tag field 186 of element four is set equal to a "01" to indicate that the routing field stores a route pointer.

4. Because the new prefix length of twenty-two is less than the total prefix length of twenty-four included in the level 0 and level 1 arrays, the new prefix length "covers" three more routes. Therefore the block default route fields (pBlkDef) for elements 5, 6 and 7 of the level 1 array 182 are set equal to the new route pointer C. Exemplary pseudo code to store the new route pointer, C, in the block default route fields of elements 5, 6 and 7 of the level 1 array 182 is as follows: level-1[5–7].pBlkDef=C.

In particular, the block default route fields of elements 5, 6 and 7 of the level 1 array 182 are set equal to the new route pointer, C, if the value of the current block default route pointer field is NULL or the current prefix length of a destination IP prefix stored in the block default route is less than the new prefix length of twenty-two. The tag field 186 is set equal to "00" to indicate that the routing field does not store a valid pointer.

FIG. 9 shows the level 0 and the level 1 arrays, 180 and 182, respectively, after route C has been added. The block default route of element 4 (i.e., the route pointed to by level-1[4].pBlkDey) is not route C itself because the block default route is the "second" longest-matching route of the associated element. Route C is the longest-matching route of element 4, and, at this point, element four has no "second" longest-matching route.

Figure 10:
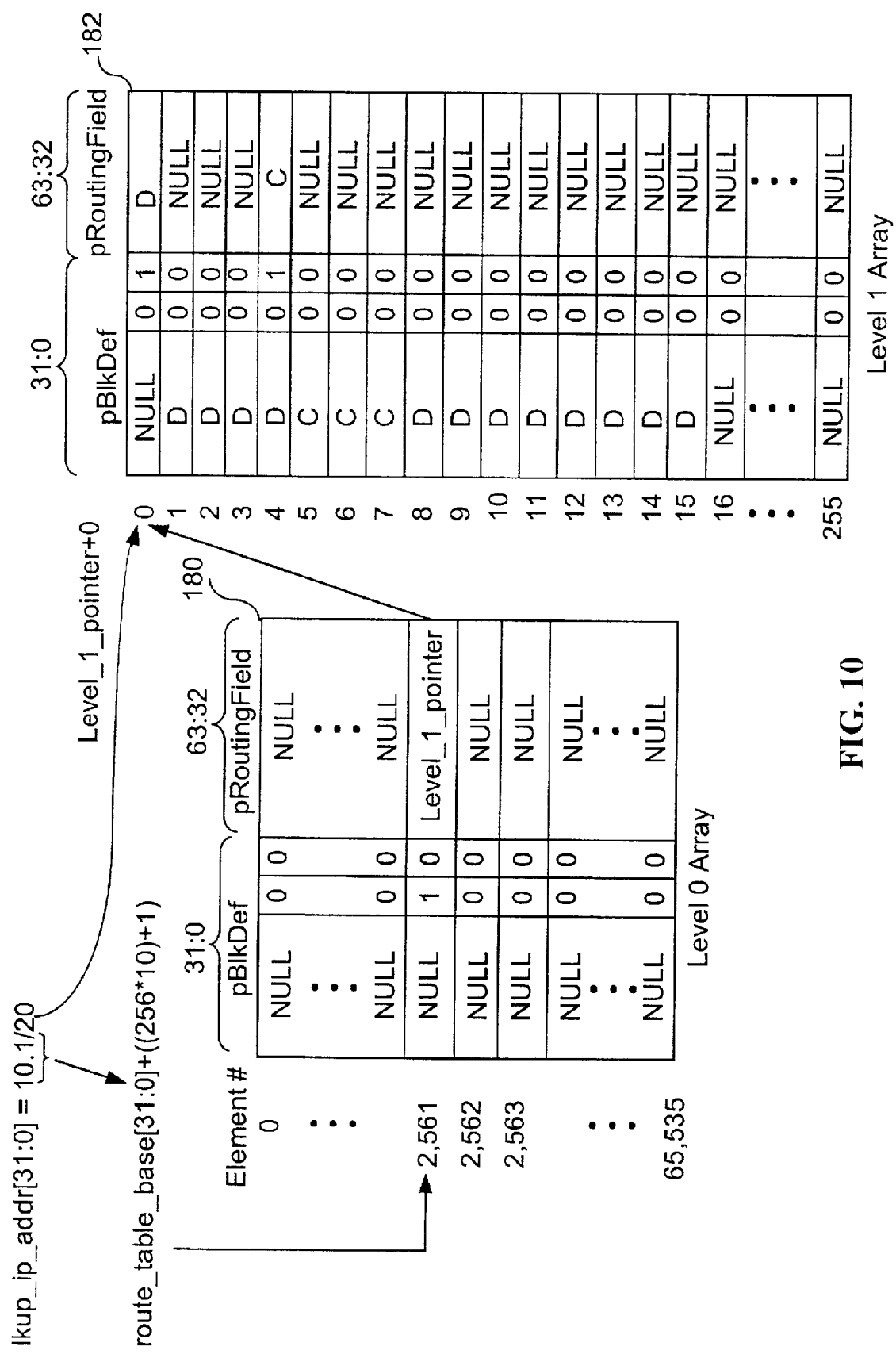
FIG. 10 is a block diagram of the multi-array routing table of FIG. 9 illustrating the addition of another route to the routing table.

Referring to FIG. 10, a second route, represented by route pointer D, has been added to the routing table of FIG. 9. Initially, new route D is received with a new route destination IP prefix of 10.1/20. The first sixteen bits of the prefix, "10.1," generate an index to element 2,561 which already points to a level one table. Using pseudo code, the route insert process in this example is as follows:

insert/*add new route*/
1. level-1[0].pRoutingField=route pointer D; set tag bits to equal "01";
2. level-1[1–15].pBlkDef are set equal to route pointer D if their value is NULL or the prefix length of the destination IP prefix currently stored in their block default route is less than the new prefix length of the new destination IP prefix of twenty; and the tag bits remain unchanged.

In this example, the block default routes of elements 5, 6 and 7 are not changed because the block default routes of elements 5, 6 and 7 already store a pointer to route C and the prefix length of route C is equal to twenty-two which is greater than the new destination IP prefix length of twenty. FIG. 10 shows the routing table and the level 1 array after route D is added.

Figure 11:
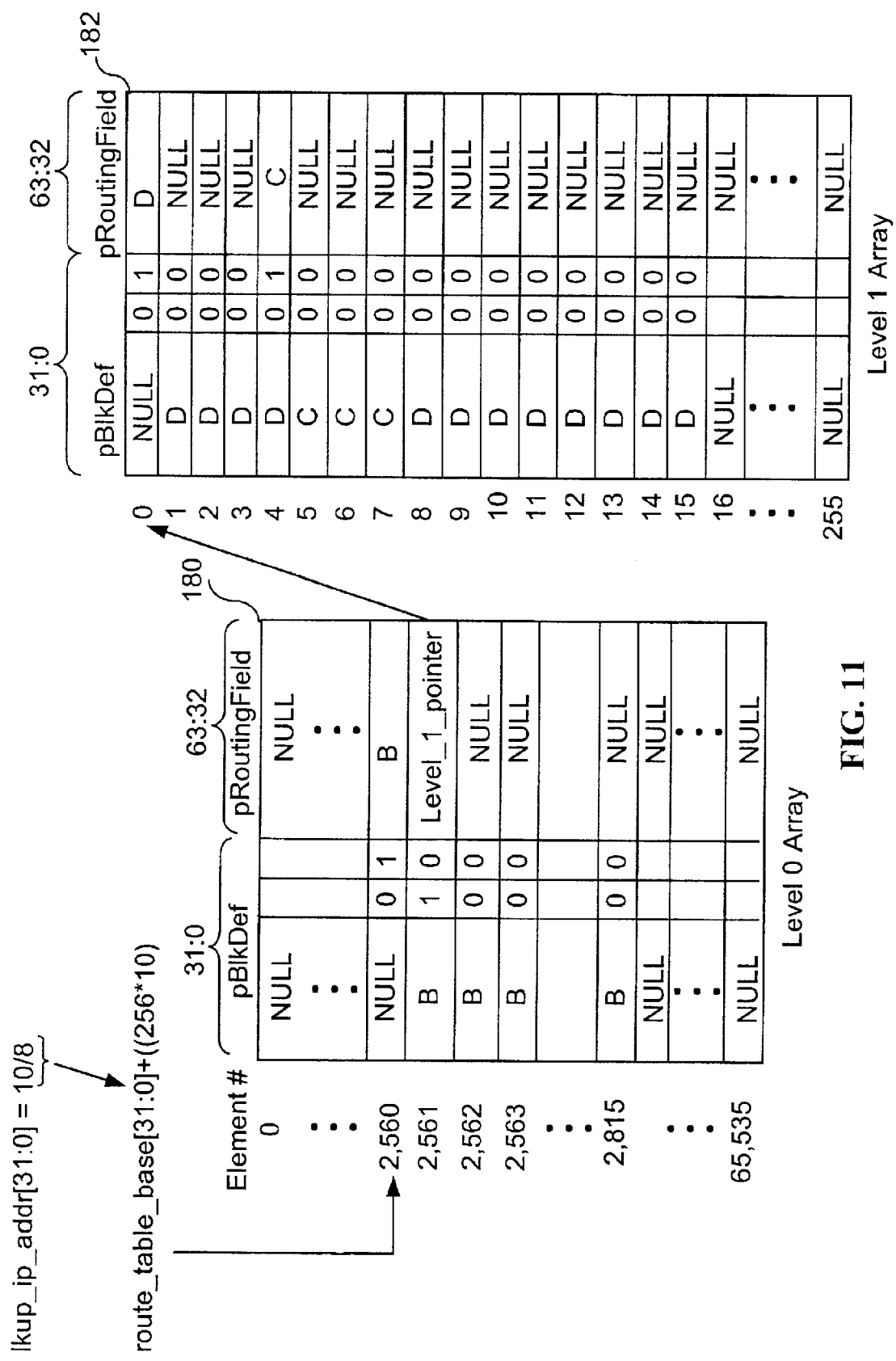
FIG. 11 is a block diagram of the multi-array routing table of FIG. 9 illustrating the addition of yet another route to the routing table.

Referring now to FIG. 11, another route, represented by route pointer B, has been added to the routing table. Route B has a destination IP prefix of 10/8, and the prefix length of eight is less than the threshold prefix length of the level 0 array 180. Therefore, the block default routes for a subset of the elements of the level 0 array 180 may need to be updated. In this case, using pseudo code, the route addition proceeds as follows:

1. level-0[2,560(10.0)].pRoutingField=B/* level-0[ ] is the level 0 array.*/ and the tag bits are set equal to "01";
2. level-0[2,561(10.1)–2,815 (10.255)].pBlkDef=route pointer B if their value is NULL or the prefix length of the current block default route stored in that element is less than eight; and the tag bits remain unchanged.

In this example, neither the level 1 array nor the level 2 array is accessed. FIG. 11 illustrates the routing table after route B has been added.

Figure 12A:
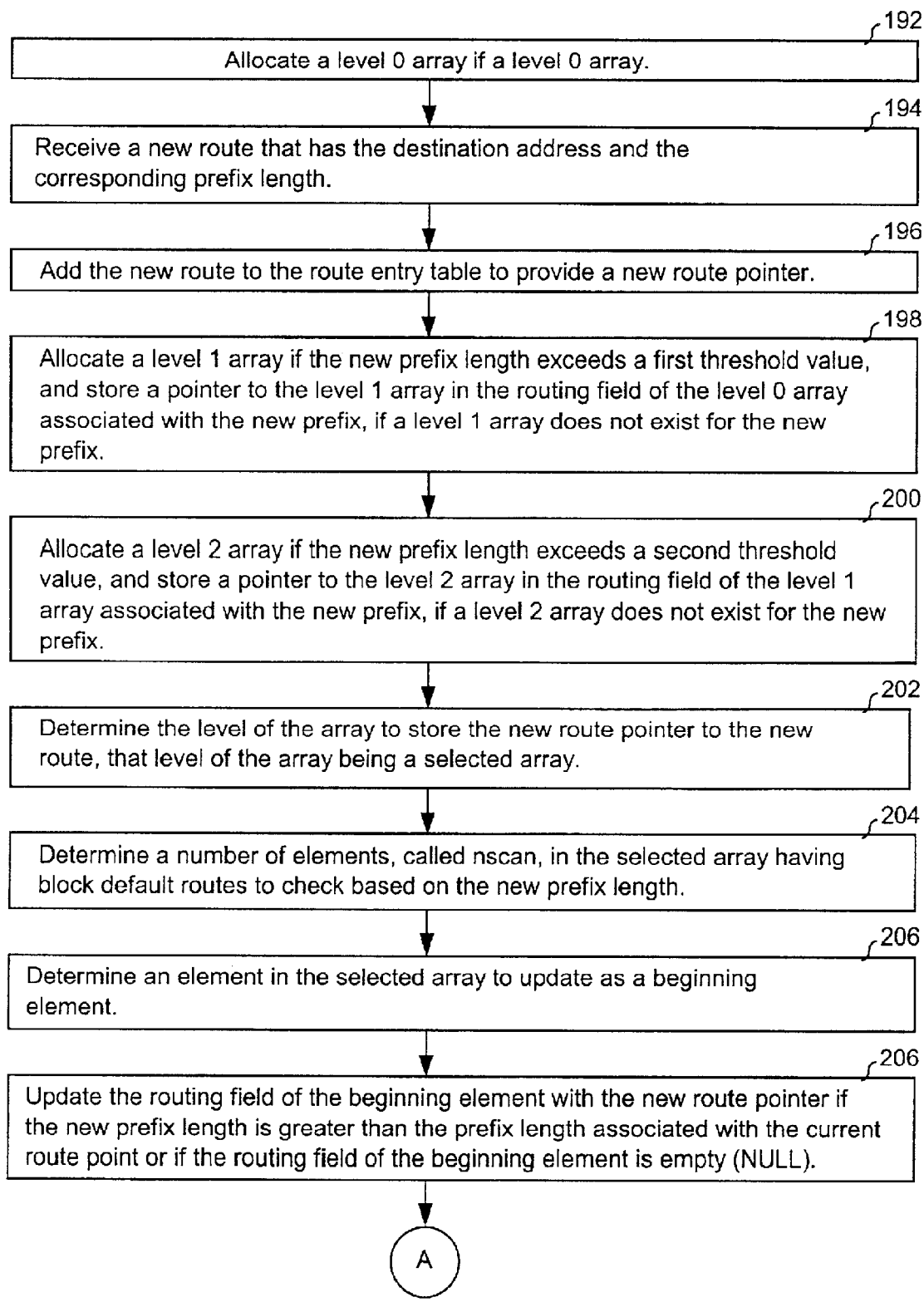
FIGS. 12A and 12B are a flowchart of a method for adding a route in accordance with an embodiment of the present invention.
Figure 12B:
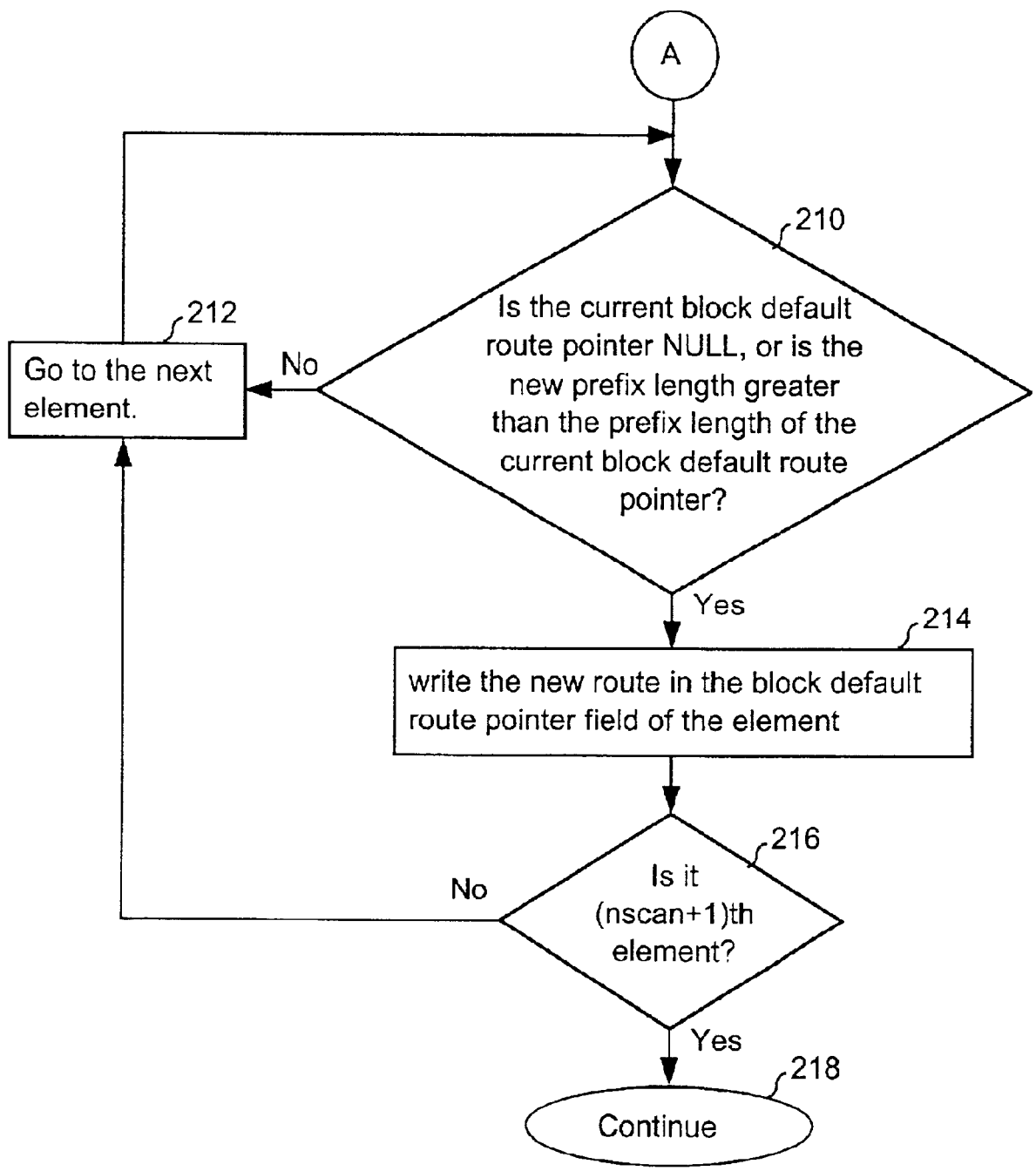

FIGS. 12A and 12B are a flowchart of a method for adding a route in accordance with one embodiment of the present invention. In this embodiment, the flowchart of FIGS. 12A and 12B is used to implement the add_route procedure 104 of FIG. 3. In step 192, a level 0 array is allocated. In step 194, a destination address is received with a new route. The new route has a new prefix, which comprises a destination address and the corresponding prefix length. In step 196, the new route and its prefix is added to the route entry table to provide a new route pointer. The new route pointer will be used to update the multi-array routing table.

In step 198, if a level 1 array for the new prefix does not exist, a level 1 array is allocated if the new prefix length exceeds a first threshold value. In one embodiment, the first threshold value is equal to sixteen. A pointer to the level 1 array is stored in the routing field of the level 0 array that is associated with the new prefix.

In step 200, if a level 2 array for the new prefix does not exist, a level 2 array is allocated if the new prefix length exceeds a second threshold value. In one embodiment, the second threshold value is equal to twenty-four. When a level 2 array is allocated, a pointer to the level 2 array is stored in the routing field of the level 1 array that is associated with the new prefix.

In step 202, the level of an array representing the level of the array at which to store the new route pointer in the routing field is determined as a selected array. In step 204, a number of elements, called nscan, in the selected array to scan for updating the respective block default routes with the new route pointer is determined based on the new prefix length. In step 206, an element in the selected array is determined as a beginning element for updating the block default routes.

In step 208, the routing field of the beginning element is updated with the new route pointer if the new prefix length is greater than the prefix length associated with the current route pointer or if the routing field of the beginning element is empty (NULL).

In step 210, starting with the next element following the starting element, the current block default route pointer from the block default route pointer field for the element is read in order to determine whether the current block default route pointer is empty (NULL) or whether the new prefix length is greater than the prefix length of the current block default route pointer. If so, the new block default route pointer is written in the block default route pointer field for the element in step 214. If not, the invention proceeds to the next element in step 212. This process is repeated until nscan elements have been accessed and updated. When the addition procedure reaches (nscan+1)th element after the starting element in step 216, the addition procedure has been completed, and the system continues to step 218. Otherwise, the addition procedure proceeds to the next element in step 212.

FIG. 13 shows exemplary pseudo code addRoute1 to add a route to the routing table. The flowchart of FIGS. 12(A) and 12(B) and the pseudo code of FIG. 13 for the routing table of the present invention require fewer routing table memory accesses than the routing table of FIG. 1. Using the pseudo code of FIG. 13, the maximum number of routing table memory accesses when adding a route is 511—255 reads and 256 writes.

In an alternate embodiment of the invention, the number of memory access to elements in a routing table is further reduced by an enhanced route addition algorithm. In this embodiment, the route addition algorithm takes advantage of the fact that some elements in the routing table array may have default routes that are more specific than the new route, and thus need not be updated. For example, suppose a new route D is added to the level 1 array shown in FIG. 9. In FIG. 9, elements 5, 6 and 7 of the level 1 array already have route C as their default route. Because route C is more specific than new route D, or alternatively, the prefix length (22) of route C is greater than the new route D's IP prefix length of twenty (20), there is no need to access and update elements 5, 6 and 7. The enhanced route addition algorithm recognizes this fact and provides a mechanism to automatically skip elements 5, 6 and 7 without changing their default routes, thereby further reducing the processing time and the cost of new route insertion. FIG. 14 shows the memory access sequence for this embodiment of route addition algorithm for the insertion of route D into the level 1 array of FIG. 9. As can be seen in FIG. 14, the enhanced route addition algorithm makes a direct jump from element 4 to element 8, eliminating the need for memory access to elements 5, 6, and 7.

Figure 15A:
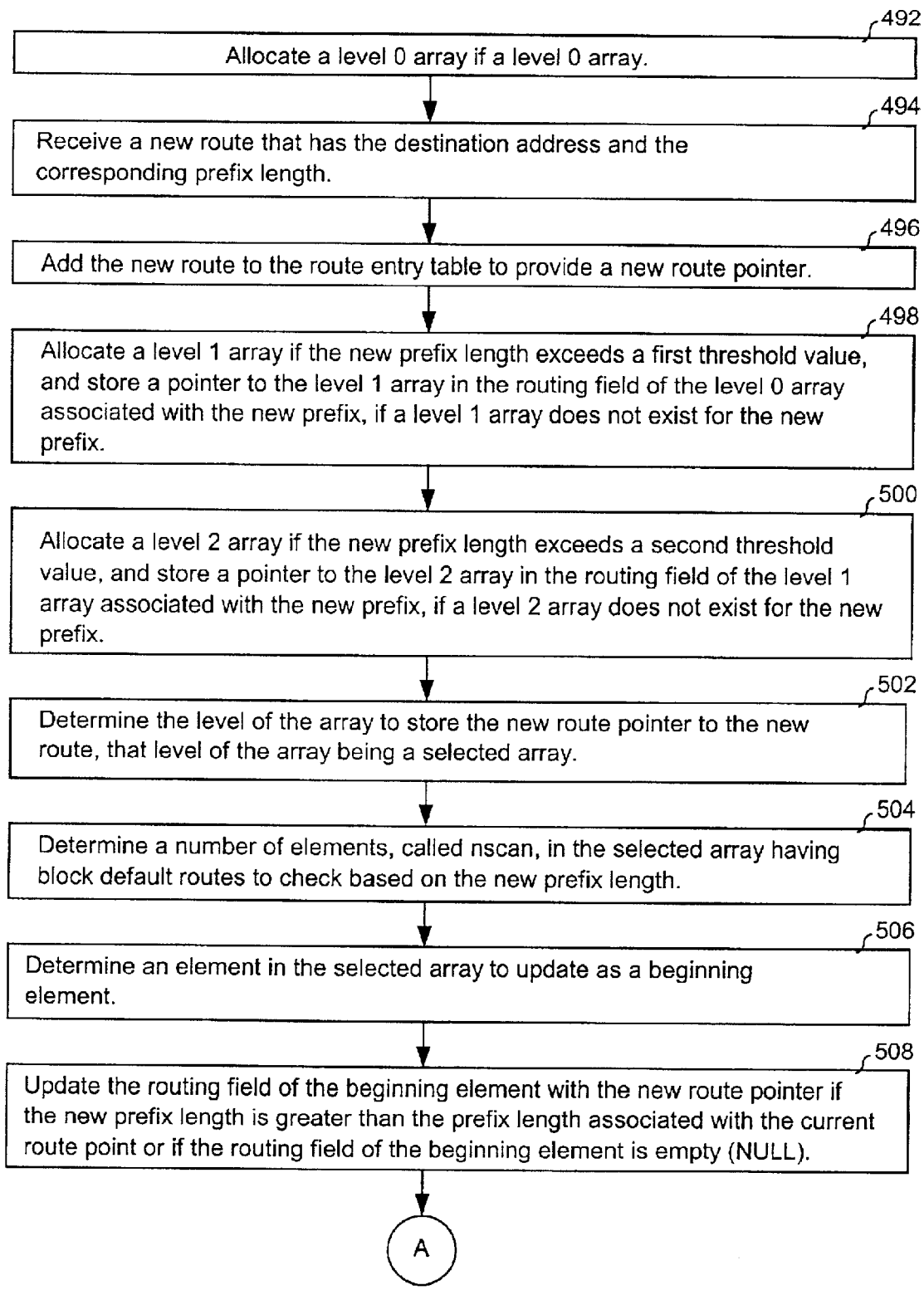
FIGS. 15A and 15B are a flowchart for adding a route by an enhanced route addition process in accordance with an alternate embodiment of the invention.
Figure 15B:
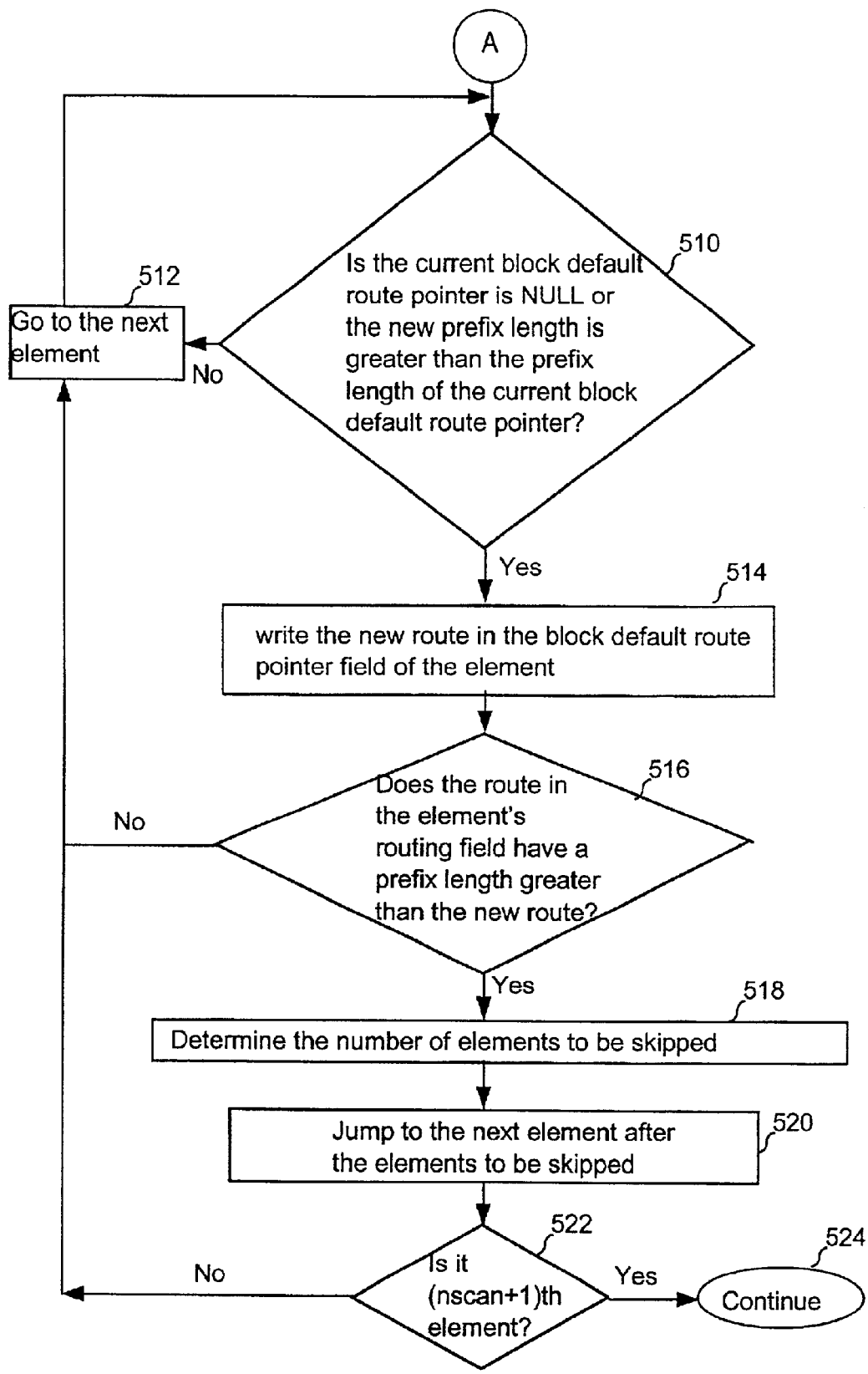

FIGS. 15A and 15B are a flowchart of the alternate embodiment of the invention for adding a route by the enhanced route addition algorithm. Referring to FIGS. 15A and 15B, the steps 492–514 are identical to the steps 191–214 of FIGS. 12A and 12B. In step 516, the enhanced route addition process considers whether an element in a routing table array has a route pointer in its routing field that is more specific than the new route, or alternatively, whether the prefix length of the route pointer in the element's routing field is greater than the new route's IP prefix length. If so, it determines the number of subsequent elements to be skipped (nskip) in step 518, and jumps to the element immediately after nskip elements in step 520, eliminating the need for memory access to the nskip elements. Otherwise, the system proceeds to step 512. The route addition process is repeated until nscan elements have been accessed and updated. When the route addition procedure reaches (nscan+1)th element after the starting element in step 522, the addition procedure has been completed, and the system continues to step 524. Otherwise, the route addition process proceeds to step 512.

FIG. 16 shows exemplary pseudo code addRoute2 to add a route to the routing table using the enhanced route addition procedure. Compared to the pseudo code of FIG. 13, the pseudo code of FIG. 16 reduces the maximum number of routing table memory accesses for adding a route to 255—127 reads and 128 writes.

It will be appreciated by one skilled in the art that, as the number of skipped elements increases, the efficiency gain provided by addRoute2 algorithm also increases. For example, suppose there is a route R having a prefix length of twenty-one (21) that is inserted as the route of element eight (8) of level 1 array of FIG. 9. In this case, elements nine (9) to fifteen (15) would have route R as their default route. Suppose addRoute2 algorithm is applied to add route D of prefix length twenty (20) to the level 1 array after route R has been added. The addRoute2 algorithm would automatically skip elements 9–15 in addition to skipping elements 5–7, eliminating the need for memory access to elements 5–7 and 9–15. This in turn results in faster processing and reduced costs of table update.

The pseudo code of FIG. 13, and subsequent pseudo codes, invoke pseudo code supplementary functions shown below. The supplementary pseudo code functions include:

```
/* getLevel(plen) returns the level of an array based on the prefix length
plen */
getLevel(plen)
    If plen ≤ 16 then
        return 0
    Else if plen ≤ 24 then
        return 1
    return 2
/* getIndex() returns the index of an array associated with the following
parameters: IP address ipa, prefix length plen */
getIndex(ipa, plen)
    If plen ≤ 16 then
        return ipa >> 16
    Else if plen ≤ 24 then
        return (ipa >> 8) & 0xff
    return ipa & 0xff
```

```
-continued

/* getNscan() returns the number of elements whose block default routes
need to be updated from the prefix length plen */
getNscan(plen)
    return (1 << ((16 + getLevel(plen) * 8) − plen)) − 1
```

Searching for a Route

Exemplary pseudo code implementing the search procedure 108 of FIG. 3 for the multi-array routing table of FIG. 6 is shown below. In the pseudo code, level-i[ ] refers to an array at level i. For example, level-1[ ] refers to an array at level one. The following example searches the routing table of FIG. 11 for the route corresponding to destination IP address 10.1.17.1:

1. A block default pointer variable, called pBlkDefVar, is initialized to NULL. The variable, pBlkDefVar, stores the longest identified block default route as the various levels of arrays are searched.
2. An index into the level 0 array is generated based on the first sixteen bits, "10.1," of the destination address to access element 2,561. The values of the block default pointer and the routing field stored in element 2,561 (10.1) of the level 0 array are read. The block default pointer variable pBlkDefVar is set equal to the block default route pointer B stored in element 2,561. The routing field stores a pointer to the level 1 array.
3. Based on the pointer to the level 1 array and a subset of bits associated with the destination address, element seventeen of the level 1 array is accessed. The value of variable pBlkDefVar does not change since the block default route of element seventeen in the level 1 array is equal to NULL.
4. The value stored in variable pBlkDefVar, which is the pointer to route B, is returned because element seventeen does not store either a pointer to a route or a pointer to the next level array.

The local variable pBlkDefVar is replaced with the block default route stored in the accessed element of the level 1 array unless the value stored in the accessed element of the level 1 array is equal to NULL. In this example, the search cost of the multi-array routing table of the present invention is twice as expensive as the traditional multi-array routing table of FIG. 1 because the search accesses the memory twice per element. In contrast, the traditional multi-array routing table needs one memory read per element visit. However, in practice, the difference between the search cost of the traditional multi-array routing table of FIG. 1 and the multi-array routing table of the present invention is relatively small.

The reasons for the small difference in search cost despite the two memory accesses per element visit in the multi-array routing table of the present invention using are as follows. If one pointer is in the processor cache or in the cache of the search hardware, in the majority of instances, another pointer is also in the cache because the two pointers are coupled. In one embodiment, the pointers are coupled because the pointers are stored in adjacent memory locations. Therefore either both pointers are in the cache, or neither pointer is in the cache. When both pointers are in the cache, the cost of one more memory access is the same as that of one more register instruction. When neither pointer is in the cache, the cost of one more memory access is negligible since the cost of loading two pointers into the cache is significantly more expensive as that of one more cache access. Therefore the cost of one more memory access is one additional register instruction in the worst case.

Pseudo code lookupRoute1 implementing one search algorithm for the multi-array routing table of the present invention is shown below.

```
lookupRoute1(ipa) /* ipa: IP address */
    pBlkDefVar = NULL
    For i = 0 to 2
        index = getIndex(ipa, 16 + i * 8)
        If level-i[index].pBlkDef is not NULL then
            pBlkDefVar = level-i-[index].pBlkDef
        If level-i[index].pRoutingField points to a route then
            return level-i[index].pRoutingField
        If level-i[index].pRoutingField points to nothing then
            break
        level-(i+1)[] = level-i[index].pRouting Field
    return pBlkDefVar
```

Pseudo code lookupRoute2 for an enhanced search algorithm for the multi-array routing table of the present invention is shown below. The pseudo code was used in a simulation which will be described below.

```
lookupRoute2(ipa) /* ipa: IP address */
    For i = 0 to 2
        index = getIndex(ipa, 16 + i * 8)
        If level-i[index].pRoutingField points to a route then
            return level-i[index].pRoutingField
        pDefSave[i] = level-i[index].pBlkDef
        If level-i[index].pRoutingField points to nothing then
            break
        level-(i+1)[] = level-i[index].pRoutingField
    While i ≥ 0
        If pDefSave[i].pBlkDef is not NULL then
            return pDefSave[i].pBlkDef
        i = i - 1
    return NULL
```

In one embodiment of the invention, the search function is implemented in hardware and the block default route field and the routing field for an element are accessed simultaneously. In other words, the hardware accesses the block default route field and the routing field of the element in parallel. A hardware embodiment will be described below with reference to FIG. 22. Alternatively, the search function may be implemented using software.

Deleting a Route

In the traditional multi-array routing table of FIG. 1, it is expensive to find the route that is to replace a route to be deleted. In the present invention, the block default route is the second longest-matching route of the associated element when the element is associated with a particular route. Therefore, deleting a route is inexpensive because the route that is to replace the route to be deleted is the block default route of the array element that stores the route to be deleted. Pseudo code that deletes a route in accordance with an embodiment of the delete_route procedure 106 of FIG. 3 is shown below:

```
delRoute1(ipa, plen)
/* ipa: IP address, plen: prefix length */
    array[] = the array in which the route to be deleted is stored
    level = level of array[]
    begin = getIndex(ipa, plen)     /* This is the index of the element
                                       containing route to be
                                       deleted*/
    p = array[begin].pRoutingField
    array[begin].pRoutingField = NULL   /* Delete the route */
    nScan = getNscan(plen)          /* Get number of array elements to
                                       scan */
    i = begin + 1                   /* Element at which to start
                                       scanning */
    While nScan-- > 0               /* Scan the elements */
        If array[i].pBlkDef == p then
            array[i].pBlkDef = array[begin].pBlkDef
        i = i + 1
```

Using delRoute1 algorithm described above, the maximum number of routing table memory accesses to delete a route is equal to 511 (256 writes and 255 reads) when the stride length of an array is eight (8).

In an alternate embodiment of the invention, the number of memory accesses required to delete a route is further reduced by an enhanced route delete algorithm. In this embodiment, the route delete algorithm takes advantage of the fact that some elements may have default routes that are more specific than the deleted route, and thus do not require updating. For example, suppose that route D is to be deleted from the level one array in FIG. 10. The enhanced route delete algorithm accesses and deletes route D from elements zero (0) to three (3). When the enhanced route delete algorithm reaches element four (4), it reads that element four (4) has route C in its route field. The enhanced route delete algorithm recognizes that elements 5, 6 and 7 would have route C as the default route in accordance with the route addition algorithms described above. Because route C is more specific than deleted route D, or alternatively, the prefix length (22) of route C is greater than the deleted route D's IP prefix length of twenty (20), there is no need to delete route C from the default route fields of elements 5, 6 and 7. The enhanced route delete algorithm takes advantage of this fact and automatically skips memory access to elements 5, 6 and 7.

FIG. 17 shows the memory access sequence for deletion of route D from the level 1 array of FIG. 10 according to the enhanced route delete algorithm. Referring to FIG. 17, the enhanced route delete algorithm makes a direct jump from element 4 to element 8, eliminating the need for memory access to elements 5, 6, and 7. Using pseudo code, the enhanced route delete process can be written as follows:

```
delRoute2(ipa, plen)   /* alternate route delete algorithm */
/* ipa: IP address, plen: prefix length */
    array[] = the array in which the route to be deleted is stored
    level = level of array[]
    begin = getIndex(ipa, plen)     /* This is the index of the element
                                       containing route to be
                                       deleted*/
    p = array[begin].pRoutingField
    array[begin].pRoutingField = NULL   /* Delete the route */
    nScan = getNscan(plen)          /* Get number of array elements to
                                       scan */
    i = begin + 1                   /* Element at which to start
                                       scanning */
```

-continued

```
While nScan-- > 0              /* Scan the elements */
    If array[i].pBlkDef == p then
        array[i].pBlkDef = array[begin].pBlkDef
    If array[i].pRoutingField == NULL then nSkip = 1
    else   nSkip = getNscan(array[i].pRoutingField->plen) + 1
                              /* Here calculate the number of
                              array elements that can be
                              skipped */
    i = i + nSkip  /* Skip */
```

It will be appreciated by one skilled in the art that, as the number of skipped elements increases, the gain in efficiency by delRoute2 algorithm also increases. Referring to FIG. 11, suppose there is route R having a prefix length of twenty-one (21) that is inserted as the route of element eight (8). Then, elements nine (9) to fifteen (15) would have route R as their default route in accordance with a route addition algorithm described above. When delRoute2 algorithm is applied to the level 1 array of FIG. 11 in order to delete route D, delRoute2 algorithm would automatically skip elements 9–15, eliminating the need for memory access to elements 9–15.

Using delRoute2 algorithm described above, the invention further reduces the maximum number of routing table memory access to 255 (128 writes and 127 read) when the stride length of an array is eight (8). This represents twice the efficiency of the delRoute1 algorithm, which translates to higher processing speed and reduced costs of table update.

Table Default Route

Figure 18:
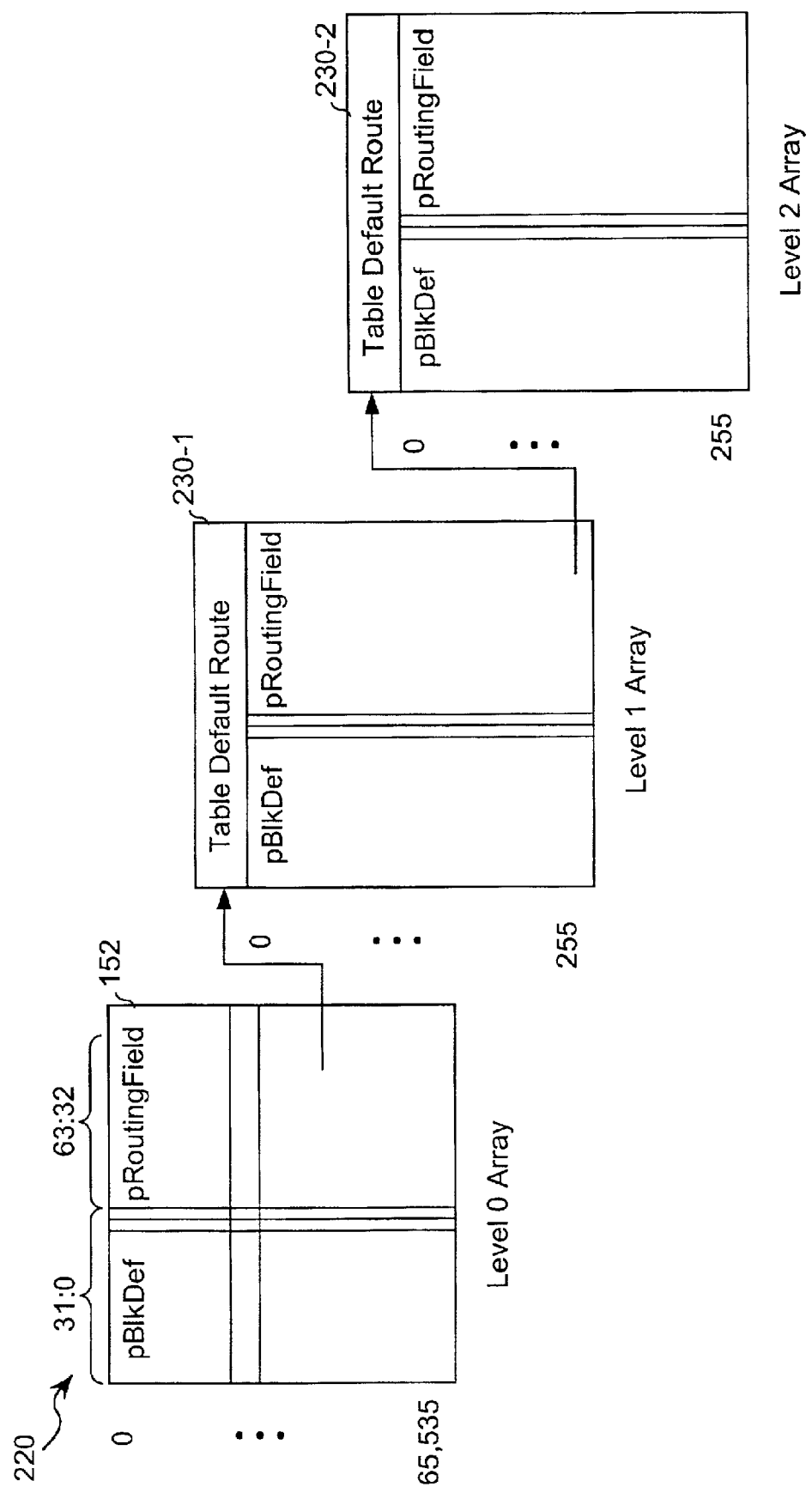
FIG. 18 is a block diagram illustrating a table default route that is associated with a subset of the arrays in the multi-array routing table hierarchy.

Referring to FIG. 18, in routing table 220, a table default route 230 further reduces the number of routing table memory accesses when adding or deleting a route. In one embodiment, by using table default route 230, the invention reduces the maximum number of routing table memory access to 255 in the worst case. The worst case occurs when element 0 has a route pointer and when the route pointer of element 0 is to be populated as the block default route for elements 1 through 255 of the newly allocated level 1 or level 2 array, (i.e., the return value of nScan( ) is equal to 255). As shown in FIG. 18, a table default route 230 is associated with a subset of the arrays in the hierarchy. In an alternate embodiment, each array, including the level 0 array, is associated with a table default route 230. In another embodiment, the table default route 230 is stored in a different location in an array from the block default routes of the 256 array elements. During a search, the table default route 230 is checked when a pointer to the block default route is NULL. The table default route 230 reduces the route update cost by approximately 50%. However, the table default route 230 incurs an additional memory access when the pointer to the block default route is NULL.

When a level 1 or level 2 array is created for an associated element in the level 0 or level 1 array, respectively, the table default route is updated as described above. For example, in FIG. 19A, route E is associated with a destination address of 10/15 and has been added to the level 0 array 242. Route F, with a destination address of 10.0.1/24, is to be added to the routing table. To add route F, a level 1 array is allocated and the routing field of element 2,560 points to the level 1 array. The table default route 246 of the level 1 array is populated with the route pointer to route E, rather than updating the block default routes for 255 elements of the level 1 array 244.

When deleting a route, the table default route is updated when the route to be deleted is a route pointer stored in element 0. The route to be replaced is either the value of the block default route of element 0 or the route pointer stored next to the route to be deleted in the linked list. Note that, in one embodiment, the block default route of element 0 is NULL, and the block default route of element 0 is used to store the table default route.

In yet another embodiment, the table default route is stored in a hardware register that is associated with the respective array.

Moving Routes

Figures 19A, 19B:
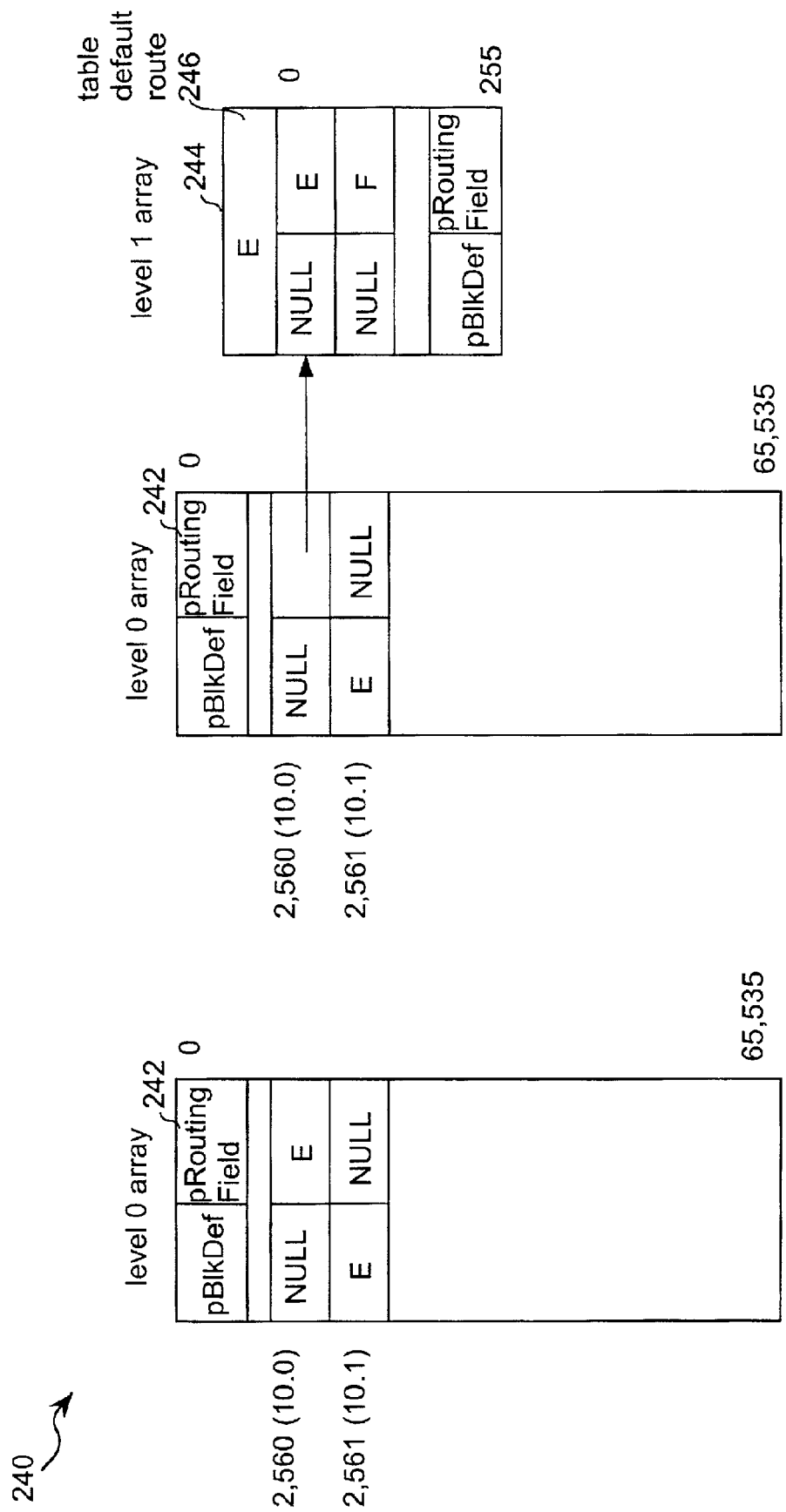
FIG. 19A is a block diagram of a level 0 array prior to moving a route.
FIG. 19B is a block diagram of the level 0 array of FIG. 19A and a level 1 array after moving a route from the level 0 array to the level 1 array.

Routes may move among the various levels of arrays when new routes are added and existing routes are deleted. Moving a route will be described below by way of example. Referring to FIG. 19A, in a routing table 240, a level 0 array 242 has one route, "route E," whose destination IP prefix is equal to 10/15. Assume that a new route, "route F," whose destination IP prefix is equal to 10.0.1/24 is to be added to the routing table 240. The add_route procedure 108 of FIG. 3 also performs the following functions:

1. move route E from the level 0 array 242 to a level 1 array 244, and
2. update the block default routes or the table default route 246 of the level 1 array 244.

The block default routes and the table default route 246, depending on the embodiment, may propagate to multiple arrays. FIG. 19B shows the routing table 240 after adding route F. With respect to location 2,560 of the level 0 array 242, route E has moved to location 0 of the level 1 array 244. Location 1 of the level 1 array 244 stores a pointer to route F. In one embodiment, if a table default route is not used, the block default routes of locations 1 to 255 of the level 1 array 244 are updated with the pointer to route E. Alternately, when a table default route 246 is used, location 1 of the level 1 array 244 has a block default route pointer of NULL because a table-default route pointer has been set to equal the pointer for route E. Using the table default route is effective because a route to be moved becomes the table default route in the next level array and therefore does not affect the worst case route update cost.

The delete_route procedure 106 (FIG. 3) also updates the propagated block default routes and the table default routes 246, depending on the embodiment, when a route is deleted.

Overlapping Routes

Overlapping routes share a common portion of the destination IP prefix. Because the routing table stores the longest and second longest route for an element, when a route is added, the prefix of the new route is compared to that of existing overlapping routes to determine whether the routing table is updated with the new route information. Assume that another route, "route G," whose destination IP prefix is equal to 10/20 is to be added to the routing table of FIG. 19B. Theoretically, a pointer to route G should be stored in element 0 of the level 1 array 244, but element 0 is already populated with route E.

Figure 20:
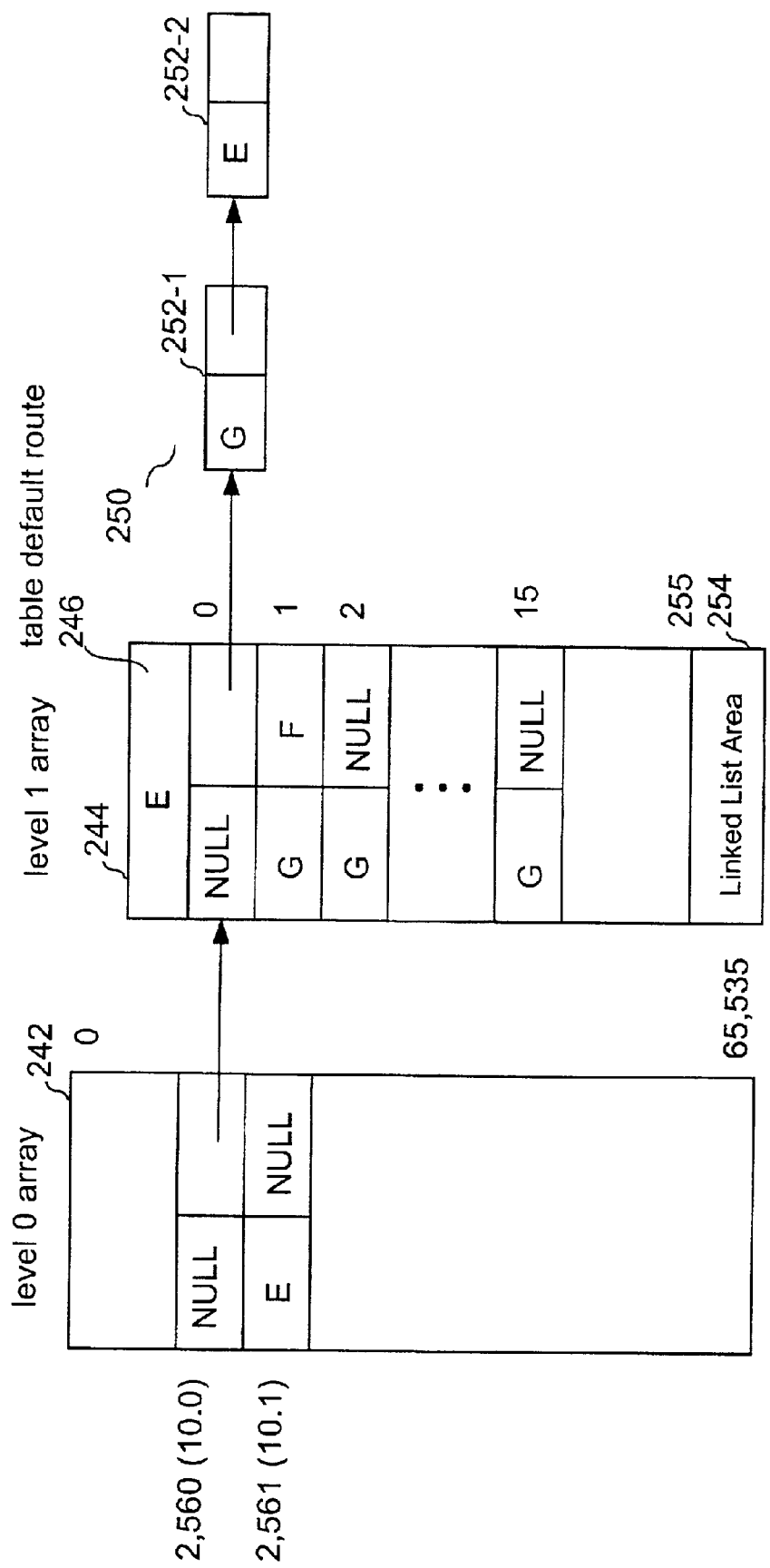
FIG. 20 is a block diagram of the routing table of FIG. 19B illustrating the addition of an overlapping route.

Referring to FIG. 20, the level 1 array stores a pointer to a linked list 250 of the overlapping routes 252 in the descending order of prefix length. In one embodiment, a portion of the linked list 250 is stored in a linked list area 254 after element 255 of its associated array. Using the linked list 250, no extra search cost is introduced because the first list element 252-1 of the linked list 250 maintains a pointer to the longest-matching route. The linked list does not require an additional memory access if the routing field stores the first element of the linked list. In other words, when updating routes, the replacement route is found with one memory access.

FIG. 20 shows the routing table after route G is added. Note that the block default route pointer of elements one to fifteen of the level 1 array 244 is not route E. Route G is the block default route pointer of element one of the level 1 array because route G is the second longest matching route with respect to the destination addresses associated with those elements. Route G is the block default route pointer of elements two through fifteen of the level 1 array because route G is the longest matching route with respect to the destination addresses associated with those elements. The following pseudo code illustrates a method of finding the block default route for overlapping routes:

---

If the route has the shortest prefix length among the routes in the linked list then
    block default route is stored in pBlkDef of the array element
Else
    block default route is stored in the next linked list element

---

When deleting routes, the linked list 250 is accessed to find the new block default route. Because the first element of the linked list 252-1 stores the longest overlapping route, when that route is deleted, the next element in the linked list becomes the longest overlapping route for that element.

Simulation Results

Three routing table operations were simulated: addition, deletion, and lookup, for the BSD radix implementation. The MAE-EAST routing table data as of Aug. 17, 1999 was used as the source of the BGP routes. The MAE-EAST routing table has 42,366 routes. In addition, 2,000 random routes having a prefix length longer than twenty-four were created and added to the routing table data to simulate the IGP routes. Table one, below, shows the prefix length distribution of the routing table data used in the simulation.

TABLE 1

PREFIX LENGTH DISTRIBUTION

| prefix length | number of routes |
| --- | --- |
| 8 | 20 |
| 9 | 3 |
| 10 | 3 |
| 11 | 9 |
| 12 | 21 |
| 13 | 42 |
| 14 | 110 |
| 15 | 184 |
| 16 | 4,869 |
| 17 | 496 |
| 18 | 1,081 |
| 19 | 3,285 |
| 20 | 1,723 |
| 21 | 2,082 |
| 22 | 2,790 |
| 23 | 3,582 |
| 24 | 21,971 |
| 25 | 435 |
| 26 | 438 |
| 27 | 407 |
| 28 | 406 |
| 29 | 406 |
| 30 | 403 |
| Total Number of Routes: | 44,366 |

The simulation process:
1. randomly added 44,366 routes to the routing table.
2. randomly searched for (looked up) 44,366 routes in the routing table.
3. randomly deleted all 44,366 routes from the routing table.
4. repeated steps 1 to 3 for 100 times.

The simulation added, searched for, and deleted routes randomly to avoid order dependent effects. The simulation was performed on a computer having the following specifications:

Processor: Advanced Micro Devices (AMD) Athlon 600 MHz processor

Memory: 128 MB

Operating System: Linux 2.2.14

Compiler: egcs-2.91.66

Table two, below, shows the simulation result of BSD radix, the prior art multi-array routing table of FIG. 1 (Prior Art (FIG. 1)), the present invention (Invention), and the present invention using the table default route (Invention-TD). The search performance for the prior art multi-array routing table of FIG. 1 was obtained by modifying the pseudo code of the present invention to skip the block and table default route checking. In table two, the values in $\mu s$ are the average of 44,366 random operations. The memory use was determined when 44,366 routes were stored in the routing table.

TABLE 2

SIMULATION RESULTS

| | search ($\mu s$/route) | add ($\mu s$/route) | delete ($\mu s$/route) | memory use (Megabytes) |
| --- | --- | --- | --- | --- |
| BSD Radix | 3.61 | 3.72 | 3.83 | 5.54 |
| Prior Art (FIG. 1) | 0.45 | — | — | — |
| Invention | 0.45 | 1.35 | 1.58 | 17.42 |
| Invention-TD | 0.45 | 1.13 | 1.35 | 17.42 |

Table three, below, shows the performance difference between two sets of routing table data. One set of routing table data is the original MAE-EAST routing table data that has 95 routes whose prefix length is longer than 24. The other set of routing table data (MAE-EAST+) has all the original MAE-EAST routes plus the 2,000 randomly created IGP routes whose prefix length is longer than 24. As shown in Table 3, the IGP routes significantly increase the number of both level 1 and level 2 arrays.

TABLE 3

TABLE SIZE AND PERFORMANCE

| | level 1 array | level 2 array | search ($\mu s$/route) | add ($\mu s$/route) | delete ($\mu s$/route) |
| --- | --- | --- | --- | --- | --- |
| MAE-EAST | 3,441 | 64 | 0.24 | 0.94 | 1.18 |
| MAE-EAST+ | 5,299 | 2,064 | 0.45 | 1.13 | 1.35 |
| percentage difference (%) | 53.99 | 3,125.00 | 87.50 | 20.21 | 14.40 |

The MAE-EAST data has 42,366 routes and 95 routes with a prefix length longer than twenty-four. The MAE-EAST+data has 2,000 routes whose prefix length is longer than twenty-four in addition to the MAE-EAST routes.

Table four, below, shows the performance difference between random and sorted route updates. In a random route insert/delete simulation, 44,366 routes are randomly inserted and deleted. In a sorted route insert/delete simulation, 44,366 routes are inserted according to the descending order of the prefix length and deleted according to the ascending order of the prefix length.

TABLE 4

UPDATE ORDER AND PERFORMANCE

|  | search (μs/route) | insert (μs/route) | delete (μs/route) |
|---|---|---|---|
| random | 0.20 | 1.13 | 1.13 |
| sorted | 0.20 | 0.68 | 0.68 |

The Results of the Simulation Show that

1. The present invention is more than eight times faster in search, more than three times faster in route addition, and almost three times faster in route deletion than BSD radix when the table default method is applied. However, the present invention uses more than three times as much memory as BSD radix.

2. There is no difference in search performance among the prior art routing table of FIG. 1, the present invention, and the present invention with the table default route method. This result suggests that the the saved block default routes and the table default route are in a cache.

3. The table default method improves route addition performance by about 16%, and route deletion performance by about 14%. This result suggests that the cost of accessing the entire array affects the performance. When the number of routes whose prefix length is 24 is large (21,971), these routes move to the level 2 arrays when more specific routes are added. Therefore all the elements of some arrays may be accessed, unless the table default route is used.

4. The number of deep level arrays affects the route lookup performance because more array elements may be accessed when there are more deep level arrays.

5. Neither the number of routes nor the number of deep level arrays significantly affects the route update performance of the present invention. As shown in table three, although the number of routes increased by approximately 54% and the number of level 2 arrays increased 32 times, the cost to add a route increased by less than 21%.

6. Data in Table 4 indicate that when a route flap occurs, the performance of both route addition and deletion improves about 66% when routes are sorted, compared to random route processing. Modern routes usually have two (2) routing tables. One is owned by the controller that handles routing protocols and the other is owned by the packet forwarder. The controller calculates routes and downloads them to the forwarder's routing table. Thus, it is possible to improve the performance of the forwarder by about 66% by permitting the controller to sort routes according to the prefix length and download them to the forwarder. Such improvement represents a relatively large benefit for its costs because it is not expensive for a controller to sort routes according to the prefix length.

An Alternate Array Element Structure

Figure 21:
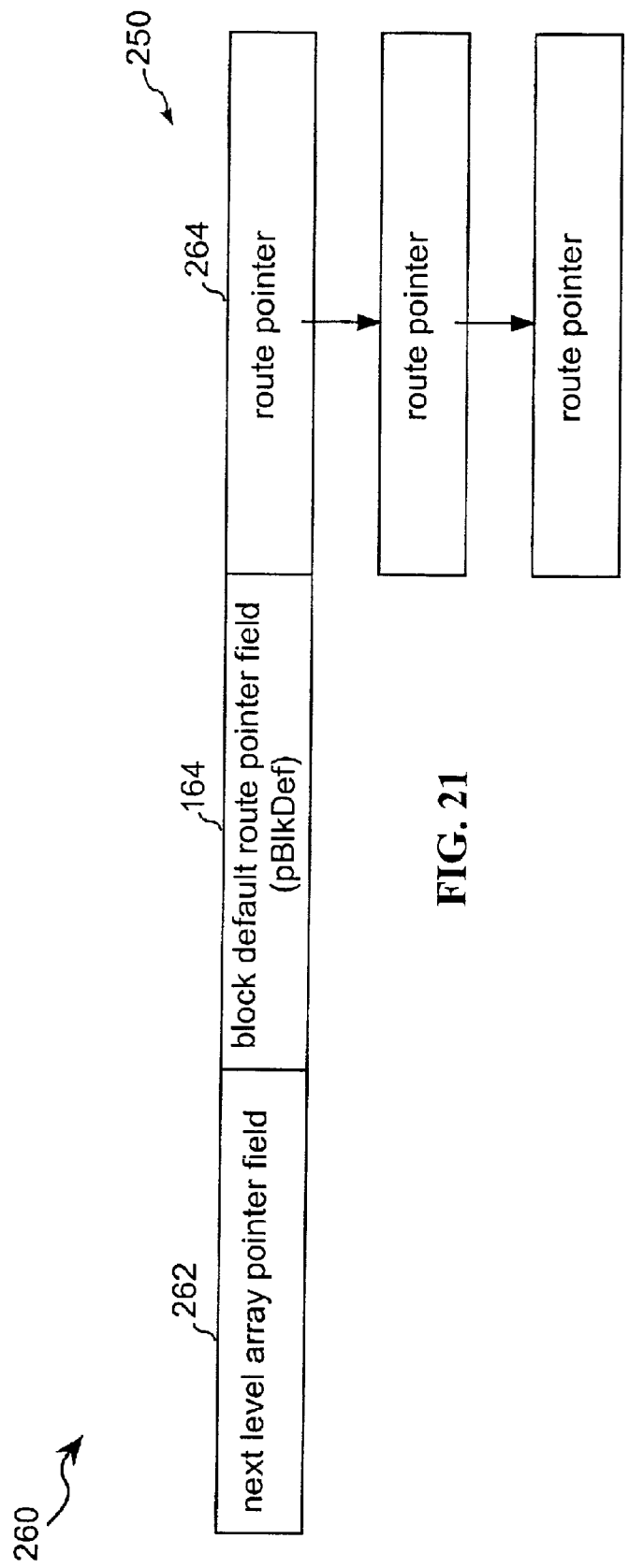
FIG. 21 is a block diagram illustrating an alternate embodiment of an array element of the multi-array routing table of FIG. 6.

Referring to FIG. 21, an alternate embodiment of a structure for an array element 260 of the present invention is shown. The array element 260 has a block default route pointer field 164, a next level array pointer field 262 and a route field 264. The route field stores the route pointer for the longest-matching route that was described above. Unpopulated fields store a NULL. In this embodiment, no tag field is used; however, additional memory is required. The techniques for adding and deleting a route, described above, also apply to arrays using this array element structure.

In another embodiment, the route field 264 stores the first element of a linked list of overlapping routes, described above. Therefore, the route field stores a pointer to the longest matching route for the destination address associated with that element, and reduces the update cost when the longest matching route for that element is deleted.

The value stored in the block default route pointer field 164 of an element associated with address i is equal to the value of the route pointer of another element associated with address j, when:

1. $0 \leq j < i$;
2. the prefix associated with element i is a subset of the prefix of the route pointed to by the route field for the element associated with address j; and
3. the prefix length of the route pointed to by the route field for the element associated with address j is greater than the prefix length of the routes pointed to by the route pointers of elements having addresses 0 through j-1.

Appendix 1 describes a routing table using the array structure of FIG. 21 in further detail.

The Route Engine

Figure 22:
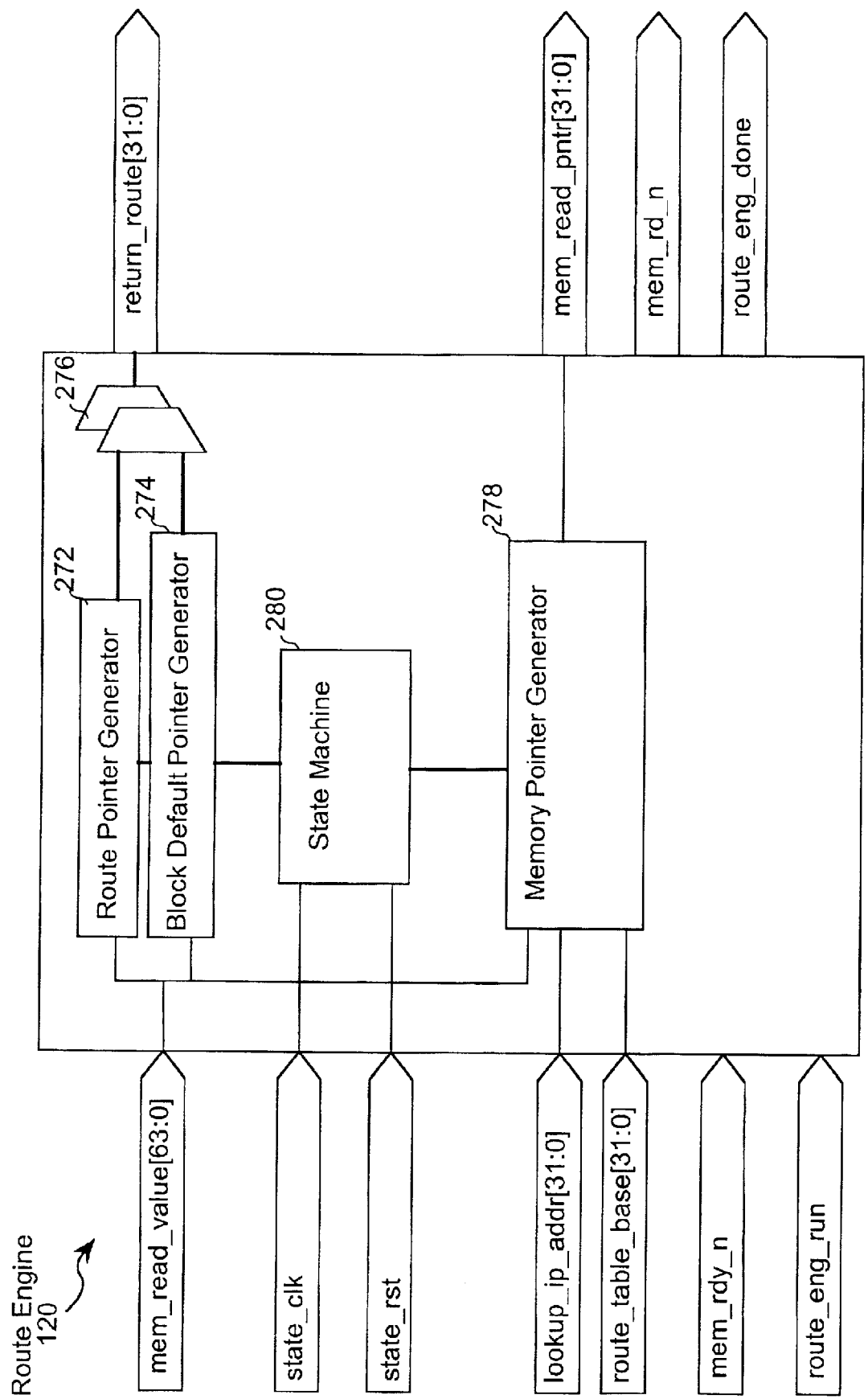
FIG. 22 is a block diagram of a route engine of the routing table of FIG. 3.

Referring to FIG. 22, a block diagram of the route engine 120 of the present invention of FIG. 3 is shown. The route engine 120 includes:

a route pointer generator 272 that generates the route pointer based on data (mem_read_value) read from the multi-array routing table;

a block default pointer generator 274 that generates the block default route pointer based on the data (mem_read_value) read from the multi-array routing table;

a return route multiplexor 276 that returns either the block default route or the route pointer as the return route pointer;

a memory pointer generator 278 that generates an address (mem_read_pntr[31:0]) from which to read a value from the multi-array routing table based on a base address of the routing table (route_table_base[31:0]) and the received destination address (lookup_ip_addr [31:0]); and a state machine 280 that synchronizes the operation of the route engine based on at least a state clock signal (state_clk) and a state reset signal (state_rst).

The signals to interface to the route engine include the following:

The state clock signal (state_clk) is the state machine clock source.

A state reset signal (state_rst) resets the state machine.

The destination address (Ikup_ip_addr) is the IP address to search for and does not change during the search.

The route table base signal (route_table_base) is the base address of the level 0 array.

The route engine run signal (route_eng_run) is the route search start bit. The route_eng_run signal is set high to initiate a search, and set low to clear the route engine after the search completes. The route engine run signal (route_eng_run), when asserted, causes the route engine to search for a match to a destination address in the multi-array routing table. The microprocessor or a state machine may assert the route engine run signal.

The memory read address (mem_read_pntr[31:0]) is supplied to the routing table memory to specify a location from which to read data.

The memory read control (mem_rd_n) is set low by the route engine to read data from the specified address (mem_read_pntr). The "n" at the end of the signal name indicates that the signal is asserted when low.

The memory read value (mem_read_value) is the data read from the memory at the specified address. The memory read value is unchanged until the route engine sets mem_rd_n high.

The memory ready signal (mem_rdy_n) is set low by memory read logic when a read cycle of the memory has completed and valid data is present on mem_read_value.

The return route pointer (return_route[31:0]) is the search result vector.

A route engine done signal (route_eng_done) indicates that the route engine has completed the search and the return route pointer is valid.

Figure 23:
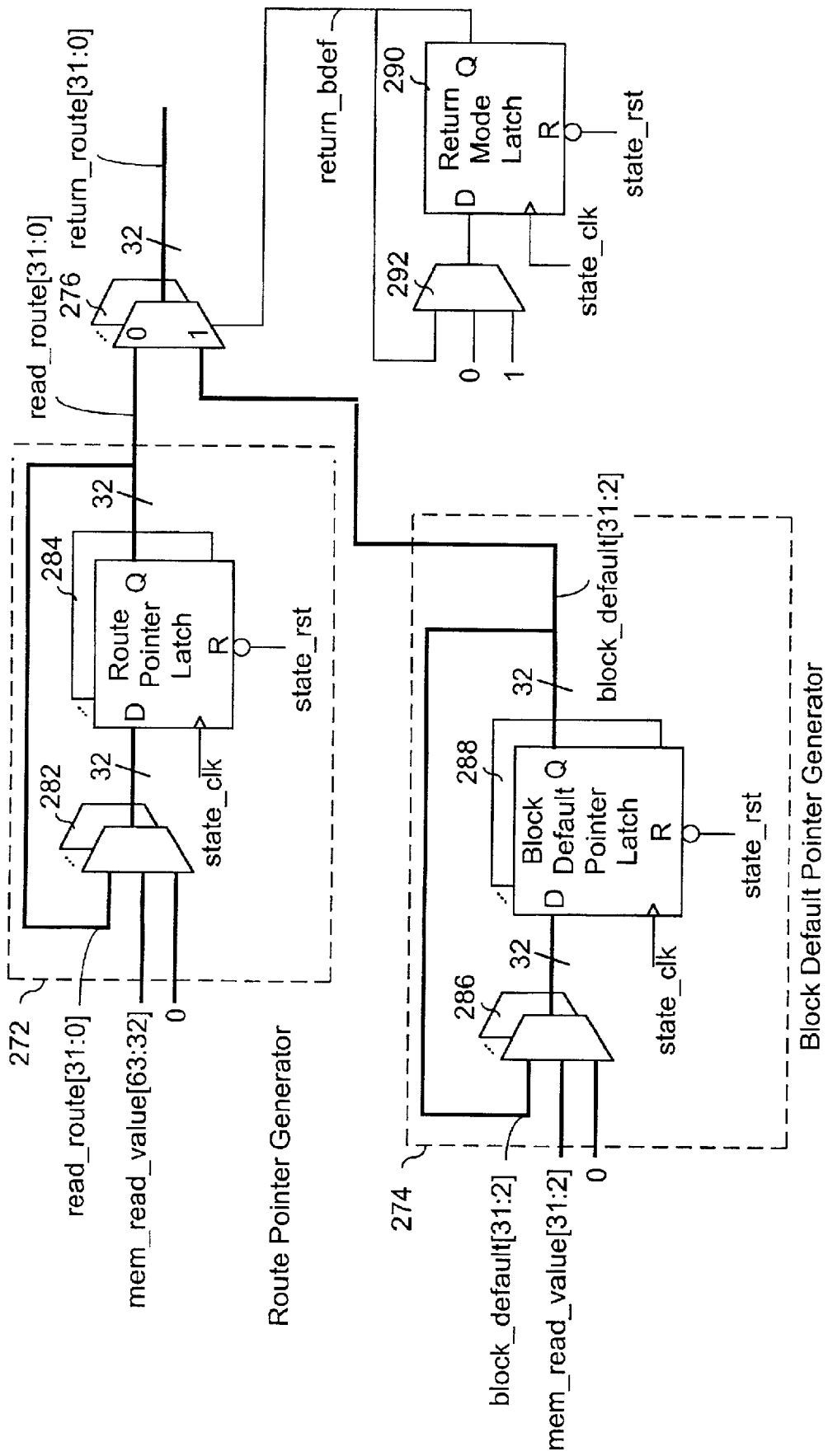
FIG. 23 is a block diagram of a route pointer generator, a block default route pointer generator and a return route multiplexor of the state machine of FIG. 22.

In FIG. 23, a block diagram of the route pointer generator 272, the block default route pointer generator 274 and the return route multiplexor 276 are shown. The route pointer generator 272 has a set of route pointer generator multiplexors 282 that receive the upper bits, 63-32, of the data read from the routing table memory (mem_read_value[63:32]), a zero value, and the current route pointer data stored in a route pointer latch 284. The output of the route pointer generator multiplexors 282 is loaded into the route pointer latch 284 on a positive transition of state_clk to be output to the return route multiplexor 276.

The block default pointer generator 274 includes a set of block default pointer multiplexors 286 that receive the lower bits, 31-2, of the data read from the routing table memory (mem_read_value[31:2]), a zero value, and the current block default route stored in a block default route pointer latch 288. The output of the block default pointer multiplexors 286 is loaded into the block default pointer generator latch 288 on a positive transition of state_clk to be output to the return route multiplexor 276.

A return route latch 290 supplies a stable selection signal to the return route multiplexor 276. A return mode multiplexor 292 supplies the input to the return route latch 290; the return route latch 290 is loaded with the output of the return mode multiplexor 292 on a positive transition of state_clk.

Figure 24:
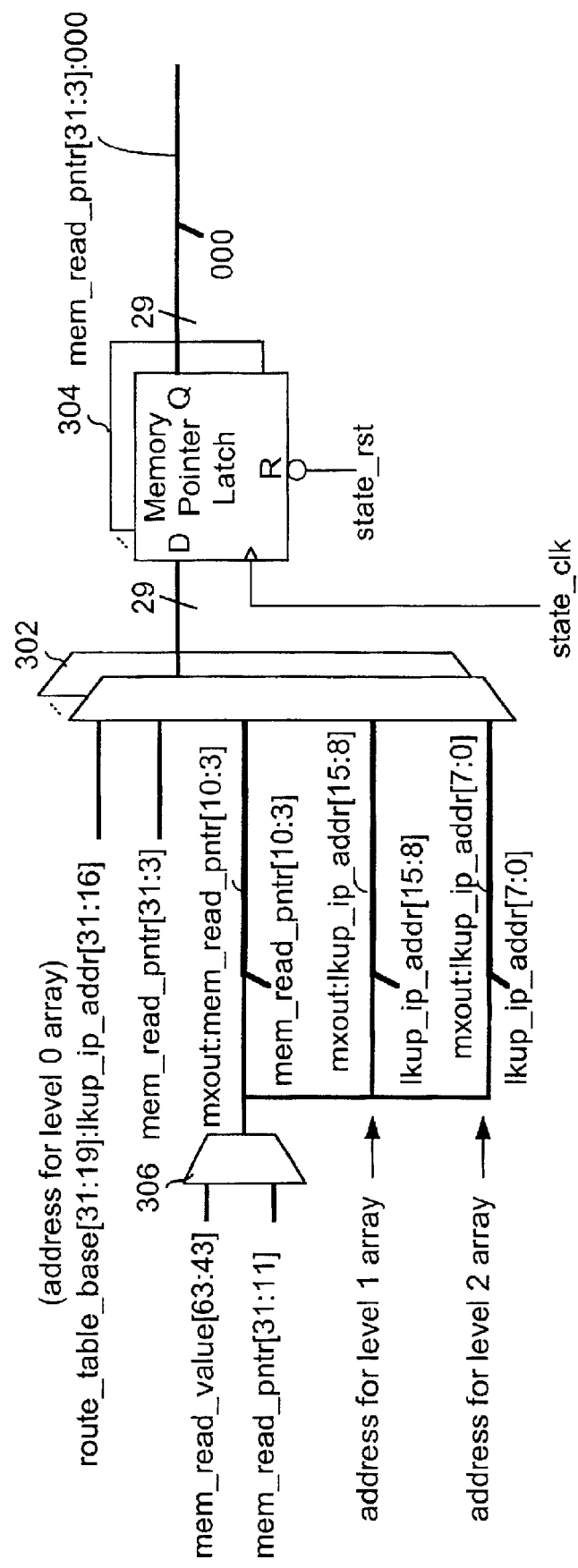
FIG. 24 is a block diagram of a memory pointer generator of the state machine of FIG. 22.

In FIG. 24, a more detailed diagram of the memory pointer generator 278 is shown. A memory pointer multiplexor 302 supplies a memory address to a memory pointer latch 304. The memory pointer multiplexor 302 also receives a concatenation of the route_table_base address [31:19] and the lkup_ip_addr[31:16] to access the level 0 array; the memory pointer multiplexor 302 also receives the current memory read pointer (mem_read_pntr[31:3]) stored in the memory pointer latch 304.

A memory input multiplexor 306 selects either the upper twenty bits of the memory read value (mem_read_value[63:43]) or the upper bits of the current memory read pointer (mem_read_pntr[31:11]) stored in the memory pointer latch 304. The output of the memory input multiplexor 306 (muxout) is concatenated with various subsets of bits to generate additional addresses that are provided to the memory pointer multiplexor 302. The memory pointer multiplexor 302 receives the output of the memory input multiplexor 306 (muxout) concatenated with bits ten through three of the memory read pointer (mem_read_pntr[10:3]). The memory pointer multiplexor 302 also receives the output of the memory input multiplexor 306 concatenated with bits fifteen through eight of the lookup_ip_address to access a level 1 array. In addition, the memory pointer multiplexor 302 receives the output of the memory input multiplexor 306 concatenated with bits seven through zero of the lookup_ip_address to access a level 2 array.

Figure 25:
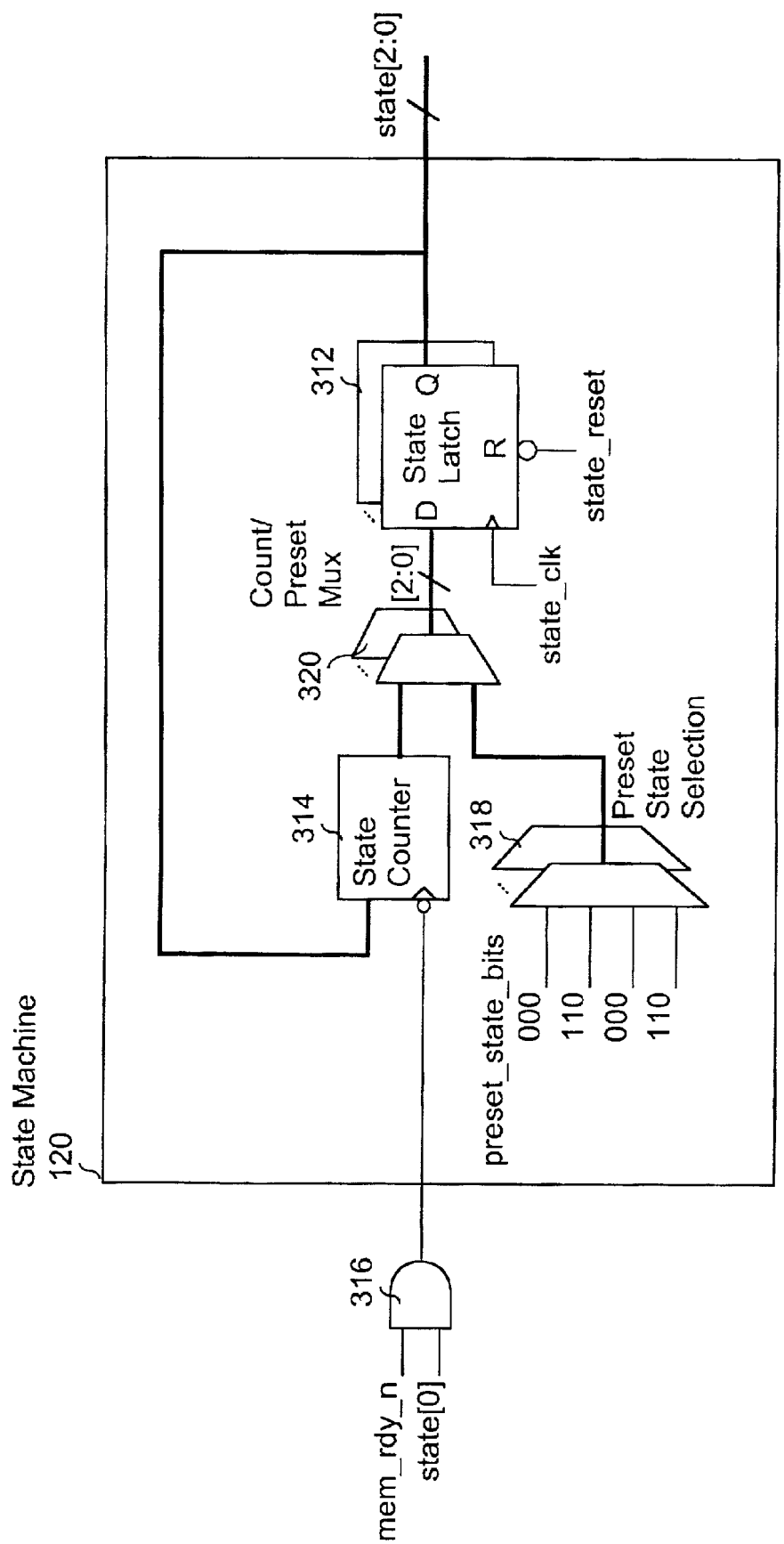
FIG. 25 is a block diagram of a state machine of FIG. 22.

In FIG. 25, a block diagram of the state machine 280 is shown. The state machine 280 controls the overall operation of the route engine 120 and supplies a three bit state signal (state[ ]). A state latch 312 stores a current state which is supplied to a state counter 314. The state counter 314 increments the current state either when the mem_rdy_n signal goes low or the least significant state bit (state[0]) goes low via AND gate 316. A preset state selection multiplexor 318 supplies one of two preset states, idle (000) or done (110), as a forced state signal. The forced state signal is used to force the state latch 312 to a specified state. A count/preset multiplexor 320 supplies either the output from the state counter 314 or the forced state signal to the state latch 312. The state latch is reset to an idle state (000) when the state_rst signal is applied.

Figure 26:
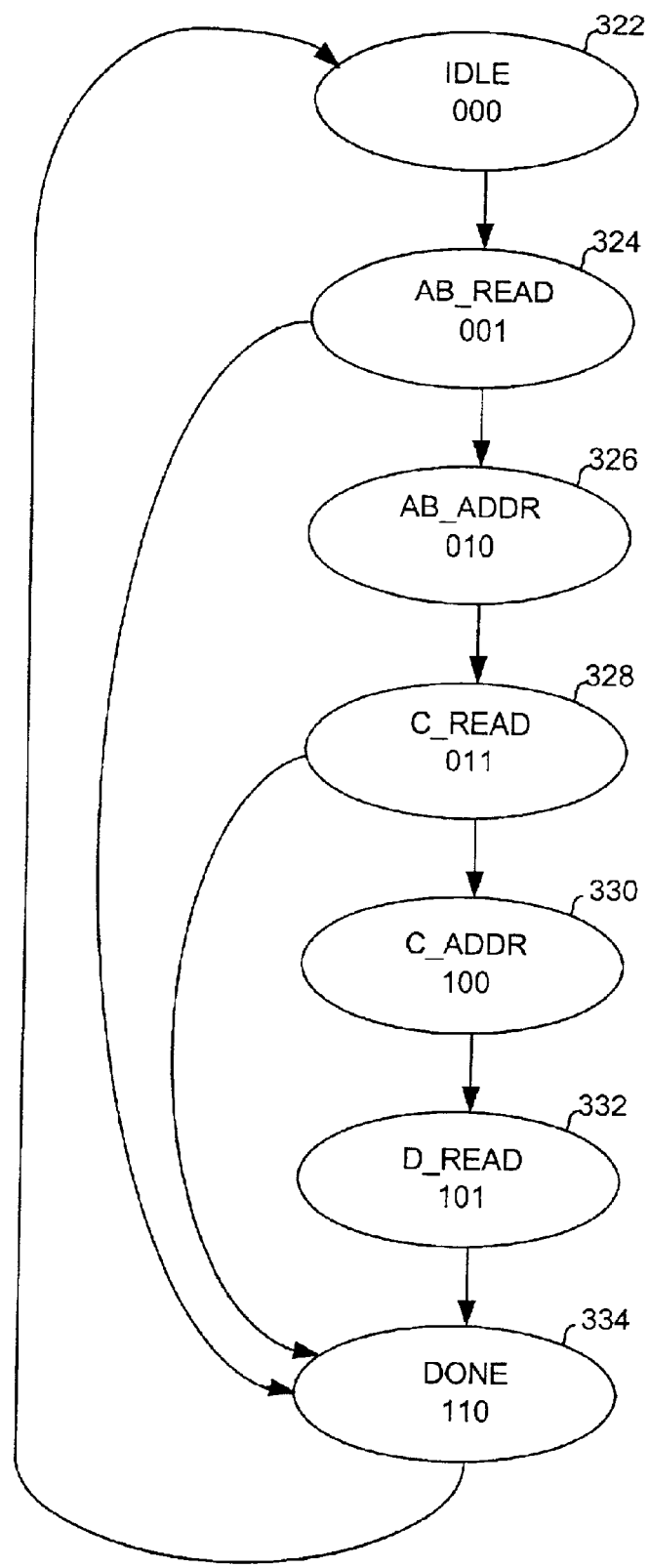
FIG. 26 is a state diagram of the state machine of FIGS. 22 and 25.

FIG. 26 is a state diagram of the present invention. Referring to FIG. 26, the states and state bits (state[2:0]) are defined as follows:

| | | |
|---|---|---|
| IDLE (ST_IDLE) 322: "000" | | |
| AB_READ (ST_TABLE_AB_READ 3240: "001" | | /* used to access the level 0 array */ |
| C_ADDR (ST_TABLE_C_ADDR) 326: "010" | | /* used to access the level 1 array */ |
| C_READ (ST_TABLE_C_READ) 328: "011" | | |
| D_ADDR (ST_TABLE_D_ADDR) 330: "100" | | /* used to access the level 2 array */ |
| D_READ (ST_TABLE_D_READ) 332: "101" | | |
| DONE (ST_DONE) 334: "110" | | |

The values for the state bits are such that the counter is incremented sequentially to, in the worst case, access the level 0 array, the level 1 array, and the level 2 array in order.

In the following description the components of the destination IP address will be referred to as follows: "A.B.C.D," where A is the "A-byte", B is the "B-byte," C is the "C-byte," and D is the "D-byte.'

Referring to FIGS. 25 and 26, initially the state_rst signal is applied and places the state machine in the IDLE state 322 in which the state latch (state[2:0]), the memory read pointer register (mem_read_pntr[31:3]), the route pointer register (read_route[31:0]), and the block default route pointer register (block_default[31:2]) are reset to zero. The state machine operates on the rising edge of state_clk.

In the IDLE state 322, the state machine is waiting for a new destination IP address. When a new destination IP address is received, the route_eng_run signal is set to one. When route_eng_run signal is set to one the route engine generates a memory address (mem_read_pntr[31:0]) based on, in part, a portion of the destination address to access the associated element from the level 0 array.

To generate the mem_read_pntr, bits 31 to 19 of the mem_read_pntr are set equal to bits 31 to 19 of the routing table base address (route_table_base). The routing table is aligned so that bits 18 to 0 of the base address are equal to zero. Bits 18-11 of the mem_read_pntr are set equal to bits 31 to 24 of the destination IP address (i.e., the A-byte). Bits 10-3 of the mem_read_pntr are set equal to bits 23 to 16 of the destination IP address (i.e., the B-byte). The state machine then increments the state bits and proceeds to the A_BREAD state (001) 324.

In the AB_READ state 324, the route engine reads the data (mem_read_value[63:0]) from the level 0 array. If a block default route pointer (i.e., mem_read_value[31:2]), is not equal to zero (NULL), the block default register is loaded with that value. Bits 31 to 2 of the block_default register are set equal to bits 31 to 2 of mem_read_value, and bits 1 and 0 of the block_default register are set equal to zero. In other words, a signal output by the block_default register, called block_default, is set equal to bits 31 to 2 of mem_read_value and bits 1 and 0 are set equal to zero.

The route pointer register is updated with the data stored in the routing field of the mem_read_value data to supply the routing pointer, called read_route. Bits 31 to 0 of read_route are set equal to bits 63 to 32 of the mem_read_value data. In this embodiment, the next level array is aligned so that bits 10 to 0 of the base address of the next level array are equal to zero. The memory read pointer register and memory read pointer (mem_read_pntr) are set equal to bits 63 to 43 of mem_read_value.

Next the tag bits of the block default route pointer field are analyzed to determine whether to output the block default route, a route pointer or to access the next level array. If bits 1 and 0 of the block default route pointer (block_default) are equal to "01," the pointer register is storing a route pointer to the route entry for the new destination IP address, and the route engine returns the route pointer as the return route pointer. The state machine then proceeds to the DONE state 334, that is, the state bits of the state latch are set equal to "110."

If bits 1 and 0 of the block default route pointer (block_default) are equal to "10," the pointer register is storing a pointer to the next level array. The route engine proceeds to access the next level array using the IP address as an index, and increments the state bits to the C_ADDR state (010) 326.

If bits 1 and 0 of the block default route pointer (block_default) are equal to "00," the pointer register is not storing a valid routing pointer. The route engine returns the block default route pointer (block_default) as the return route pointer. The state machine then proceeds to the DONE state 334, that is, the state bits of the state latch are set equal to "110."

In the DONE state, the route engine asserts the route engine done signal (route_eng_done) to indicate that a return route pointer is being output. The route engine waits until the route_engine_run signal has been cleared, set equal to zero. When the route_eng_run signal is equal to zero, the return route pointer has been read. The route engine route engine resets the read_route and block_default values in the route pointer and block default route pointer registers, respectively, equal to zero. The route engine proceeds back to the IDLE state by loading the state latch with a value of zero.

In the C_ADDR state (010) 326, the route engine generates the address (mem_read_pntr) for the associated element in a level 1 array. Bits 10 to 3 of the mem_read_pntr are set equal to the bits 15-8 (C-byte) of the destination IP address. The level 1 array is aligned such that bits 10 to 0 of the base address of the level 1 array are equal to zero. The state counter increments the state bits to equal "011," which is loaded into the state latch, and the route engine proceeds to the C_READ state 328.

In the C_READ state 328 (011), the route engine accesses the level 1 array based on the mem_read_pntr. The route engine performs the same operations as in the AB_READ state 324 which was described above.

When in the C_READ state 328 (011), the route engine retrieves another next level array pointer, the state counter will be incremented to the D_ADDR state 330 (100) and the route engine needs to access the level 2 array.

In the D_ADDR state 330 (100), the route engine generates the address (mem_read_pntr) for the associated element in a level 2 array. Bits 10 to 3 of the mem_read_pntr are set equal to bits 7-0 (D-byte) of the destination IP address. The level 2 array is aligned such that bits 10 to 0 of the base address of the level 1 array are equal to zero. The state counter increments the state bits to equal "101," which is loaded into the state latch, and the route engine proceeds to the D_READ state 332.

In the D_READ state 332 (101), the route engine accesses the level 2 array based on the mem_read_pntr. The route engine performs the same operations as in the AB_READ 324 which was described above. From the D_READ state 332 (101), the route engine will increment the state bits to equal "110," the DONE state 334.

Further detail of the preferred embodiments are disclosed in the attached appendices.

Appendix 1 is a SMART Multi-Array Routing Table, by Yoichi Hariguchi and Tom Herbert, Draft on Jun. 27, 2000.

Appendix 2 is a listing of code used to generate the circuit diagram of the route engine.

While the present invention has been described with reference to a few specific embodiments, the description is illustrative of the invention and is not to be construed as limiting the invention. Various modifications may occur to those skilled in the art without departing from the true spirit and scope of the invention as defined by the claims.

Appendix 1

SMART
Smart Multi-Array Routing Table

Yoichi Hariguchi, Tom Herbert
MAYAN Networks Corp.
{yoichi,therbert}@mayannetworks.com

*Abstract*— It is known that the routing table based on multibit trie, in other words, multiple levels of arrays (hereafter let us call it MART, Multi-Array Routing Table) has a very low and deterministic search cost of modestly higher memory consumption compared to other routing table approaches. The search cost of MART is typically 2 to 4 routing table memory accesses for IPv4. MART has the additional benefits that it is easy to implement in hardware and its determinism allows for pipelining route lookups in hardware. The primary drawback of MART is that update operations, namely adding and deleting routes, are highly costly relative to the route lookup operation. Our extension to MART, called "Smart Multi-Array Routing Table" or just SMART, addresses this issue. SMART not only has similar low cost and determinism of route lookups but also provides low cost route update operations, which always have lower than 256 routing table memory accesses regardless of both the number of routes in the routing table and the prefix length for IPv4.

*Keywords*— Longest-Matching, Route Lookup, Internet Protocol

I. INTRODUCTION

THE size of the Internet routing table is growing rapidly [1] even after the introduction of CIDR (Classless Inter-Domain Routing) [2]. The number of routes at MAE-EAST is about 50,000 [3] as of this writing. In addition, the routing instability [4] is becoming a serious problem. This problem is also called 'route flap'. The route flap often causes deleting and adding the entire set of BGP (Border Gateway Protocol) routes. It is important to enhance not only route lookup performance but also route update performance because slow route update may cause a route flap storm.

It is known that MART has a very low and deterministic search cost. For example, the route lookup cost of a MART implementation by Pankaj Gupta, Steven Lin, and Nick McKeown [5] is 2 memory accesses in the worst case. However, their MART implementation has a serious drawback, which is its highly expensive update cost. It needs 32M routing table memory accesses (16M reads and 16M writes) to add a single route in the worst case. Another MART implementation by Srinivasan and Varghese [6] has much better worst case update cost, but it still does not solve a problem of MART at route deletion. Actually, neither paper discusses the problem of route deletion. In this paper, we first discuss the problem of MART at route deletion and then introduce a new routing table design called SMART (Smart Multi-Array Routing Table) that solves the problem. SMART is an extension of MART and its route update cost is always smaller than 256 routing table memory accesses (128 writes and 127 reads).

II. PREVIOUS WORK

FIGURE 1 shows an example of simple MART.

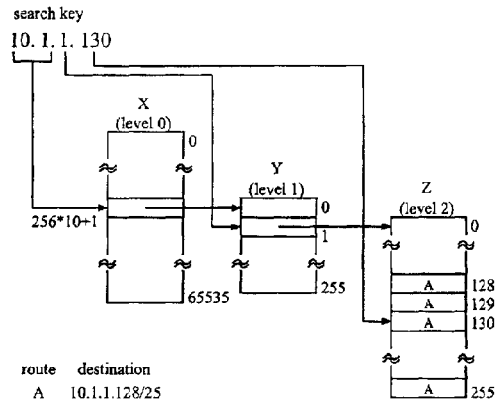

Fig. 1. Simple Multi-Array Routing Table

The MART in Figure 1 consists of 3 levels of arrays. The level 0 array X is indexed by the most significant 16 bits of the search key IPv4 address and has 64K elements. The level 1 array Y is indexed by bit 8-15 of the search key IP address and has 256 elements. The level 2 array Z is indexed by the least significant 8 bits of the search key IPv4 address and has 256 elements. In other words, each IP address can be mapped to one element of the arrays of level 0, level 1, or level 2. Hereafter we will focus on this 3-level MART and SMART. The same theory can be For $i = 2,560$ (10.0) to $2,815$ (10.255)
  If $X[i]$ is connected to a level 1 array then
    Level 1 array $Y = X[i]$
    For $j = 0$ to 255
      If $Y[j]$ is connected to a level 2 array then
        Level 2 array $Z = Y[j]$
        For $k = 0$ to 255
          If $Z[k] ==$ NULL or prefix length of
              the route pointed to by $Z[k] < 8$ then
            $Z[k] = B$
          Endif
        Endfor
      Else if $Y[j] ==$ NULL or prefix length of
              the route pointed to by $Y[j] < 8$ then
        $Y[j] = B$
      Endif
    Endfor
  Else if $X[i] ==$ NULL or prefix length of
      the route pointed to by $X[i] < 8$ then
    $X[i] = B$
  Endif
Endfor Fig. 2. Adding Route 10/8 to MART in Figure 1 applied to any variation.

When a route is added, all of the array elements of the routing table that correspond to the destination IP prefix of the route are set to point to the added route. For example, the destination IP prefix of route A in Figure 1 is 10.1.1.128/25. That is why the elements from 128 to 255 in the level 2 array corresponding to 10.1.1 have pointers to route A. The MART in Figure 1 always finishes a lookup within 3 routing table memory accesses.

Assume a new route 'route B' whose destination IP prefix is 10/8 is to be inserted to the MART in Figure 1. Figure 2 shows a pseudo code to add route B to the routing table in Figure 1. Figure 2 indicates that it takes 16M (256×256×256) routing table memory reads and 16M routing table memory writes to add one entry in the worst case.

An idea called 'Controlled Prefix Expansion' in a paper by Srinivasan and Varghese [6] reduces the route update cost of MART. Hereafter, let us call their MART implementation MART-CPE. MART-CPE has two pointers per element. The one pointer (say $pCPE$) points to the longest-matching route associated with the element. The other pointer (say $pNextLevel$) points to the next level array if it exists. The MART in Figure 1 and 2 spreads a pointer to the longest-matching route all over the routing table.

In contrast, MART-CPE spreads a pointer to the longest-matching route only within an array. Figure 3 shows the MART-CPE routing table that has route A and route B. The reason MART-CPE does not have to spread a pointer all over the routing table is that MART-CPE prepares a variable called $BMP$ and updates $BMP$ with the value of $pCPE$ each time MART-CPE visits a deeper level array at route lookup. The route addition cost of MART-CPE is 256 memory accesses in the worst case.

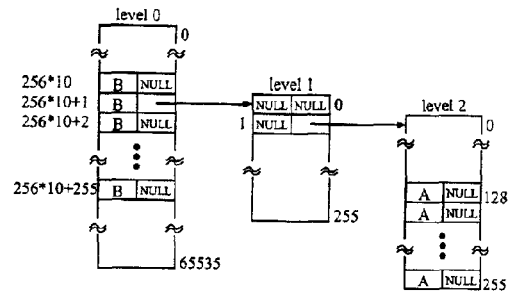

| route | destination |
|-------|-------------|
| A     | 10.1.1.128/25 |
| B     | 10/8        |

Fig. 3. MART with Controlled Prefix Expansion

III. ENHANCEMENT OF MART IN DELETION

Assume now route A is to be removed. In the case of the routing table in Figure 1, the pointers of element 128 to 255 of the level 2 array must be replaced with the new longest-matching route after route A is removed, which is route B. In the case of the routing table in Figure 3, $pCPE$ of element 128 to 255 of the level 2 array must be replaced with the new longest-matching route after route A is removed, which is NULL. Neither the paper by Gupta, Lin, and McKeown [5] nor the paper by Srinivasan and Varghese [6] discusses how to find the new longest-matching route to be replaced with the route to be deleted. The simplest way is to backtrack through the array elements (and arrays in the case of MART). This process is expensive. The simple backtrack takes 254 memory accesses in the worst case even in MART-CPE. There is a better way to backtrack through the array elements. Assume there is a route whose IP prefix is 10.1.1.252/30 in the MART-CPE in Figure 3. In this case, there are 6 possible less specific routes than 10.1.1.252/30 in the array, which are 10.1.1.248/29, 10.1.1.240/28, 10.1.1.224/27, 10.1.1.192/26, 10.1.1.128/25, and 10.1.1/24. That is why it is enough to check 6 array elements corresponding to the above routes instead of checking all of 254 array elements. However, it still needs to check up to 6 array elements. In addition, it costs to calculate these indices of the array element.

SMART solves this backtracking problem of MART at route deletion. SMART always finds the route to be replaced with the route to be deleted at one memory access without any backtracking.

IV. SMART

FIGURE 4 shows the array element structure of SMART.

| pBlkDef | pLongestMatch | pNextLevel |
|---|---|---|

Fig. 4. SMART Array Element

Each array element of SMART has 3 pointers. Suppose there is an element whose index is $i$ in array X. Let us call the element 'element $i$ of Array X', or simply 'element $i$' unless it is necessary to specify an array. Let us also define the term 'base element' to refer to the first array element in the routing table at which the destination IP prefix of a route fully matches. For example, the base element of route A becomes element 128 of a level 2 array.

Pointer $pLongestMatch$ of element $i$ points to the first element of a list of routes whose base element is $i$. The list is kept sorted in the descending order of prefix length of the destination IP prefix of the routes (hereafter we call the prefix length of the destination IP prefix of a route 'prefix length of a route'). This is because it is possible that multiple routes can have the same base element. We discuss this issue in Section IV-E. Pointer $pNextLevel$ points to the next level array if it exists. Otherwise $pNextLevel$ is set to NULL. The value of $pBlkDef$ of element $i$ is equal to the value of $pLongestMatch$ of another element (say element $j$) that matches the following conditions:

1. $0 \leq j < i$
2. the prefix length of the route pointed to by $X[j].pLongestMatch$ is shorter than the prefix length of the route pointed to by $X[i].pLongestMatch$
3. the prefix length of the route pointed to by $X[j].pLongestMatch$ is larger than the prefix length of the routes pointed to by $X[k].pLongestMatch$ ($0 \leq k < j$)

We call the route pointed to by $pBlkDef$ 'block default route'. When the value of $pLongestMatch$ of element $i$ is NULL, the block default route of element $i$ becomes the longest-matching route associated with element $i$. It means that a block default route points to the second longest-matching route of the associated element. This characteristic solves the backtracking problem at the route deletion. We discuss this in section IV-C. When both $pLongestMatch$ and $pBlkDef$ are NULL, the longest-matching route associated with element $i$ is pointed to by $pBlkDef$ of the element in the previous level array whose $pNextLevel$ points to array X.

A. Route Addition

Assume there are no routes in the routing table, then a route whose destination IP prefix is 10.1.4/22 (say route C) is added. The route addition process is:

1. A level 1 array (let us call it array $X$) is allocated and cleared.
2. $L0[10 \times 256+1].pNextLevel = X$. Here and hereafter, L0 is the level 0 array.
3. $X[4].pLongestMatch = C$
4. $X[5..7].pBlkDef$ are set to C Figure 5 shows level 1 array $X$ after route C is added. Note that the block default route of element 4 (the route pointed to by $X[4].pBlkDef$) is not route C. $X[4].pBlkDef$ must be one of the following 3 values by definition:

1. $X[0].pLongestMatch$ unless $X[0].pLongestMatch$ is NULL
2. NULL if $X[0].pLongestMatch$ is NULL.

In this case, $X[4].pBlkDef$ is set to NULL since both $X[0].pLongestMatch$ and $X[2].pLongestMatch$ are NULL. The routes pointed to by $X[1].pLongestMatch$ and $X[3].pLongestMatch$ cannot be the block default route of X[4] since their prefix length length must be 24.

| Element | Contents | | |
|---|---|---|---|
| | pBlkDef | pLongestMatch | pNextLevel |
| 0 | NULL | NULL | NULL |
| 1 | NULL | NULL | NULL |
| 2 | NULL | NULL | NULL |
| 3 | NULL | NULL | NULL |
| 4 | NULL | C | NULL |
| 5 | C | NULL | NULL |
| 6 | C | NULL | NULL |
| 7 | C | NULL | NULL |
| 8 | NULL | NULL | NULL |
| ... | ... | ... | ... |
| 255 | NULL | NULL | NULL |

C: 10.1.4/22

Fig. 5. Level 1 Array X After Adding Route C (10.1.4/22)

Assume now a route whose destination IP prefix is 10.1/20 (let us call it route D) is added. The route addition process in this case is as follows:

1. $X[0].pLongestMatch = D$

2. *X[1..15].pBlkDef* are set to D if their value is NULL or the prefix length of the destination IP prefix pointed to by each of them is shorter than 20.

The block default routes of element 5 to 7 do not change since they are pointing to route C and the prefix length of route C is 22. Figure 6 shows the level 1 array after route D is added.

| Element | Contents | | |
|---|---|---|---|
| | pBlkDef | pLongestMatch | pNextLevel |
| 0 | NULL | D | NULL |
| 1 | D | NULL | NULL |
| 2 | D | NULL | NULL |
| 3 | D | NULL | NULL |
| 4 | D | C | NULL |
| 5 | C | NULL | NULL |
| 6 | C | NULL | NULL |
| 7 | C | NULL | NULL |
| 8 | D | NULL | NULL |
| ⋮ | ⋮ | ⋮ | ⋮ |
| 15 | D | NULL | NULL |
| 16 | NULL | NULL | NULL |
| ⋮ | ⋮ | ⋮ | ⋮ |
| 255 | NULL | NULL | NULL |

C: 10.1.4/22
D: 10.1/20

Fig. 6. Level 1 Array X After Adding Route D (10.1/20)

Assume now a route whose destination IP prefix is 10/8 (route B) is added. In this case, the route addition process is as follows:

1. *L0[10×256].pLongestMatch* = B.
2. *L0[10×256+1 .. 10×256+255].pBlkDef* = B since their value is NULL.

Note that neither level 1 nor level 2 array is accessed. Figure 7 shows the whole SMART after route B is added.

Figure 8 shows a pseudo code of some functions used for routing table operations for the 3-level SMART. It is necessary to change only these functions to support arbitrary-level SMART.

Figure 9 shows a generic route addition pseudo code for SMART. This pseudo code can be used for arbitrary-level SMART. The index of the last array element in which the new route is stored as the block default route is equal to the index of the last array element of the associated IP address belonging to the IP prefix of the new route. Thus the maximum number of routing table memory access at route addition is 511 (256 writes and 255 read).

The simplest implementation visits all the array elements associated with the new route and checks the route pointed to by *pBlkDef*, but it is not necessary. When a route is stored in *pLongestMatch* of element *i* of array *X*, in other words, *X[i].pLongestMatch* is not NULL, there is

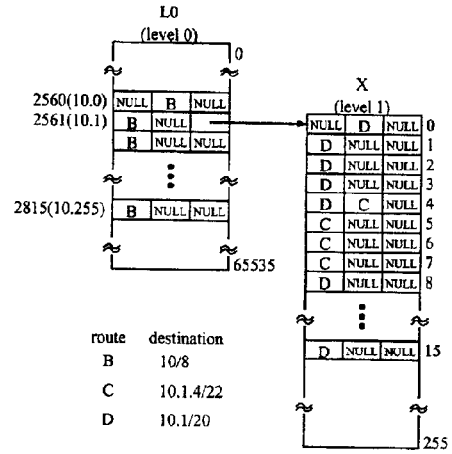

Fig. 7. 3 Routes in SMART no need to check the value of *pBlkDef* of the elements associated with the route pointed to by *X[i].pLongestMatch* since these routes are always more specific than the new routes. It means that the number of routing table memory accesses can be reduced when routes are added in the descendent order of prefix length. We discuss this issue in Section VII.

/* getLevel(plen) returns the level of an array from the prefix length *plen* */ getLevel(plen)
  If *plen* ≤ 16 then
    return 0
  Endif
  If *plen* ≤ 24 then
    return 1
  Endif
  return 2

/* getIndex() returns the index of an array associated with the following parameters: IP address *ipa*, prefix length *plen* */ getIndex(ipa, plen)
  If *plen* ≤ 16 then
    return *ipa* >> 16
  Endif
  If *plen* ≤ 24 then
    return (*ipa* >> 8) & 0xff
  Endif
  return *ipa* & 0xff

```
/* getIndexFromLevel() returns the index of an array associated
with the following parameters: IP address ipa, array level level */
getIndexFromLevel(ipa, level)
    If level == 0 then
        return ipa >> 16
    Endif
    If level == 1 then
        return (ipa >> 8) & 0xff
    Endif
    return ipa & 0xff /* getNscan() returns the number of elements whose block default
routes need to be updated from the prefix length plen */
getNscan(plen)
    return (1 << ((16 + getLevel(plen) × 8)
                                          − plen)) − 1

/* getMaxLevel() returns the maximum level of array in SMART
*/
getMaxLevel()
    return 2

/* getExactMatch() returns pointer to the exact matching route in
the linked list starting X[index].pLongestMatch */
getExactMatch(ipa, plen, X, index)
    If X[index].pLongestMatch == NULL then
        return NULL
    Foreach element in linked list
                starting from X[index].pLongestMatch
        If element→ipa == ipa &&
                    element→plen == plen then
            return element
        Endif
    Endforeach
    return NULL /* get2ndBest() returns pointer to the 2nd best matching route associated with X[index] */
get2ndBest(X, index, pRoute)
    If pRoute is the last element of the linked list
                starting from X[index].pLongestMatch
        return X[index].pBlkDef
    Endif
    return the next element of pRoute
```

Fig. 8. Functions Used for Addition and Deletion

```
addRoute(ipa, plen)
/* ipa: IP address, plen: prefix length */

/* Allocate new array(s) if necessary */
array X = L0      /* level 0 array */
i = 0      /* i indicates level */
While i < getLevel(plen)
    index = getIndexFromLevel(ipa, i)
    If X[index].pNextLevel == NULL then
        Array tmp = a newly allocated array
        Clear tmp
        X[index].pNextLevel = tmp
    Endif
    X = X[index].pNextLevel  /* get next level array */
    i = i + 1
Endwhile /* Update elements of array X */
begin = getIndex(ipa, plen)
nScan = getNscan(plen)
Insert the new route to the list starting from
    X[begin].pLongestMatch with the prefix lengths
    in the list kept in the descending order
i = begin + 1     /* i now indicates array index */
While nScan > 0
    If X[i].pBlkDef == NULL or
            plen > prefix length of the route
                    pointed to by X[i].pBlkDef then
        X[i].pBlkDef = pointer to the new route
    Endif
    If X[i].pLongestMatch == NULL then
        nSkip = 1
    Else
        nSkip = getIndex(~X[i].
                    pLongestMatch→mask, level) + 1
    Endif
    i = i + nSkip
    nScan = nScan - nSkip
Endwhile
```

Fig. 9. SMART Route Addition Algorithm

B. Search

Figure 10 shows a route lookup pseudo code for SMART. The pseudo code in Figure 10 can be used for arbitrary-level SMART. The following is an example to search the routing table shown in Figure 7 for IP address 10.1.17.1:

1. Local variable *pBest* is initialized to NULL.
2. Element 2,561 (10.1) of the level 0 array (*L0*) is accessed. *pBest* is set to B.
3. Element 17 of the level 1 array is accessed. The value of *pBest* does not change since both *pLongestMatch* and *pBlkDef* of element 17 are NULL.
4. *pBest*, which is pointing to route B, is returned since *pNextLevel* of element 17 is NULL.

Each time an element of a deeper level array is visited, it is necessary to update local variable *pBest* with either *pLongestMatch* or *pBlkDef* of the visited element as described in Figure 10. This is because the route pointed to by one of these pointers becomes the longest-matching route when all 3 pointers (*pLongestMatch*, *pBlkDef*, and *pNextLevel*) of the element in the next level array are NULL. It means that the search cost of SMART is 3 times as expensive as the MART in Figure 1 in the worst case since SMART requires 3 memory reads per element visit. In contrast, MART needs one memory read per element visit. The difference of the search cost between the two is however very small in reality. This is because:

1. If one pointer is in the CPU cache or the cache of search hardware, other 2 pointers are also in the cache in the most of cases since these 3 pointers are connected. That is why the possibilities are: 1) all 3 pointers are in the cache, 2) none of 3 pointers is in the cache. In case 1, the cost of 2 more memory accesses is the same as that of 2 more register instructions. In case 2, the cost of 2 more memory accesses is negligible since the cost of loading 3 pointers into the cache is more than 10 times as expensive as that of 2 more cache accesses. That is why the cost of 2 more memory accesses is at the worst 2 more register instructions.
2. It is possible to make it parallel to update *pBest* and check *X[index].pNextLevel* in hardware.
3. There is a way to reduce the number of members per element from 3 to 2. We discuss this optimization of the basic SMART in Section V.

We will show the simulation result of the search performance for MART and SMART in section VII.

C. Route Deletion

When a route (let us call it route Q) is deleted, it is necessary to update all the array elements that have a pointer

```
lookupRoute(ipa)  /* ipa: IP address */
    pBest = NULL
    array X = L0      /* level 0 array */
    For i = 0 to getMaxLevel()
        index = getIndexFromLevel(ipa, i)
        If X[index].pLongestMatch ≠ NULL then
            pBest = X[index].pLongestMatch
        Elseif X[index].pBlkDef ≠ NULL then
            pBest = X[index].pBlkDef
        Endif
        If X[index].pNextLevel == NULL then
            break
        Endif
        X = X[index].pNextLevel
    Endfor
    return pBest
```

Fig. 10. SMART Search Algorithm to route Q throughout the routing table in MART. In contrast, MART-CPE and SMART require to update only the elements in the same array in which pointers to route Q were stored.

The update consists of two parts. The one is to find the route to be replaced (let us call it route R) with route Q. Route R must be the second longest-matching route of the destination IP address of route Q. The other is to replace the pointer value in all the necessary array elements as described above. As we saw in section II, it is expensive to find route R in both MART and MART-CPE since it is necessary to backtrack through the array elements (and arrays in the case of MART). SMART can always find route R with one memory access. Suppose a pointer to route Q is stored in *X[i].pLongestMatch* (element *i* of array X). Route R is always stored in *X[i].pBlkDef* because a block default route always points to the second longest-matching route of the associated element.

Figure 11 shows a route deletion pseudo code for SMART. This pseudo code can be used for arbitrary-level SMART. The maximum number of routing table memory access in Figure 11 is 511 (256 writes and 255 read).

Same as the case of route addition, it is not necessary to visit all the array elements associated with the route to be deleted when *X[i].pLongestMatch* is not NULL. It means that the number of routing table memory accesses can be reduced when routes are deleted in the ascendent order of prefix length. We discuss this issue in Section VII.

*delRoute(ipa, plen)*
/* *ipa*: IP address, *plen*: prefix length */

/* Find the element to be deleted */
array $X = L0$   /* level 0 array */
For $i = 0$ to *getLevel(plen)*
   *index = getIndexFromLevel(ipa, i)*
   If *X[index].pNextLevel* == NULL then
     break
   Endif
   *save[i]* = $X$   /* save $X$ for freeing */
   $X = X[index].pNextLevel$ /* get next level array */
Endfor
*pRoute = getExactMatch(ipa, plen, X, index)*
If *pRoute* == NULL then
   return   /* no such route */
Endif

/* Update elements in array $X$ */
*pDef = get2ndBest(X, index, pRoute)*
*begin* = *index*
*nScan = getNscan(plen)*
*index* = *begin* + 1
While *nScan* > 0
   If *X[index].pBlkDef* ==
             *X[begin].pLongestMatch* then
     *X[index].pBlkDef = pDef*
   Endif
   If *X[index].pLongestMatch* == NULL then
     *nSkip* = 1
   Else
     *nSkip = getIndex(~X[index].*
             *pLongestMatch→mask, level)* + 1
   Endif
   *index = index + nSkip*
   *nScan = nScan - nSkip*
Endwhile
*X[begin].pLongestMatch* = NULL /* Free array(s) if necessary */
While $i > 0$
   If all of *pNextLevel* in *save[i]* are NULL
       and all of *pLongestMatch* in *save[i]*
               are NULL then
     free *save[i]*
   Endif
   $i = i - 1$
Endwhile

Fig. 11. SMART Route Deletion Algorithm

D. Table Default Route

We saw it takes 511 routing table memory accesses to update a route in the worst case. The maximum number of routing table memory access can be reduced to 255, which is the second largest number of routing table memory access at route update. Note that the worst case happens only when the base element of the route is 0 and the return value of *getNscan(plen)* in Figure 8 is equal to the size of the array. Here, *plen* is the prefix length of the route. Thus we can store the block default route to a different place in an array instead of storing it to all the array elements. We call this single route 'table default route'. The table default route is checked when a pointer to the block default route is NULL at search time. The table default route reduces route the update cost 50%. The drawback, however, is that the table default route method requires an extra check when a pointer to the block default route is NULL.

E. Overlapping Routes

Assume a route 'route G' whose destination IP prefix is 10.1/23 is added to the routing table in Figure 7. Route G is supposed to be stored in *X[0].pLongestMatch* in Figure 7 but route E is already stored in *X[0].pLongestMatch*. This happens when multiple routes have the same destination IP address and each of their prefix length is different. Let us call these routes 'overlapping routes'.

Our SMART implementation makes a linked list of the route entries of overlapping routes. In addition, the overlapping route entries are linked in the descending order of prefix length so that no extra search cost is introduced since the first list element always keeps a pointer to the longest-matching route. Figure 12 shows the routing table after route G is added. It is important to notice that the block default route of route G is not the route pointed to by *X[0].pBlkDef* but route D. The following shows how to find the block default route for overlapping routes:

If the route has the shortest prefix length
              among the routes in the linked list then
     block default route is stored in the array element
   Else
     block default route is stored
                 in the next linked list element
   Endif

V. OPTIMIZATION

WE described the basic SMART routing table operations in the previous section. This section discusses an optimization to basic SMART, particularly how to reduce the memory usage and how to increase the search

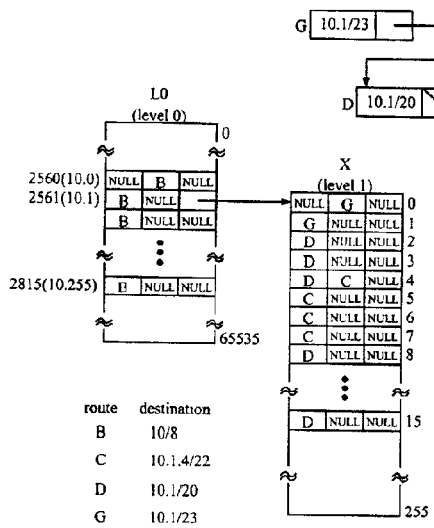

Fig. 12. Overlapping Routes (D and G)

performance.

A basic SMART array element has 3 members (Figure 4). This structure simplifies the routing table operations, but requires a lot of memory. We can consolidate pLongestMatch and pNextLevel as shown in Figure 13 by using the least significant 2 bits of pBlkDef as the union identifier of pNextLevel.

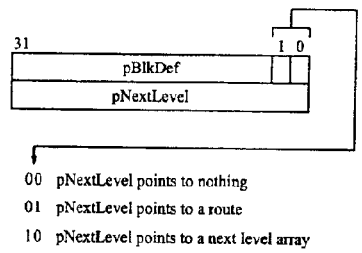

00  pNextLevel points to nothing
01  pNextLevel points to a route
10  pNextLevel points to a next level array Fig. 13. Optimized Smart Array Element This enhancement saves 33% of memory per element. It also reduces the worst case search cost from 3 to 2 routing table memory accesses per element visit. However, it causes the following 'moving routes' problem. Assume the situation in Figure 14-1. The SMART in Figure 14-1 has only one route, which is route E whose destination IP prefix is 10/15. Assume now a new route 'route F' whose destination IP prefix is 10.0.1/24 is to be added to the table. The route adding function has to:

1. move route E from the level 0 array to the level 1 array as shown Figure 14-2
2. update the block default routes or the table default route of the level 1 array.

This means the block default routes or the table default route may spread to multiple arrays. The table default route is effective in this case because a route to be moved always becomes the table default route in the next level array so that it does not affect the worst case route update cost. The route deletion function also has to handle the spread block default routes or the table default route properly.

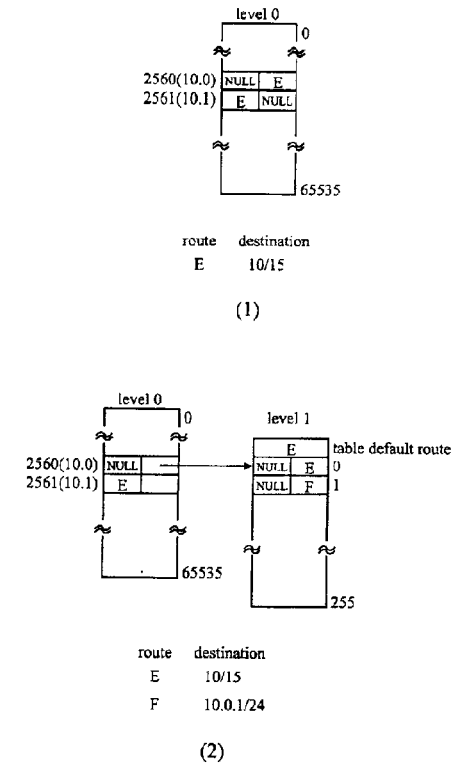

Fig. 14. Moving a Route

VI. COST COMPARISON

Table I shows the maximum number of routing table memory accesses (MAX-RTA) of the routing table operations among MART, MART-CPE, and SMART. SMART-TD is an implementation of SMART that uses the table default route method. Let us use $W$ for the length of an address (e.g., 32 for IPv4, 64 for IPv6 [7]), $N$ for the number of sequences (levels), and $S$ for the maximum number of elements in an array.

| Algorithm | Search | Addition | Deletion |
|---|---|---|---|
| MART (original) | $N$ | $2S^N$ | $NS + 2S^N$ |
| MART (enhanced) | $N$ | $2S^N$ | $N\log S + 2S^N$ |
| MART-CPE (original) | $2N$ | $2S$ | $S + 2S$ |
| MART-CPE (enhanced) | $2N$ | $2S$ | $\log S + 2S$ |
| SMART | $2N$ | $2S$ | $1 + 2S$ |
| SMART-TD | $2N$ | $S$ | $1 + S$ |

TABLE I
MAXIMUM NUMBER OF ROUTING TABLE MEMORY ACCESSES (MAX-RTA)

In Deletion, the left hand side number shows the maximum number of routing table memory accesses to search for the second longest matching route with which the route to be deleted is replaced; the right hand side number shows the maximum number of routing table memory accesses to update a subtable.

*A. Search*

MAX-RTA of MART is $N$ because it requires single memory access per array visit.

MAX-RTA of MART-CPE is $2N$ because it requires 2 memory accesses (reading *pCPE* and *pNextLevel*) per array visit.

MAX-RTA of SMART depends on the implementations. It is $3N$ in the case of 3 members per element, and $2N$ in the case of 2 members per element. However, there is no difference between MART and SMART in reality. We will show this in Section VII.

*B. Addition*

MAX-RTA of MART is $2S^N$ because it spreads a pointer all over the routing table. it is necessary to multiply 2 because MART has to read the pointer of a route first, then it writes a different pointer if necessary.

MAX-RTA of MART-CPE is $2S$ because it spreads a pointer within an array. It becomes $S$ when the table default method is used.

*C. Deletion*

The paper [5] does not describe how to find the second longest matching route at all. MAX-RTA of the simplest MART is $NS + 2S^N$. It becomes $N\log_2 S + 2S^N$ in our enhanced MART.

The paper [6] does not describe how to find the second longest matching route at all. MAX-RTA of the simplest MART-CPE is $S + 2S$. It becomes $\log_2 S + 2S$ in our enhanced MART-CPE.

MAX-RTA of SMART is $1+2S$. It becomes $1+S$ when the table default method is used.

VII. SIMULATION RESULTS

WE simulated all 3 routing table operations, which are addition, deletion, and lookup, for the BSD radix implementation [8], a MART implementation, and a SMART implementation that has 2 members per array element. The reason we used our sample MART implementation is that we could not find any source code of MART. We used MAE-EAST routing table [3] on Aug. 17, 1999 as the source of BGP routes. This routing table has 42,366 routes and 95 routes have the prefix length longer than 24. We also created 2,000 random routes whose prefix length is longer than 24 and added them to the routing table as the source of IGP (Interior Gateway Protocol) routes. This is because MAE-EAST routing table does not have IGP routes whose prefix lengths are usually longer than 24. It is important to include the IGP routes whose prefix length is longer than 24 because it significantly increases the number of both level 1 array and level 2 array (see Table V). One should not ignore IGP routes at simulation because it is common that ISP (Internet Service Provider) routers have both BGP and IGP routes in their routing tables in the real world, and again, the prefix lengths of most of the IGP routes are longer than 24. Table II shows the prefix length distribution of the routing table used for the simulation.

| prefix length | number of routes | prefix length | number of routes | prefix length | number of routes |
|---|---|---|---|---|---|
| 8 | 20 | 17 | 496 | 25 | 435 |
| 9 | 3 | 18 | 1081 | 26 | 438 |
| 10 | 3 | 19 | 3285 | 27 | 407 |
| 11 | 9 | 20 | 1723 | 28 | 406 |
| 12 | 21 | 21 | 2082 | 29 | 406 |
| 13 | 42 | 22 | 2790 | 30 | 3 |
| 14 | 110 | 23 | 3582 | | |
| 15 | 184 | 24 | 21971 | | |
| 16 | 4869 | | | | |

Total Number of Routes: 44,366

TABLE II
PREFIX LENGTH DISTRIBUTION

The simulation process:
1. randomly adds 44,366 routes to the routing table 2. looks up 100,000 random IP addresses in the routing table
3. randomly deletes all 44,366 routes from the routing table
4. repeats 1 to 3 for 100 times.

The simulation adds, looks up, and deletes routes randomly so that we can avoid any order dependent effects. The simulation is performed on a machine that has the following specifications:

- CPU: AMD Athlon 600MHz
- Memory: 128MB
- OS: Linux 2.2.14
- Compiler: egcs-2.91.66

Table III shows the simulation result of the tree routing table implementations.

|  | search (μs/route) | add (μs/route) | delete (μs/route) | memory use (MB) |
|---|---|---|---|---|
| BSD Radix | 2.00 | 4.06 | 3.61 | 5.54 |
| MART | 0.20 | 2.03 | 3.83 | 9.98 |
| MART-CPE | 0.20 | 1.13 | 2.03 | 17.42 |
| SMART | 0.20 | 1.35 | 1.35 | 17.42 |
| SMART-TD | 0.20 | 1.13 | 1.13 | 17.42 |

- The values in μs are the average of 44,366 random addition/deletion and 100,000 random IP addresses lookup.
- The memory use is when there are 44,366 routes in the table.
- The simple backtracking method is used in MART and MART-CPE for deletion.
- SMART-TD uses the table default route method.

TABLE III
PERFORMANCE OF BSD RADIX, MART, MART-CPE, AND SMART

Table IV shows the distribution of the number of backtrack to find the second longest matching route in MART-CPE at deletion.

Table V shows the performance difference between two routing tables; the one (MAE-EAST) is the pure MAE-EAST routing table that has only 95 routes whose prefix length is longer than 24, the other (MAE-EAST+) is a table which has all the MAE-EAST routes plus 2,000 randomly created routes whose prefix length is longer than 24.

Table VI shows the performance difference between the following two cases:

1. 44,366 routes are added and deleted randomly
2. 44,366 routes are added according to the descending order of the prefix length and deleted according to the ascending order of the prefix length.

The IP addresses that have the same prefix length are

| number of backtracks | | number of routes | % |
|---|---|---|---|
| | 0 | 2,051 | 4.6 |
| | 1 | 32,581 | 73.4 |
| 2 .. | 9 | 7,371 | 16.6 |
| 10 .. | 19 | 584 | 1.3 |
| 10 .. | 39 | 778 | 1.8 |
| 40 .. | 59 | 120 | 0.3 |
| 60 .. | 99 | 535 | 1.2 |
| 100 .. | 255 | 346 | 0.8 |

TABLE IV
BACKTRACKING NUMBER DISTRIBUTION (MART-CPE)

|  | level 1 array | level 2 array | search (μs/route) | add (μs/route) | delete (μs/route) |
|---|---|---|---|---|---|
| MAE-EAST | 3,441 | 64 | 0.20 | 0.94 | 0.94 |
| MAE-EAST+ | 5,299 | 2,064 | 0.20 | 1.13 | 1.13 |
| diff.(%) | 53.99 | 3,125 | 0.00 | 20.21 | 20.21 |

- MAE-EAST has 42,366 routes and 95 routes' prefix length is longer than 24
- MAE-EAST+ has 2,000 more routes whose prefix length is longer than 24 in addition to the MAE-EAST routing table

TABLE V
TABLE SIZE AND PERFORMANCE added and deleted randomly. Search performance is measured with 100,000 random IP addresses lookup.

|  | search (μs/route) | add (μs/route) | delete (μs/route) |
|---|---|---|---|
| random | 0.20 | 1.13 | 1.13 |
| sorted | 0.20 | 0.68 | 0.68 |

TABLE VI
UPDATE ORDER AND PERFORMANCE

The simulation result shows the following things:

1. SMART has 79.6% as fast as MART-CPE in deletion. It means that route deletion becomes very slow when a route flap happens even though 78% of the second longest matching routes are found with 0 or 1 backtracking. This is because:
   (a) 'for' loop overhead is not negligible
   (b) many memory accesses happen even though the percentage of long backtracking is low (about 22.0%).

This result shows that SMART is much better than MART-CPE when a route flap happens although SMART has few advantages against MART-CPE in the steady state.

2. SMART is more than 10 times in search, more than 3 times in addition and deletion as fast as BSD radix when the table default method is applied. On the other hand, SMART uses more than 3 times as much memory as BSD radix.

3. There is no difference in search performance among MART, SMART, and SMART with the table default route method. This result suggests that all the saved block default routes and the table default route are in the cache. It is quite possible because the Athlon CPU has 64K byte L1 data cache.

4. SMART improves route addition and deletion performance compared to MART. SMART is almost twice in route addition, more than 3 times in deletion as fast as the traditional MART.

5. The route addition and deletion performance improves 16% when the table default method is used. This result suggests that the cost of accessing the whole array affects the performance. Actually, the number of routes whose prefix length is 24 is large (21,971). These routes move to the level 2 arrays when more specific routes exist and it is necessary to access the whole array elements unless the table default route is applied.

6. Neither the number of routes nor the number of deep level arrays seriously affects the route update performance. The number of routes increased almost 54%, the number of level 2 array increased 32 times in Table V. However, the route update cost change is less than 17%. This is an expected result of the SMART route update algorithm.

7. When a route flap happens, the performance of both addition and deletion increases about 66% in the case routes are sorted in SMART. Modern routers usually have two routing tables. One is owned by the controller that handles routing protocols and the other is owned by the packet forwarder. The controller calculates routes and downloads them to the forwarder's routing table. The update performance of the forwarder increases about 66% when the controller sorts routes according to the prefix length and downloads them to the forwarder. It is inexpensive to sort routes according to only the prefix length.

The simulation result shows that the performance of SMART is pretty good for all 3 routing table operations. Furthermore, it is easy to implement the SMART search in hardware and make it pipelined. The search performance becomes single memory access speed in this case.

VIII. CONCLUSIONS

It is important to keep the route update cost low in order to quickly recover from route flaps. The number of IGP routes whose prefix length is longer than 24 is not negligible, either. The route update cost of simple MART is 32M and more routing table memory accesses in the worst case. We presented a new multi-array routing table called SMART (Smart Multi-Array Routing Table) whose route update cost is always less than 256 routing table memory accesses. SMART does not spread pointers to routes all over the routing table. Instead, each SMART array element has a block default route, which is the second longest-matching route of the associated array element. A block default route in an array does not become a block default route in any other arrays. In theory, the block default route affects the search performance, but it does not in reality. The SMART search cost becomes one memory access when it is implemented in hardware with pipelining. We showed the SMART search cost is practically the same as that of simple MART by simulation. We also showed that SMART is 10 times in search, more than 3 times in addition and deletion as fast as the BSD radix tree routing table by simulation.

ACKNOWLEDGMENTS

We would like to thank Steve Reseigh, Paul Ziemba, Kevin Williams, and Donald Knuth for useful comments on a draft of this paper. We would like to thank MAYAN Networks for giving us an opportunity to write this paper. We would also thank Hiroki Nakano who helped to port the BSD radix code to a user program.

REFERENCES

[1] Tony Bates, *Routing Table History*, http://www.employees.org:80/~tbates/cidr.plot.html
[2] V. Fuller, T. Li, J. Yu, and K. Varadhan, *Classless Inter-Domain Routing (CIDR)*, RFC1519, September 1993.
[3] Merit Networks, Inc., *Internet Routing Table Statistics*, http://www.merit.edu/ipma/routing_table/
[4] C. Labovitz, R. Malan, F. Jahanian, *Internet Routing Stability*, Proceedings of ACM SIGCOMM, Sept. 1997.
[5] Pankaj Gupta, Steven Lin, and Nick McKeown, *Routing Lookups in Hardware at Memory Access Speeds*, Proceedings of Infocom, April 1998.
[6] V. Srinivasan and George Varghese, *Faster IP Lookups using Controlled Prefix Expansion*, Proceedings of ACM Sigmetrics, Sep 98 and ACM TOCS 99.
[7] R. Hinden, M. O'Dell, S. Deering, *An IPv6 Aggregatable Global Unicast Address Format*, RFC2374, July 1998.
[8] FreeBSD 2.2.2, /usr/src/sys/net/radix.[ch]

Appendix 2

```
-- ################################################################
-- #
-- #     File: ip_route_engine.vhd
-- # Description: The following logic performs a longest match
-- #         route lookup using the structure and algorithm
-- #         defined by Yoichi Hariguchi of MAYAN Networks.
-- #
-- #         The logic will interface to an external control
-- #         entity in the form of an external hardware state
-- #         machine or a software driver. The logic also
-- #         interfaces with an external memory interface.
-- #         This memory interface takes an address and read
-- #         strobe and will return a 64bit vector read from
-- #         the given address.
-- #
-- # Assumptions: The routing tables must be aligned by size.
-- #         This allows the hardware to append the index value
-- #         to the base address of the routing table. This
-- #         will eliminates the need for large adders to be used
-- #         in the logic.
-- #
-- #         The memory interface will return a 64bit vector
-- #         that contains the 32bit DWORD read from the read
-- #         address base value in bits (31 downto 0). The 32bit
-- #         DWORD at address base + 1 will be returned in
-- #         bits (63 downto 32) of the returned vector.
-- #
-- ################################################################ library ieee;
use ieee.std_logic_1164.all;
use ieee.std_logic_arith.all;
use ieee.std_logic_unsigned.all;

entity ip_route_engine is port (

-- state machine clock source.
  state_clk:    in  std_logic;

-- state machine reset. asynchronous.
  state_rst:    in  std_logic;

-- IP address to lookup. must be stable during entire lookup.
  lkup_ip_addr: in  std_logic_vector(31 downto 0);

-- Base address of the level 0 route table.
  route_table_base: in std_logic_vector(31 downto 0);

-- route lookup start bit. set high to trigger route lookup. set
  -- bit low to clear the route engine after lookup is done.
  route_eng_run: in  std_logic;
```

-- memory ready input. set low by memory read logic when read cycle
-- has completed and valid data is present on mem_read_value vector.
mem_rdy_n:      in std_logic;

-- memory read result. data must stay stable until mem_rd_n has been
-- set high by route engine.
mem_read_value:  in std_logic_vector(63 downto 0);

-- memory read address.
mem_read_pntr:   out std_logic_vector(31 downto 0);

-- route lookup result vector. data is valid while route_eng_done
-- bit is high.
return_route:    out std_logic_vector(31 downto 0);

-- route engine done indication. a '1' indicates that the route
-- engine has completed its lookup and route vector can be read.
route_eng_done:  out std_logic;

-- memory read control. set low by route engine to read data from
-- address contained in mem_read_pntr vector.
mem_rd_n:        out std_logic ); end ip_route_engine;

architecture ip_route_engine_arch of ip_route_engine is

-- current state variable supporting 8 states.
signal  state:          std_logic_vector(2 downto 0);
-- vector to store block default read from memory
signal  block_default:  std_logic_vector(31 downto 0);
-- vector to store route read from memory
signal  read_route:     std_logic_vector(31 downto 0);
-- signal to mux between memory read value and block default
signal  return_bdef:    std_logic;

-- State definitions. States are defined so the state machine
-- can progress forward using a sequential counter.
constant ST_IDLE:          std_logic_vector(2 downto 0) := "000";
constant ST_TABLE_AB_READ: std_logic_vector(2 downto 0) := "001";
constant ST_TABLE_C_ADDR:  std_logic_vector(2 downto 0) := "010";
constant ST_TABLE_C_READ:  std_logic_vector(2 downto 0) := "011";
constant ST_TABLE_D_ADDR:  std_logic_vector(2 downto 0) := "100";
constant ST_TABLE_D_READ:  std_logic_vector(2 downto 0) := "101";
constant ST_DONE:          std_logic_vector(2 downto 0) := "110";

begin

-- Drive the output siganls
drive_output: block

```
begin

-- Set route engine done flag when state machine has completed the lookup.
    route_eng_done <= '1' when state = ST_DONE else '0';

-- Set memory read flag when state machine is in any of the three memory
    -- read states.
    mem_rd_n <= '0' when (state = ST_TABLE_AB_READ) or (state = ST_TABLE_C_READ)
            or (state = ST_TABLE_D_READ) else '1';

-- Mux between route entry and block default value based upon exit mode
        return_route(31 downto 0) <= read_route(31 downto 0) when return_bdef = '0'
            else block_default(31 downto 0);

end block drive_output;

-- Route lookup state machine.
state_tick: process ( state_clk, state_rst )
begin -- Set initial values on reset
    if state_rst = '0' then mem_read_pntr <= (others => '0');
            state         <= ST_IDLE;
            read_route    <= (others => '0');
            block_default <= (others => '0');
            return_bdef   <= '0';

-- machine operates on rising edge of state clock
        elsif state_clk'event and state_clk = '1' then case (state) is -- Idle state. Waiting for new IP address to be looked up.
                when ST_IDLE =>

-- Wait for external entity to set the run bit, indicating that a new
                    -- IP address has been entered.
                    if route_eng_run = '1' then -- Set the upper bits of the lookup address to the base address of
                        -- the level 0 routing table. Routing table must be aligned so
                            -- bits (18 downto 0) of the base address are '0'.
                        mem_read_pntr(31 downto 19) <= route_table_base(31 downto 19);

-- Set bits 18 downto 11 to the A byte of the IP address to be looked up.
                        mem_read_pntr(18 downto 11) <= lkup_ip_addr(31 downto 24);

-- Set bits 10 downto 3 to the B byte of the IP address to be lookup up.
                        mem_read_pntr(10 downto 3 ) <= lkup_ip_addr(23 downto 16);
```

-- Go to the memory read state
            state <= state + 1;

end if;

-- Common logic is used for all three memory read states
            when ST_TABLE_AB_READ | ST_TABLE_C_READ | ST_TABLE_D_READ =>

-- Wait for the memory read logic to indicate the read cycle has completed.
            if mem_rdy_n = '0' then -- Update block default value if it contains valid data
                    if mem_read_value(31 downto 2) /= "00000000000000000000000000000000" then
                        block_default(31 downto 2) <= mem_read_value(31 downto 2);
                        block_default( 1 downto 0) <= (others => '0');
                    end if;

-- Update the read route value. This is the second DWORD read
                    -- from memory.
                    read_route(31 downto 0) <= mem_read_value(63 downto 32);

-- Update the mem_read_pointer value. This is the second DWORD read
                    -- from memory. The next level table must be aligned so that
                    -- bits (10 downto 0) of the base address are '0'.
                    mem_read_pntr(31 downto 11) <= mem_read_value(63 downto 43);

-- If the lower two bits of block default are "01" then the pointer block
                    -- contains a pointer to the route entry for this IP address. The routing
                    -- engine returns the route value read.
                    if ( mem_read_value(1 downto 0) = "01" ) then
                        return_bdef <= '0';
                        state <= ST_DONE;

-- If the lower two bits of block default are "10" then the pointer block
                    -- contains a pointer to the next level routing table. The routing engine
                    -- continues to the next table using the IP address as an index.
                    elsif ( mem_read_value(1 downto 0) = "10" ) then
                        state <= state + 1;

-- If the lower two bits of block default are "00" the pointer block does
                    -- not contain a valid pointer. Return the block default.
                    else
                        return_bdef <= '1';
                        state <= ST_DONE;
                    end if;

end if;

-- Generate address for TABLE 1 (byte C of IP) lookup.
      when ST_TABLE_C_ADDR =>

-- Set bits 10 downto 3 of the memory pointer to the C byte of the
            -- IP address to be lookup up. Table must be aligned so that
            -- bits (10 downto 0) of the base address are '0'.
            mem_read_pntr(10 downto 3 ) <= lkup_ip_addr(15 downto 8 );

-- Go to the memory read state
            state <= state + 1;

-- Generate address for TABLE 2 (byte D of IP) lookup.
      when ST_TABLE_D_ADDR =>

-- Set bits 10 downto 3 of the memory pointer to the D byte of the
            -- IP address to be lookup up. Table must be aligned so that
            -- bits (10 downto 0) of the base address are '0'.
            mem_read_pntr(10 downto 3 ) <= lkup_ip_addr(7 downto 0 );

-- Go to the memory read state
            state <= state + 1;

when ST_DONE =>

-- Wait here until external entity has cleared the run bit. This indicates that
            -- the route has been read and the engine is free to lookup a new route.
            -- Clear the values stores in block default and read route.
            if route_eng_run = '0' then
                state      <= ST_IDLE;
                      read_route    <= (others => '0');
                      block_default <= (others => '0');
            end if;

when OTHERS =>
            state <= ST_IDLE;

end case;
        end if;
  end process state_tick;
end ip_route_engine_arch;

What is claimed is:

1. A routing table circuit for a router having one or more input ports for receiving a message having a destination address, the router having a plurality of output ports for transmitting the message, the routing table circuit comprising:

one or more routing table memories to store a plurality of routing table arrays, said plurality of routing table arrays being arranged hierarchically in a plurality of levels, wherein each of said plurality of routing table arrays is associated with a predetermined subset of prefixes of said destination address, and has entries, said entries including a block default route pointer field to store a block default route pointer and a routing field, wherein said routing field stores a route pointer or a next level pointer pointing to one of said plurality of routing table arrays in a next level; and a route engine to select said block default route pointer or said route pointer as a return route pointer based on said destination address, wherein said return route pointer determines one of said plurality of output ports for routing said message, said route engine to access said plurality of routing table arrays in said plurality of levels.

2. The routing table circuit of claim 1 wherein said plurality of routing table arrays further include a tag field to designate said block default route pointer as said return route pointer.

3. The routing table circuit of claim 1 wherein said entries include a tag field.

4. The routing table circuit of claim 3 wherein said block default route pointer field includes said tag field.

5. The routing table circuit of claim 3 wherein said tag field indicates whether said routing field has said route pointer.

6. The routing table circuit of claim 3 wherein the tag field designates whether said routing field has said next level pointer.

7. The routing table circuit of claim 1 wherein at least one of said plurality of routing table arrays is associated with a table block default entry field that specifies a table block default route pointer for a subset of entries in said at least one of said plurality of routing table arrays, wherein said route engine selects said table block default route pointer as said return route pointer when a particular entry in said at least one of said plurality of routing table arrays has no particular block default route pointer or said routing field of said particular entry has no pointer.

8. The routing table circuit of claim 1 wherein at least one of said plurality of routing table arrays is associated with a table block default entry field that specifies a table block default route pointer for all entries in said at least one of said plurality of routing table arrays, wherein said route engine selects said table block default route pointer as said return route pointer when a particular entry in said at least one of said plurality of routing table arrays has no particular block default route pointer or said routing field of said particular entry has no pointer.

9. The routing table circuit of claim 1 further comprising a table default entry register to store a table block default route pointer that specifies block default route pointers for a subset of entries in an associated routing table array, wherein at least one of said plurality of routing table arrays are associated with said table block default entry register, wherein said route engine selects said table block default route pointer as said return route pointer when a particular entry in said associated routing table array has no particular block default route pointer or said routing field of said particular entry has no pointer.

10. The routing table circuit of claim 1 wherein a routing field of at least one element of said plurality of routing table arrays is populated with a pointer from the group consisting of (A) said route pointer, (B) said next level pointer, and (C) a table default route pointer.

11. The routing table circuit of claim 1 wherein a subset of said one or more routing table memories is associated with a linked list of overlapping routes, said linked list comprising a plurality of list entries including a first list entry, wherein said first list entry includes a longest route.

12. The routing table circuit of claim 11 wherein said list entries include a prefix and a prefix length, and sorted in a descending order of said prefix length so that said first list entry includes said longest prefix.

13. The routing table circuit of claim 1 further comprising:

a route entry table that associates said return route pointer with a next hop identifier to select one of said plurality of output ports for outputting said message.

14. The routing table circuit of claim 1 wherein said block default route pointer of a particular entry associated with said destination address is designated as said return route pointer when said route pointer associated with said particular entry is NULL, said route pointer of said routing field is designated as said return route pointer when said route pointer is not NULL, and said next level pointer is used to access one of said plurality of routing table arrays in said next level.

15. A routing table circuit for a router having an input port for receiving a message having a destination address, said router having a plurality of output ports for transmitting said message, said routing table circuit comprising:

one or more routing table memories to store a plurality of routing table arrays to provide a return route pointer based on plurality of said destination address, said plurality of routing table arrays being arranged hierarchically in a plurality of levels, wherein each of said plurality of routing table arrays is associated with a predetermined subset of bits of the destination address, and have a plurality of elements, said plurality of elements including a block default route pointer field to store a block default route pointer and a route pointer field to store a longest-matching route pointer and a next-table pointer field to store a next level pointer to one of said plurality of routing table arrays in a next level; and a route engine to select said block default route pointer or said longest-matching route pointer as a return route pointer based on said destination address, wherein said return route pointer is used to determine one of said plurality of output ports for routing said message, said route engine to access one of said plurality of routing table arrays in said next level.

16. The routing table circuit of claim 15 wherein said route engine applies said next level route pointer in combination with a subset of said destination address to access a next element in one of said plurality of routing table arrays in said next level to return said block default route pointer or said longest-matching route pointer of said next element as said return route pointer.

17. The routing table circuit of claim 15 wherein said block default pointer of a particular element is equal to NULL when said particular element has no block default route pointer, and said longest-matching route pointer of said particular element is equal to NULL when said particular element has no longest matching route.

18. A router comprising:
a plurality of input ports that receive a message having a destination address;
a plurality of output ports that output said message based on a return route pointer;
a routing table circuit to receive said message having said destination address, including:
one or more routing table memories to store a plurality of routing table arrays, wherein said plurality of routing table arrays are arranged hierarchically in a plurality of levels, wherein each of said plurality of routing table arrays is associated with a predetermined subset of prefixes of said destination address, and have entries, said entries including a block default route pointer field to store a block default route pointer and a routing field to store a route pointer or a next level pointer to one of said plurality of routing table arrays in a next level; and
a route engine to select said block default route pointer or said route pointer as said return route pointer based on said destination address, wherein said return route pointer determines one of said plurality of output ports for routing said message, said route engine to access said plurality of routing table arrays in said plurality of levels.

19. The router of claim 18 further comprising:
a route entry table that maps the selected output pointer to a next hop identifier for selecting one of the plurality of output ports for outputting the message.

20. A method of determining an output port for a message having a destination address for a router having a plurality of routing table arrays arranged hierarchically including at least a first level routing table array and a second level routing table array, said plurality of routing table arrays having elements, said method comprising:
receiving said message;
determining a first index into said first level routing table array based on at least a first subset of said destination address;
accessing said first level routing table array based on said first index, said first level routing table array having a first plurality of elements, where said first plurality of elements include a first block default route pointer field to store a first block default route pointer and a first routing field to store a first route pointer or a first next level pointer, said first level routing table comprises a first tag field, said first tag field to indicate whether to select said first block default route pointer or said first route pointer as a return route pointer, said first tag field to indicate whether said first routing field contains said first next level pointer;
selecting said block default route pointer as said return route pointer based on said first tag field;
selecting said first route pointer based on said first tag field;
determining a second index into said second level routing table array based on said first tag field and at least a second subset of said destination address;
accessing said second level routing table array based on said second index, said second level routing table array having a second plurality of elements including a second block default route pointer field to store a second block default route pointer and a second routing field to store a second route pointer and a second next level pointer, said second level routing table array further including a second tag field to indicate whether to select said second block default route pointer or said second route pointer as said return route pointer, said second tag field to indicate whether said second routing field contains said second next level pointer;
selecting said second block default route pointer from said second level routing table array as said return route pointer based on said second tag field; and
selecting said second route pointer of said second level routing table array based on said second tag field.

21. The method of claim 20 wherein said second level routing table array is associated with a table default route field to store a table default route pointer, said method further comprising:
selecting said table default route pointer when a particular element associated with said destination address has no second block default route pointer and said second routing field contains no pointer.

22. A method of adding a route to a routing table, comprising:
receive a new route pointer associated with a new route destination address including a new route prefix and a new route prefix length;
allocate a first level routing table, and allocate a second level routing table when the new route prefix length exceeds a first predetermined threshold, the first predetermined threshold specifying a number of bits of the destination address associated with the first level routing table, the first and second level routing tables having elements, the elements including a block default route field to store a block default route, if any, and also having a routing pointer field to store a routing pointer selected from the group consisting of (A) a route pointer and (B) a next level pointer;
determine a first particular element of the first level routing table associated with the new route destination address;
store a particular next level pointer in the routing pointer field of the particular element;
determine a second particular element of the second level routing table associated with the new route destination address;
store the new route pointer in the routing field of the second particular element; and
update the block default routes for a subsequent subset of elements of the second routing table based on the new route prefix length.

23. The method of claim 22 further comprising:
identify among said subsequent subset of elements of the second routing table a second particular element having a routing field that has a route pointer having a prefix length greater than the new route prefix length;
obtaining a number of elements covered by said second particular element; and
skipping memory access to said number of elements.

24. The method of claim 22 further comprising:
receive a delete-route pointer associated with a delete-route destination address including a delete-route prefix and a delete-route prefix length;
determine a third particular element in a lowest level table of the hierarchy that stores the delete-route pointer as the route pointer to provide a start element;

identify a block default route, if any, of the start element;

determine a fourth particular element in the lowest level table of the hierarchy that stores the delete-route pointer as the block default route pointer as an end element;

for a next element after the start element to the end element:
when the block default route for said next element equals the delete-route pointer, set the block default route of said next element equal to said block default route of said start element.

25. The method of claim 24 further comprising:

determining when said next element has a routing field that has a route pointer having a prefix length greater than the delete-route prefix length;

obtaining a number of elements covered by said next element; and skipping memory access to said number of elements.

26. A method of moving entries in a routing table, comprising:

receive a first new route pointer associated with a first new route destination address including a first new route prefix and a first new route prefix length;

allocate a first level routing table, the first new route prefix length being less than a first predetermined threshold, the first predetermined threshold specifying a number of bits of the destination address associated with the first level routing table, the first routing table having first table elements, the first table elements including a block default route field to store a block default route, if any, and also having a routing pointer field to store a routing pointer selected from the group consisting of (A) a route pointer and (B) a next level pointer;

determine a first particular element of the first level routing table associated with the first new route destination address;

store the first new route pointer in a routing field of the first particular element;

update block default routes for a subsequent subset of elements of the first routing table with the first new route pointer based on the first new route prefix length;

receive a second new route pointer associated with a second new route destination address including a portion of the first new route prefix and a second new route prefix length being longer than the first new route prefix length, wherein the second new route prefix length is greater than the first predetermined threshold;

allocate a second level routing table, the second level routing table having second table elements, the second table elements including a block default route field to store a block default route, if any, and also having a routing pointer field to store a routing pointer selected from the group consisting of (A) a route pointer and (B) a next level pointer;

store a next table pointer in the routing field of the first particular element;

determine a second particular element of the second level routing table associated with the second new route destination address;

store the second new route pointer in a routing field of the second particular element;

store the first new route pointer in a routing field of elements of the second level routing table that precede the second particular element;

store the first new route pointer in a default block route field for a second through last element of the second level routing table; and update block default routes for a subsequent subset of elements of the second level routing table with the second new route pointer based on the second new route prefix length.

* * * * *